(12) United States Patent
Ito et al.

(10) Patent No.: US 11,738,262 B2
(45) Date of Patent: Aug. 29, 2023

(54) INFORMATION PROCESSOR, INFORMATION PROCESSING METHOD, AND PROGRAM

(71) Applicant: SONY GROUP CORPORATION, Tokyo (JP)

(72) Inventors: Osamu Ito, Tokyo (JP); Takeshi Ogita, Kanagawa (JP); Yohei Fukuma, Chiba (JP); Ikuo Yamano, Tokyo (JP); Ryo Yokoyama, Tokyo (JP); Takamoto Tsuda, Nagano (JP)

(73) Assignee: Sony Group Corporation, Tokyo (JP)

( * ) Notice: Subject to any disclaimer, the term of this patent is extended or adjusted under 35 U.S.C. 154(b) by 106 days.

(21) Appl. No.: 17/284,572

(22) PCT Filed: Oct. 16, 2019

(86) PCT No.: PCT/JP2019/040744
§ 371 (c)(1),
(2) Date: Apr. 12, 2021

(87) PCT Pub. No.: WO2020/080432
PCT Pub. Date: Apr. 23, 2020

(65) Prior Publication Data
US 2021/0339127 A1 Nov. 4, 2021

(30) Foreign Application Priority Data
Oct. 19, 2018 (JP) ................................ 2018-197254

(51) Int. Cl.
A63F 13/285 (2014.01)
A63F 13/44 (2014.01)
(Continued)

(52) U.S. Cl.
CPC ............. *A63F 13/285* (2014.09); *A63F 13/44* (2014.09); *A63F 13/54* (2014.09); *G06F 3/016* (2013.01)

(58) Field of Classification Search
CPC ........ A63F 13/285; A63F 13/44; A63F 13/54; G06F 3/01; G06F 8/38
(Continued)

(56) References Cited

U.S. PATENT DOCUMENTS

| 10,564,724 | B1 * | 2/2020 | Bergeron | ................ G06F 3/016 |
| 2013/0198625 | A1 * | 8/2013 | Anderson | ............... G06F 3/016 715/701 |

(Continued)

FOREIGN PATENT DOCUMENTS

| JP | 2009-513077 A | 3/2009 |
| JP | 2015-053048 A | 3/2015 |

(Continued)

*Primary Examiner* — Michael A Cuff
(74) *Attorney, Agent, or Firm* — Paratus Law Group, PLLC

(57) ABSTRACT

The present disclosure relates to a system (1) that performs generation and reproduction of control data of a haptic presentation device assuming that a control is performed in synchronization with a reproduction content, and there is provided an information processor (10), which makes it possible to achieve reduction in a burden of processing and improvement in convenience, including a control unit (104) that generates a script in which time information on the reproduction content and a control command of the haptic presentation device are associated with each other, in which the control command includes position information indicating a perceptual position that causes a haptic stimulus to be perceived in the haptic presentation device, and haptic stimulus type information specifying a type of the haptic stimulus.

20 Claims, 34 Drawing Sheets

(51) Int. Cl.
*A63F 13/54* (2014.01)
*G06F 3/01* (2006.01)

(58) Field of Classification Search
USPC .......................................................... 463/36
See application file for complete search history.

(56) References Cited

U.S. PATENT DOCUMENTS

| | | | |
|---|---|---|---|
| 2015/0070150 A1* | 3/2015 | Levesque ........... | H04N 21/4884 |
| | | | 340/407.1 |
| 2017/0108929 A1* | 4/2017 | Sinko ....................... | G06F 3/016 |
| 2018/0200619 A1* | 7/2018 | Guillotel ............... | A63F 13/285 |
| 2019/0215582 A1* | 7/2019 | Tennakoon ........ | H04N 21/8547 |
| 2019/0278369 A1* | 9/2019 | Ballard ................ | A63F 13/285 |
| 2019/0281473 A1* | 9/2019 | Liao ...................... | H04W 48/16 |
| 2019/0302889 A1* | 10/2019 | Salada .................. | G06F 3/0416 |
| 2020/0233484 A1* | 7/2020 | Thayer ..................... | G06F 3/01 |
| 2021/0173485 A1* | 6/2021 | Ryu ........................ | G06F 3/011 |

FOREIGN PATENT DOCUMENTS

| | | |
|---|---|---|
| JP | 2015-219917 A | 12/2015 |
| JP | 2018-019393 A | 2/2018 |
| JP | 2018-045270 A | 3/2018 |
| JP | 2018-055722 A | 4/2018 |
| JP | 2018-527655 A | 9/2018 |
| WO | WO 2009/136345 A1 | 11/2009 |

* cited by examiner

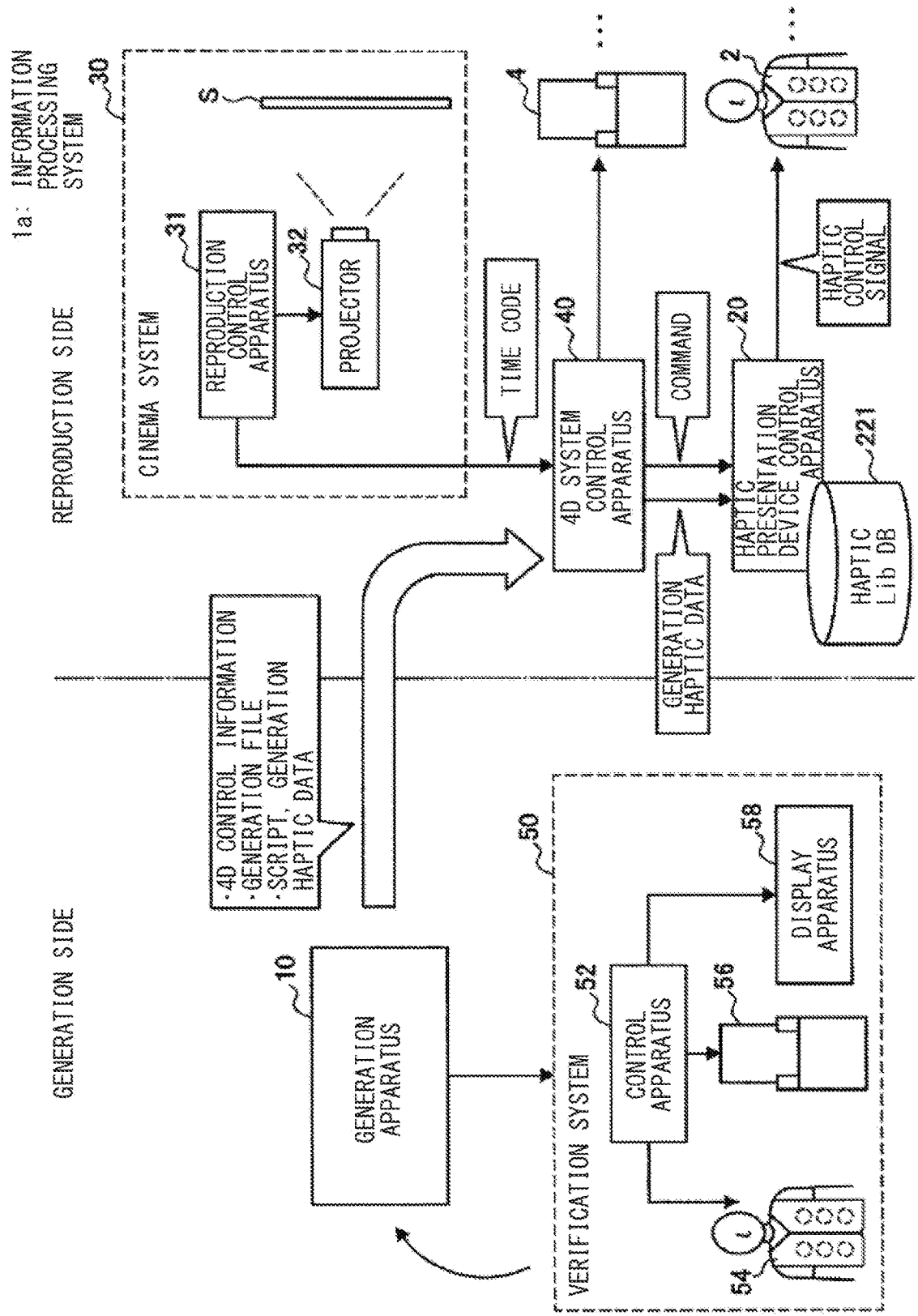
[FIG. 1]

[FIG. 2]
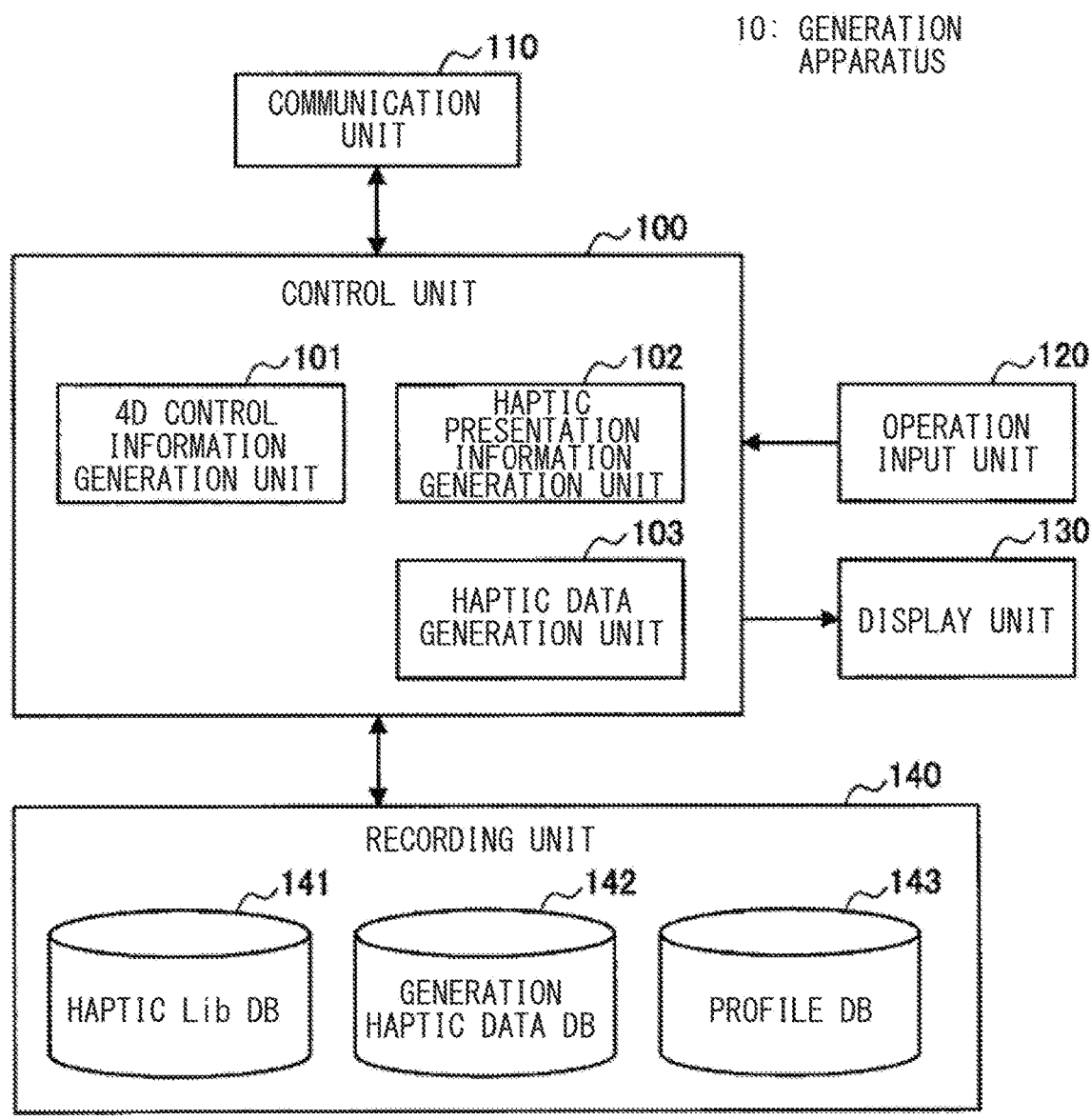

[FIG. 3]
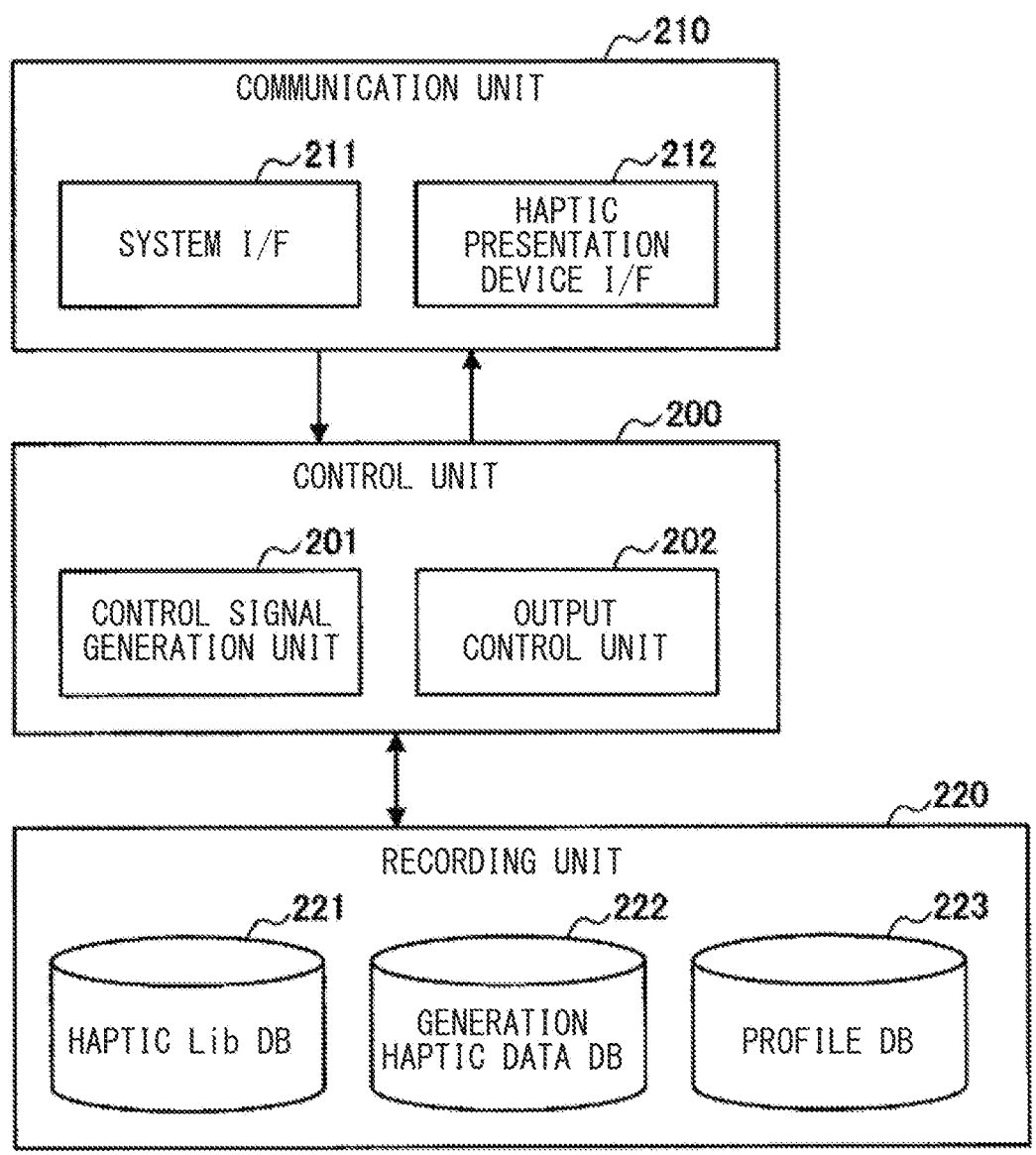

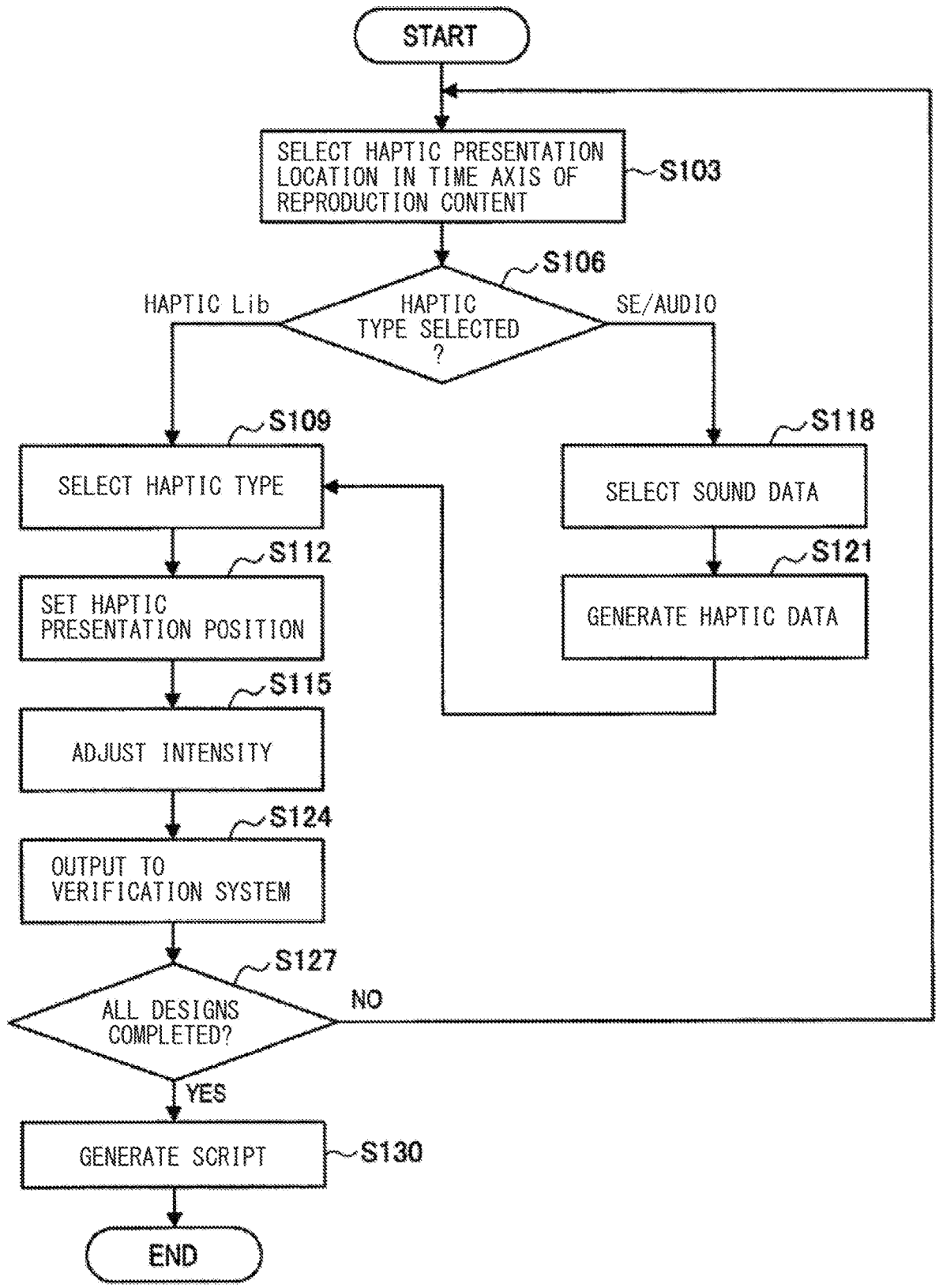
[FIG. 4]

[ FIG. 5 ]
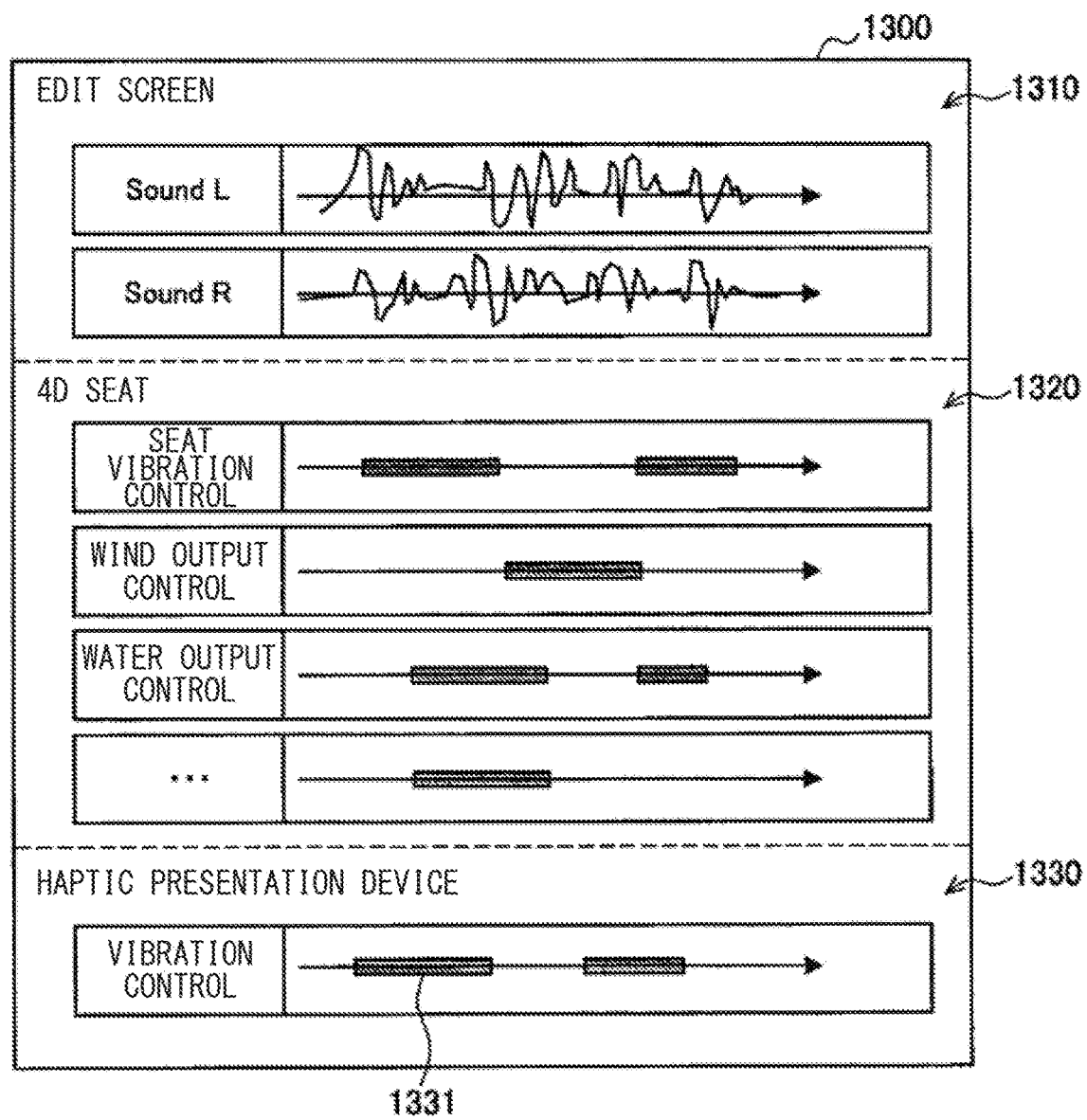

[FIG. 6]
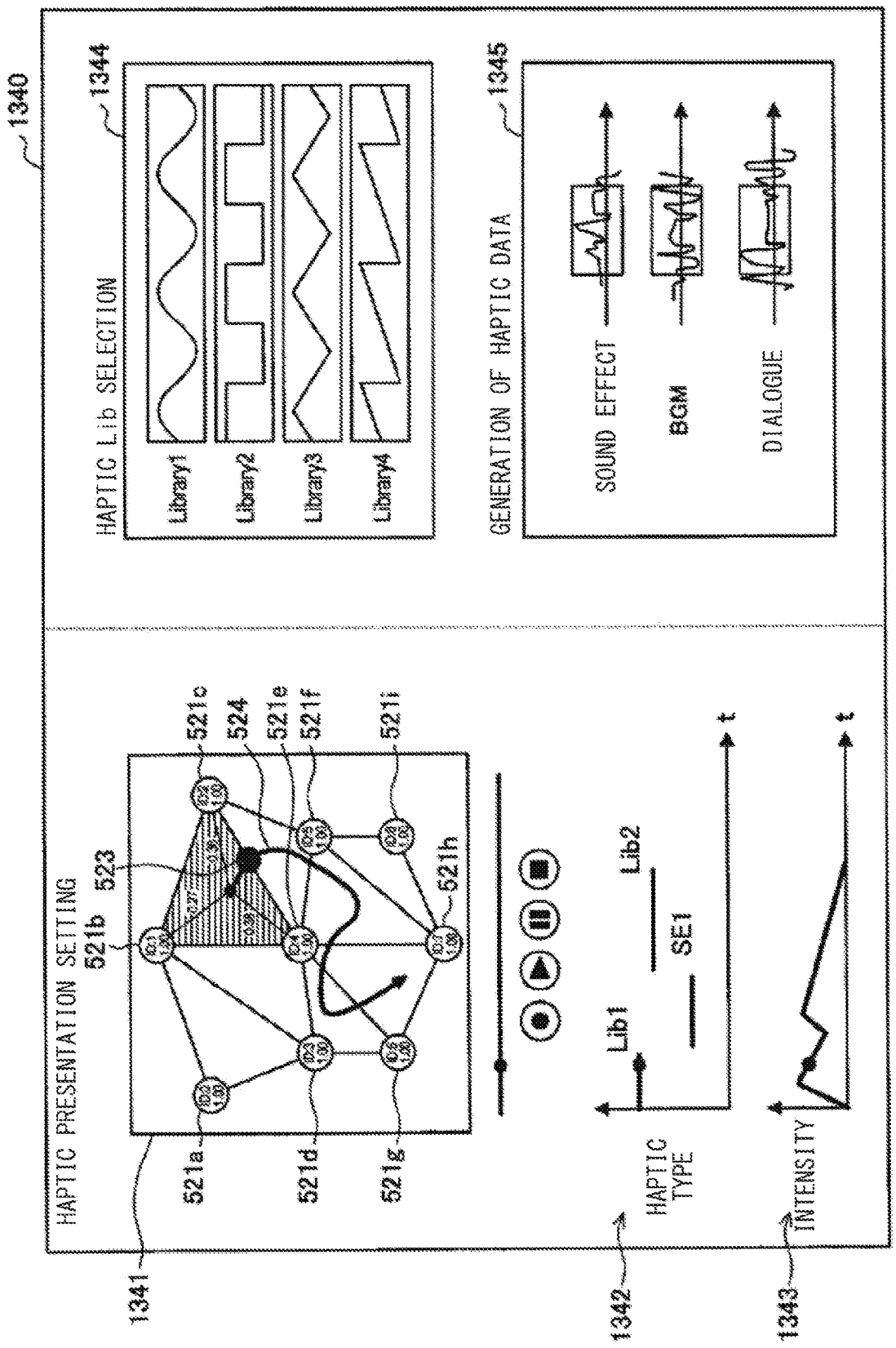

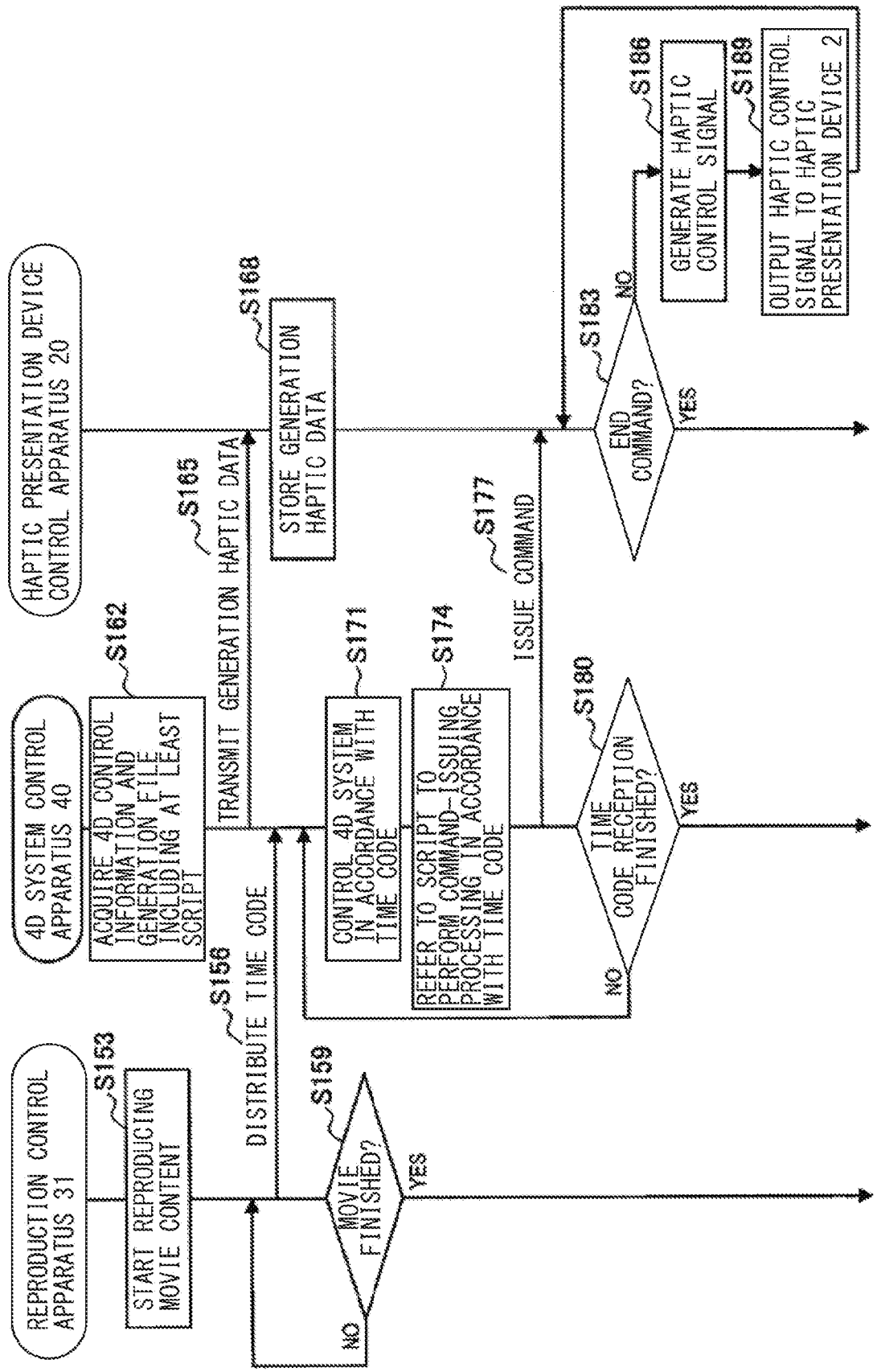
[FIG. 7]

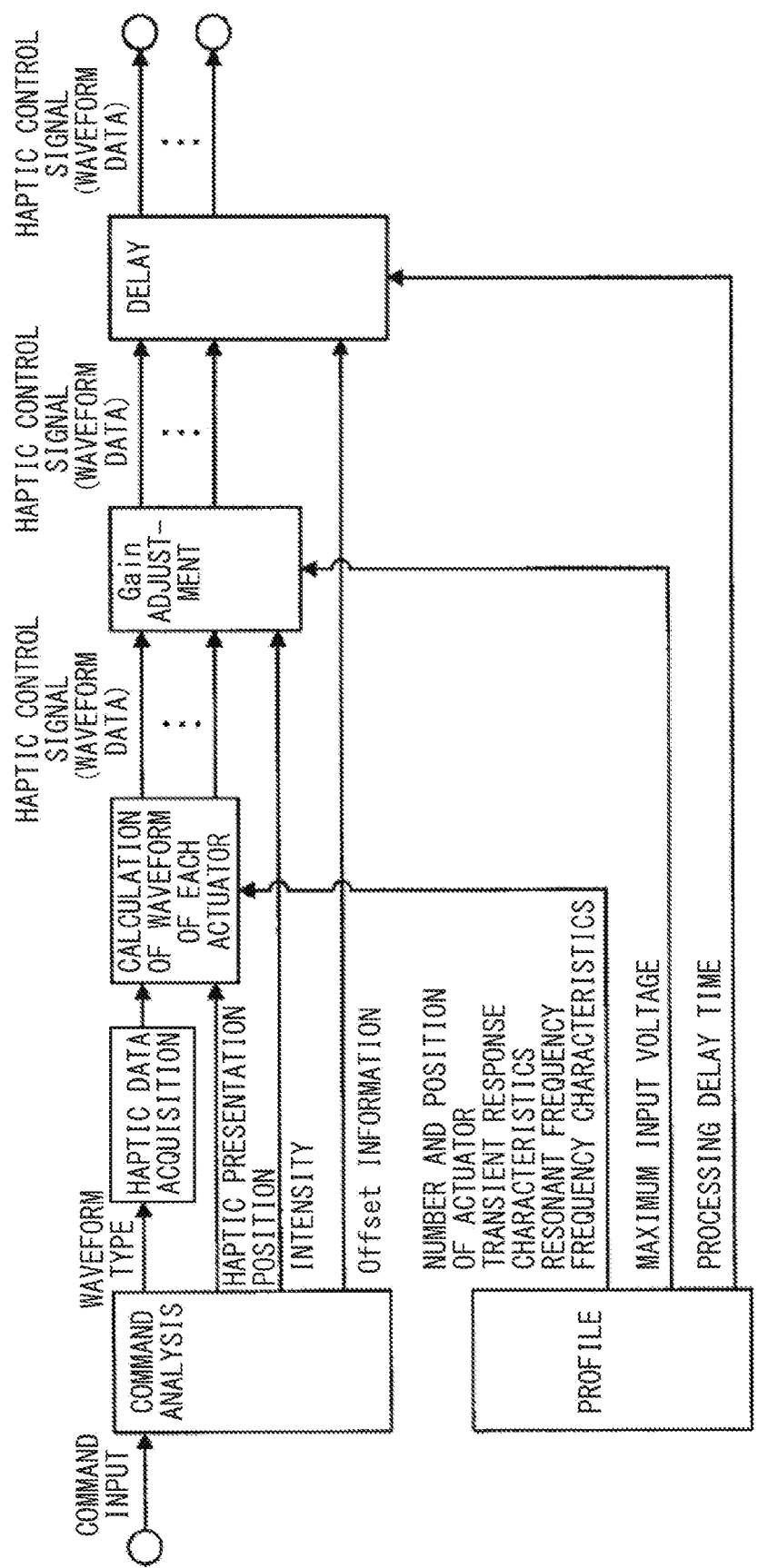
[FIG. 8]

[ FIG. 9 ]
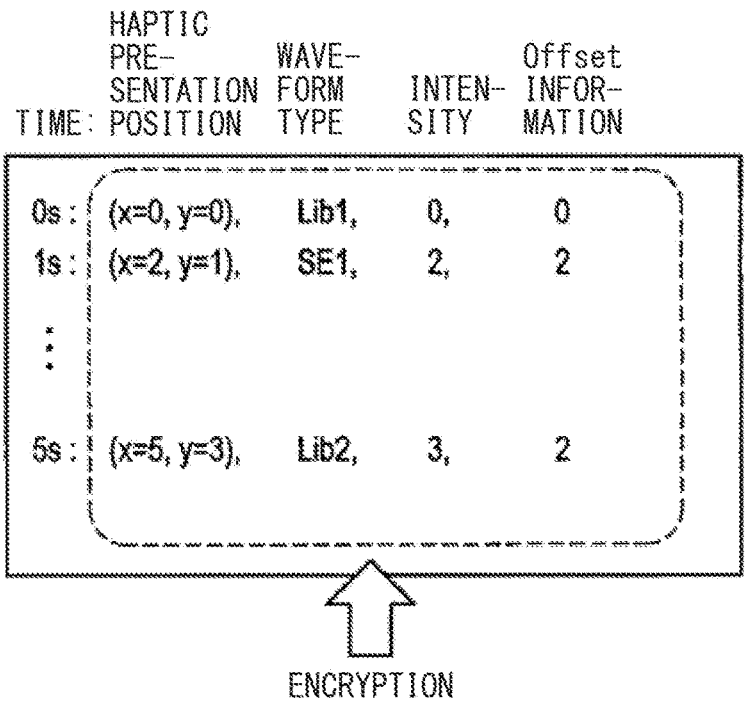
[ FIG. 10 ]
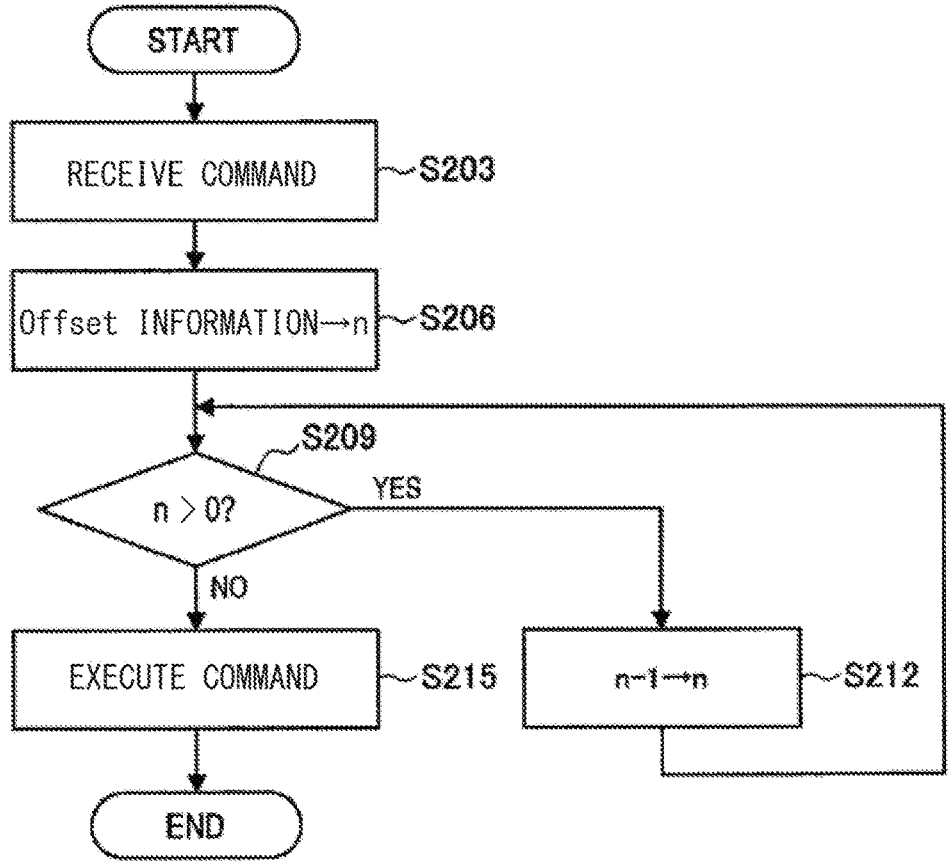

[FIG. 11]
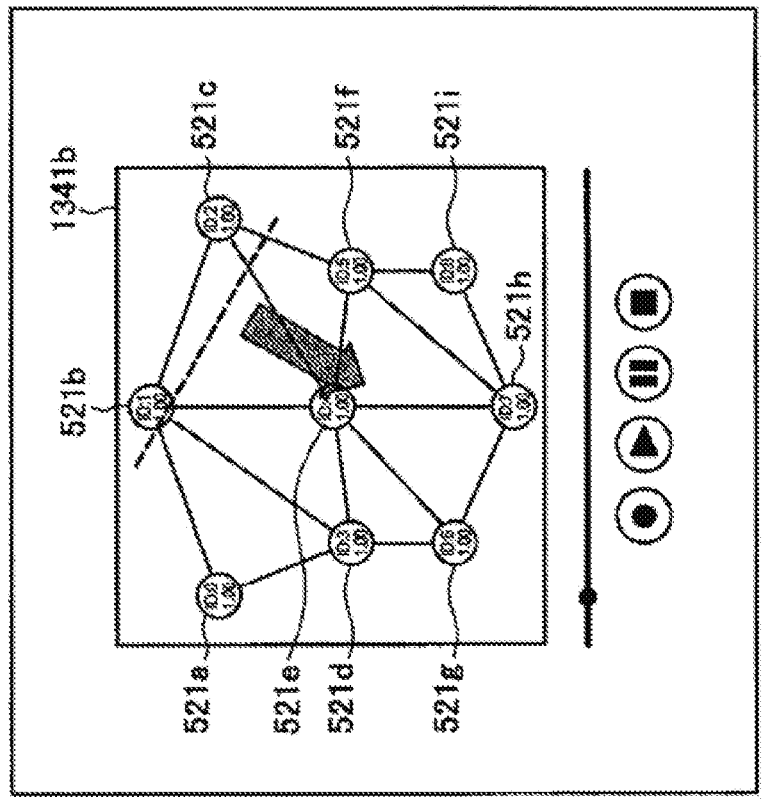
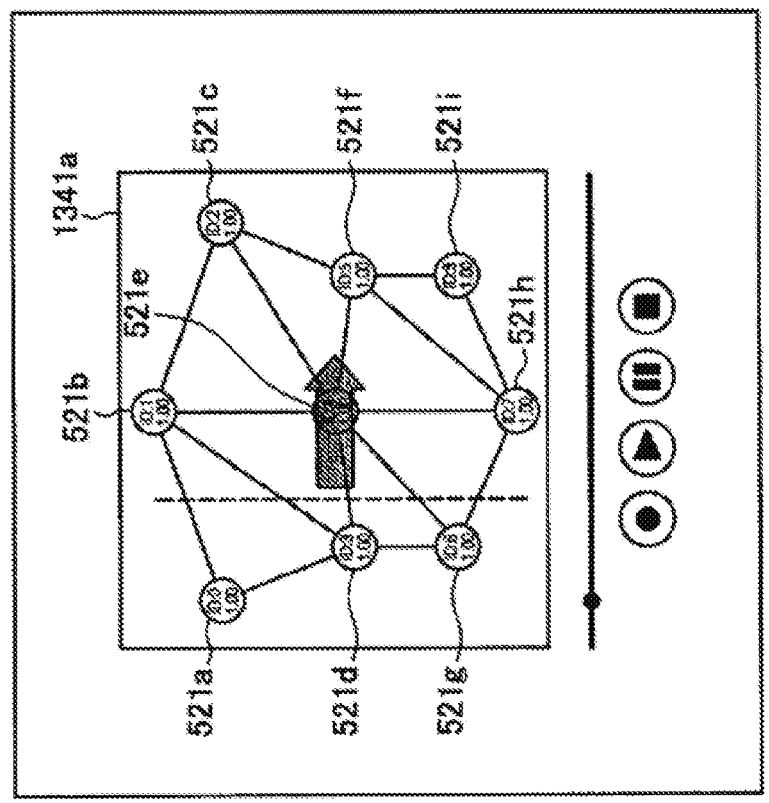

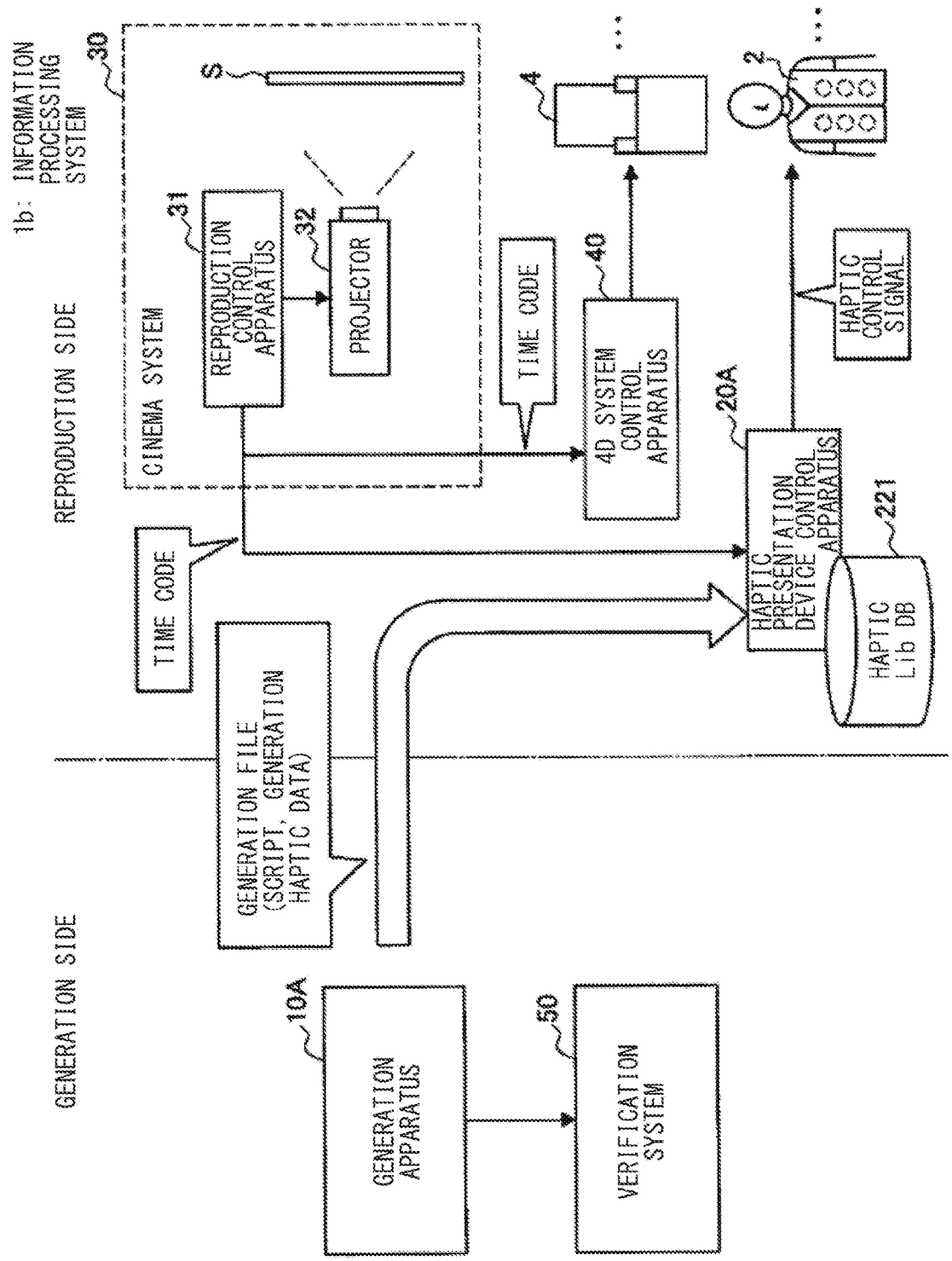
[FIG. 12]

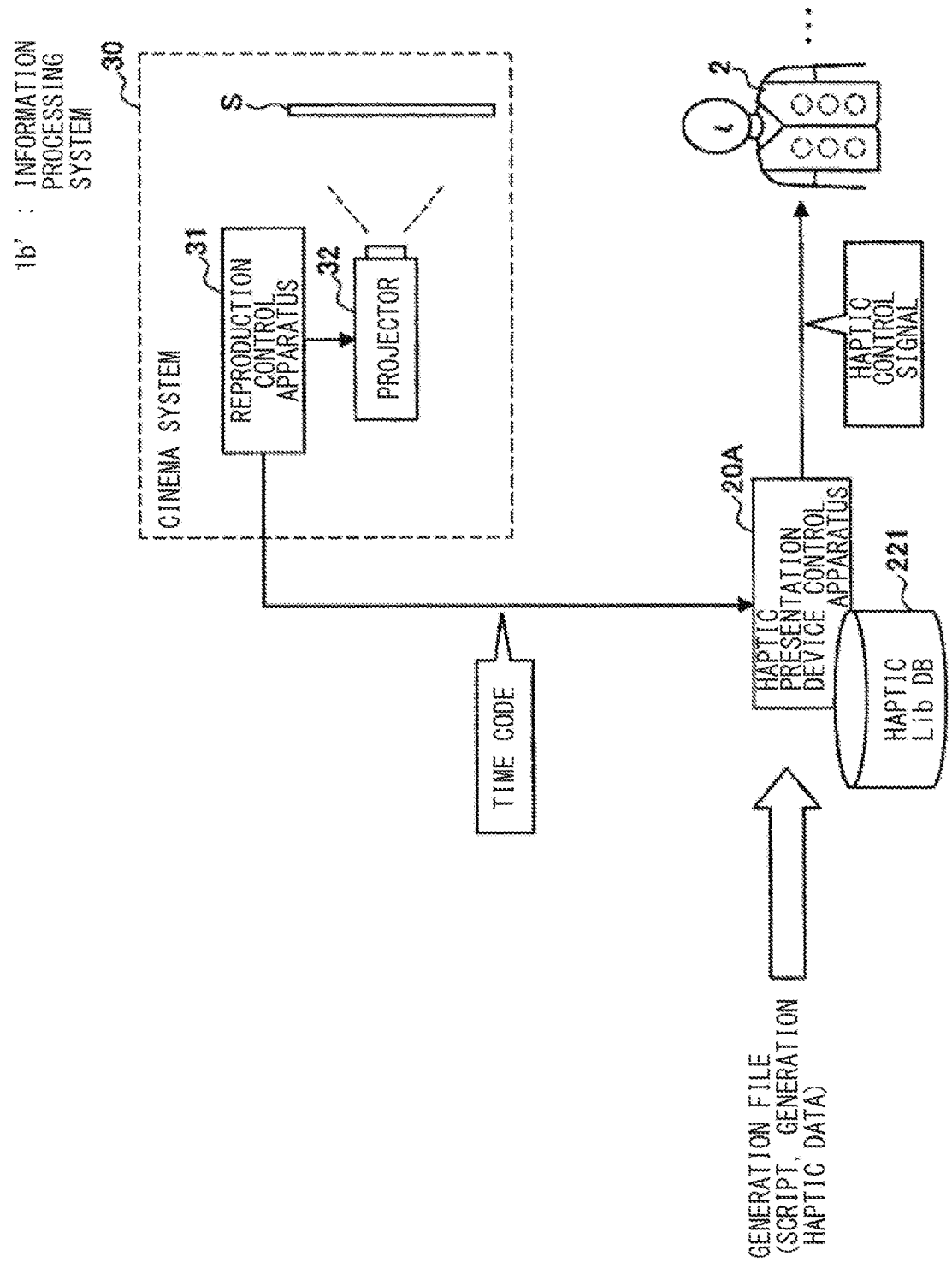
[FIG. 13]

[FIG. 14]
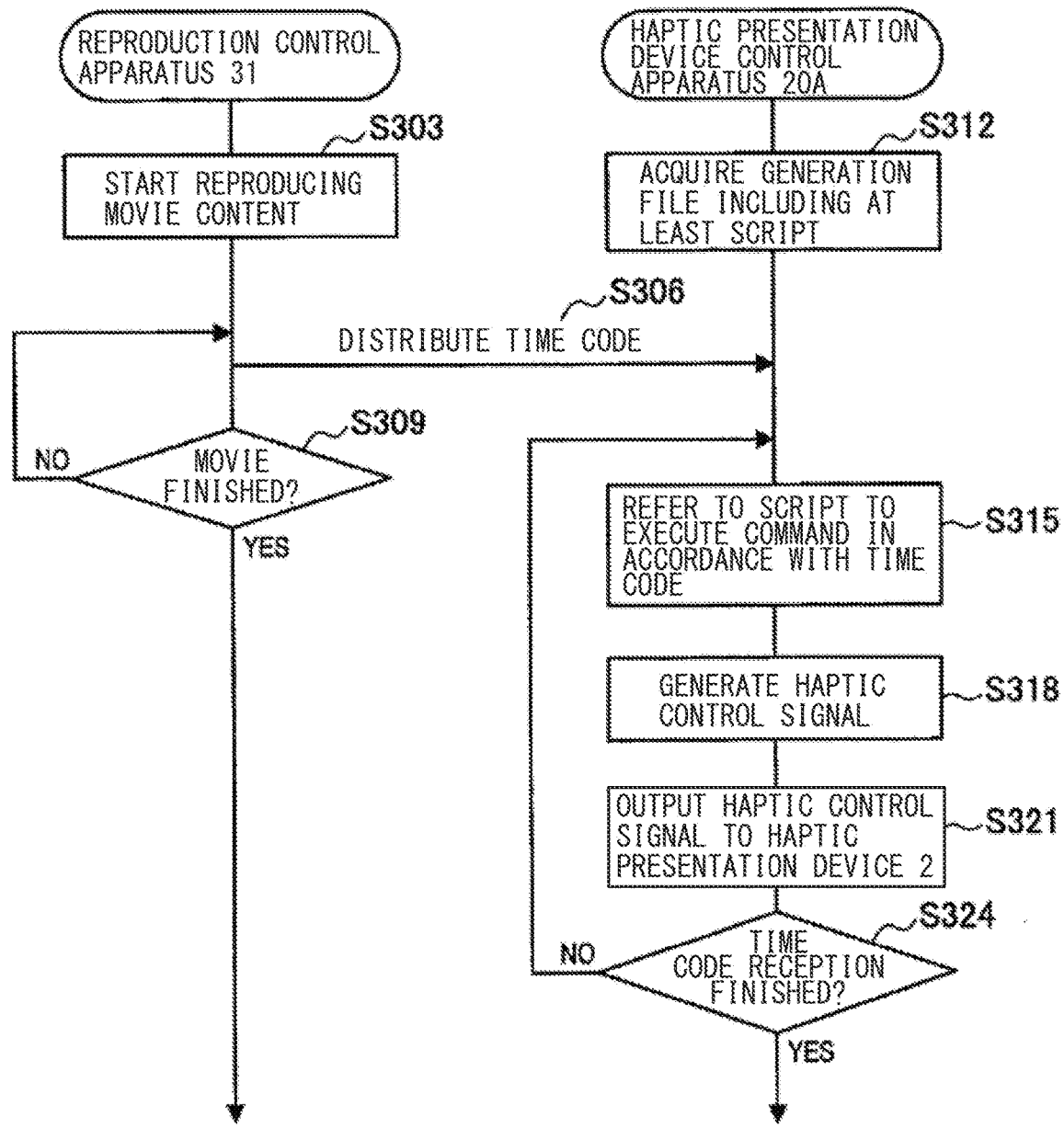

[ FIG. 15 ]
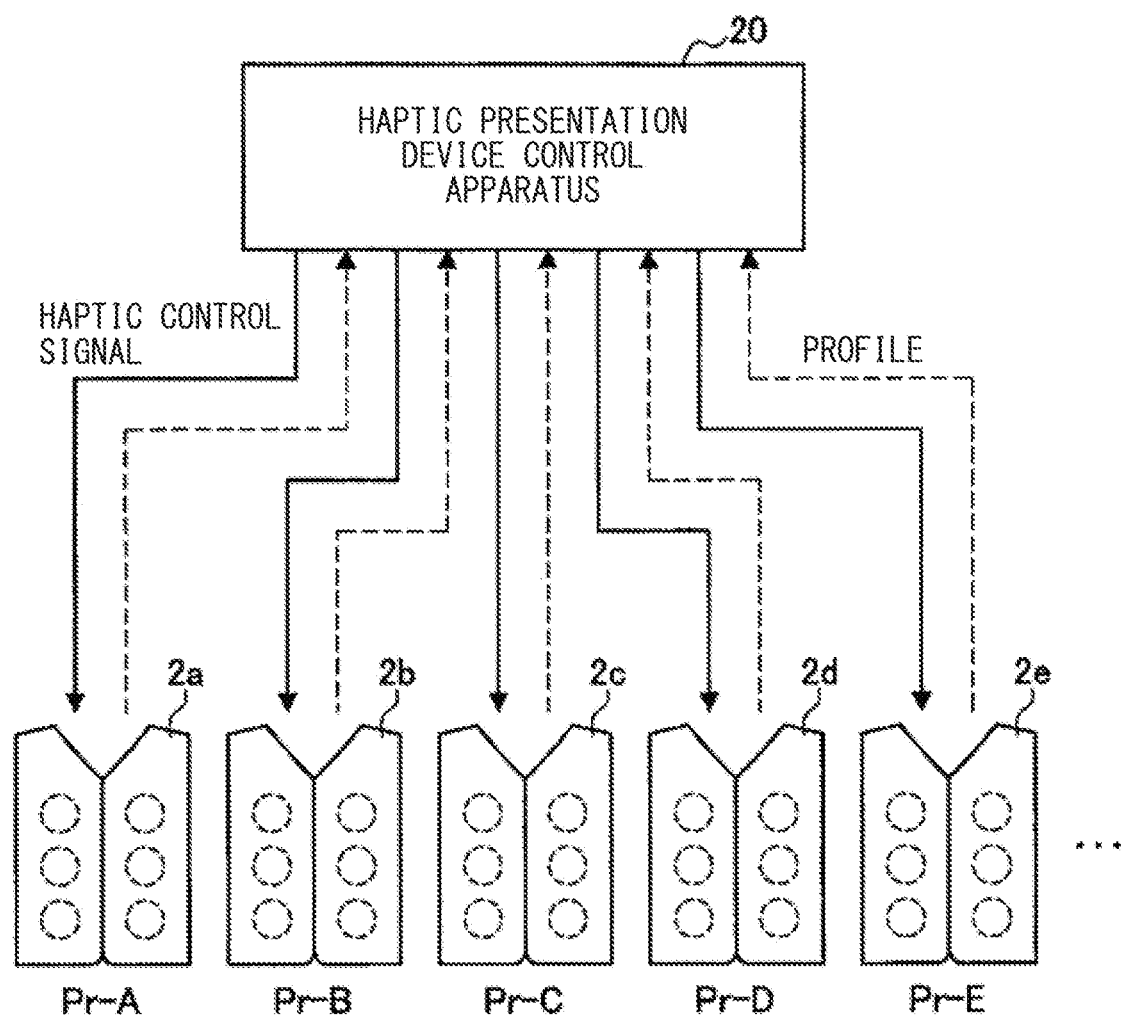

[ FIG. 16 ]
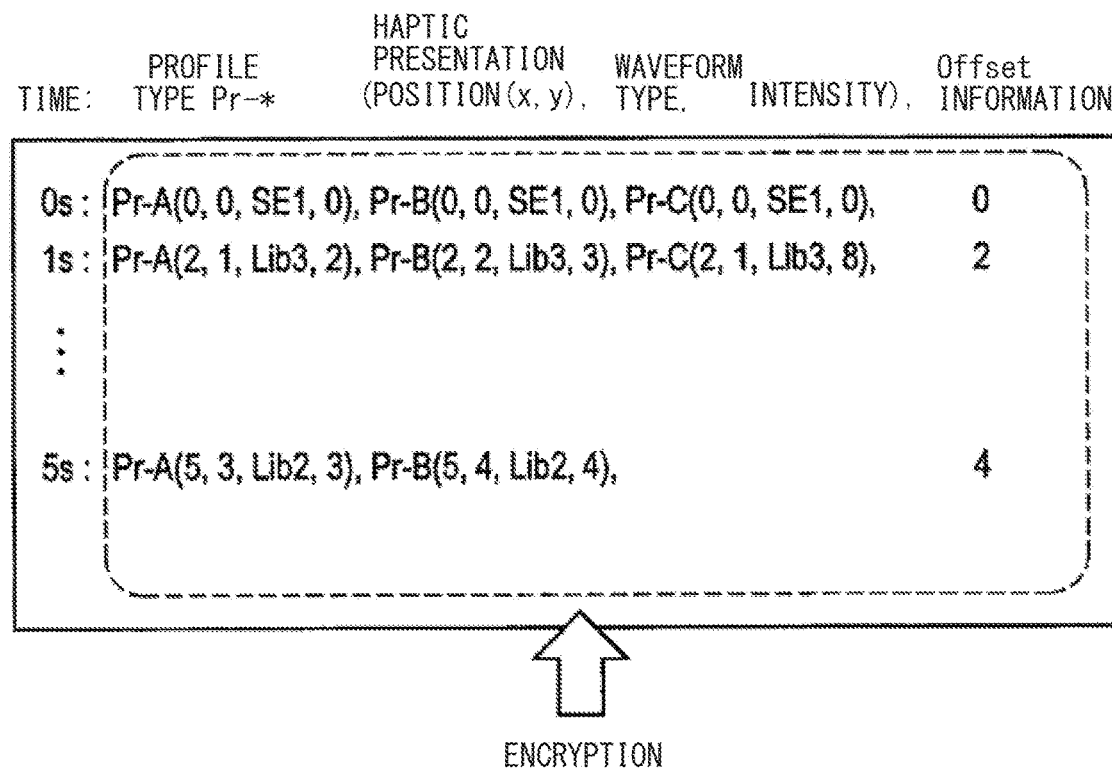
[ FIG. 17 ]
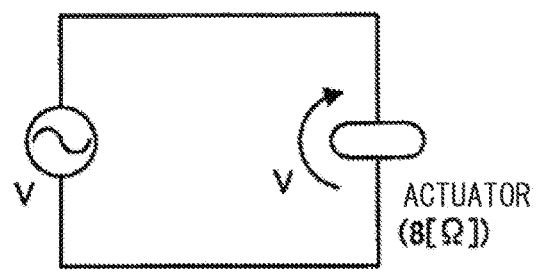
VIBRATION PRESENTATION DEVICE FOR ADULT
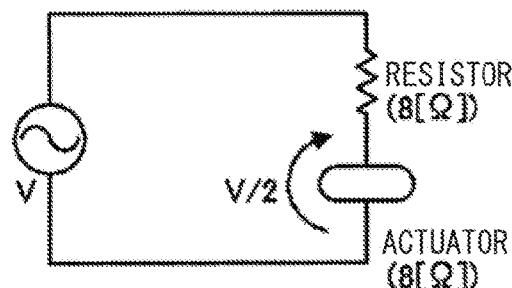
VIBRATION PRESENTATION DEVICE FOR CHILD

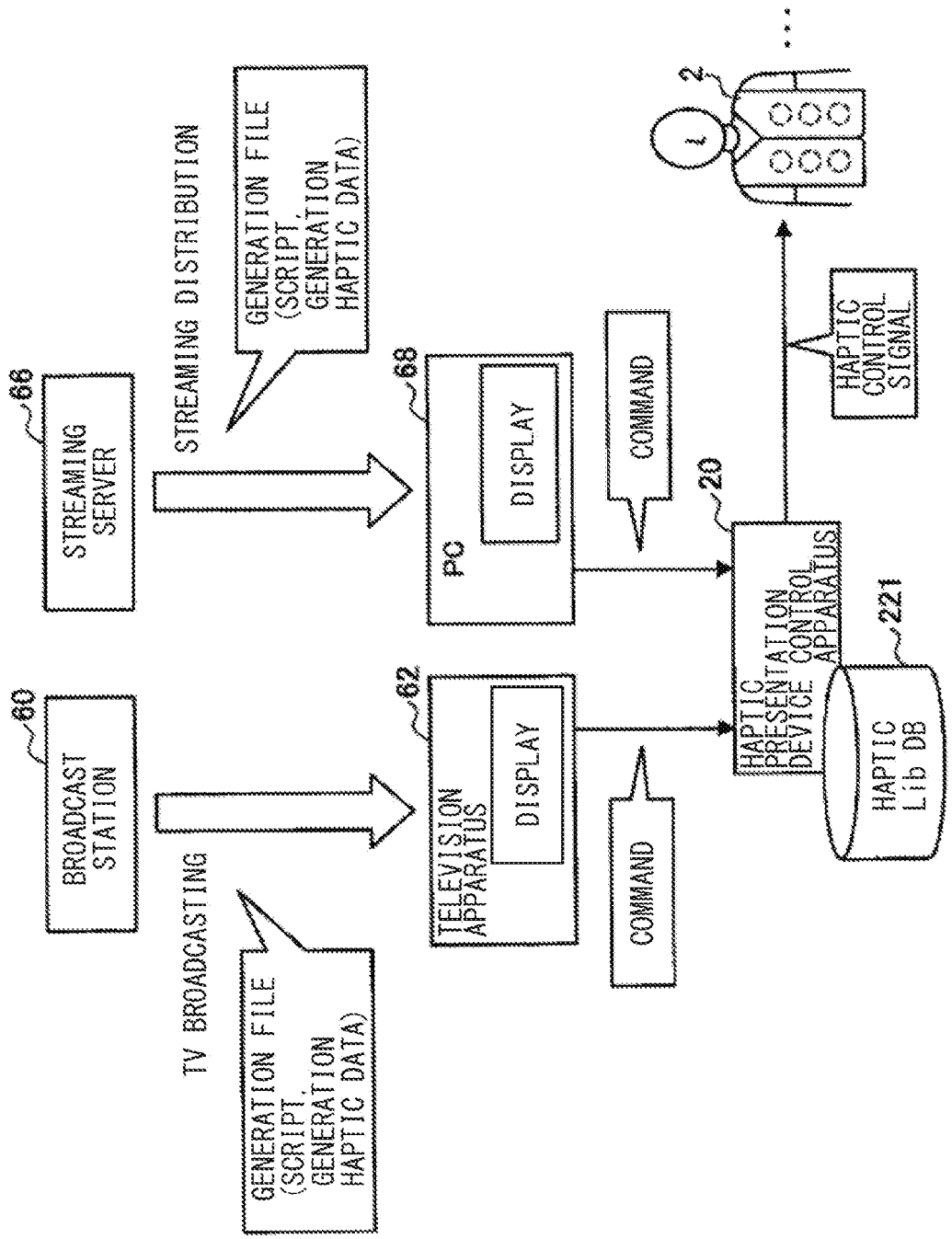
[FIG. 18]

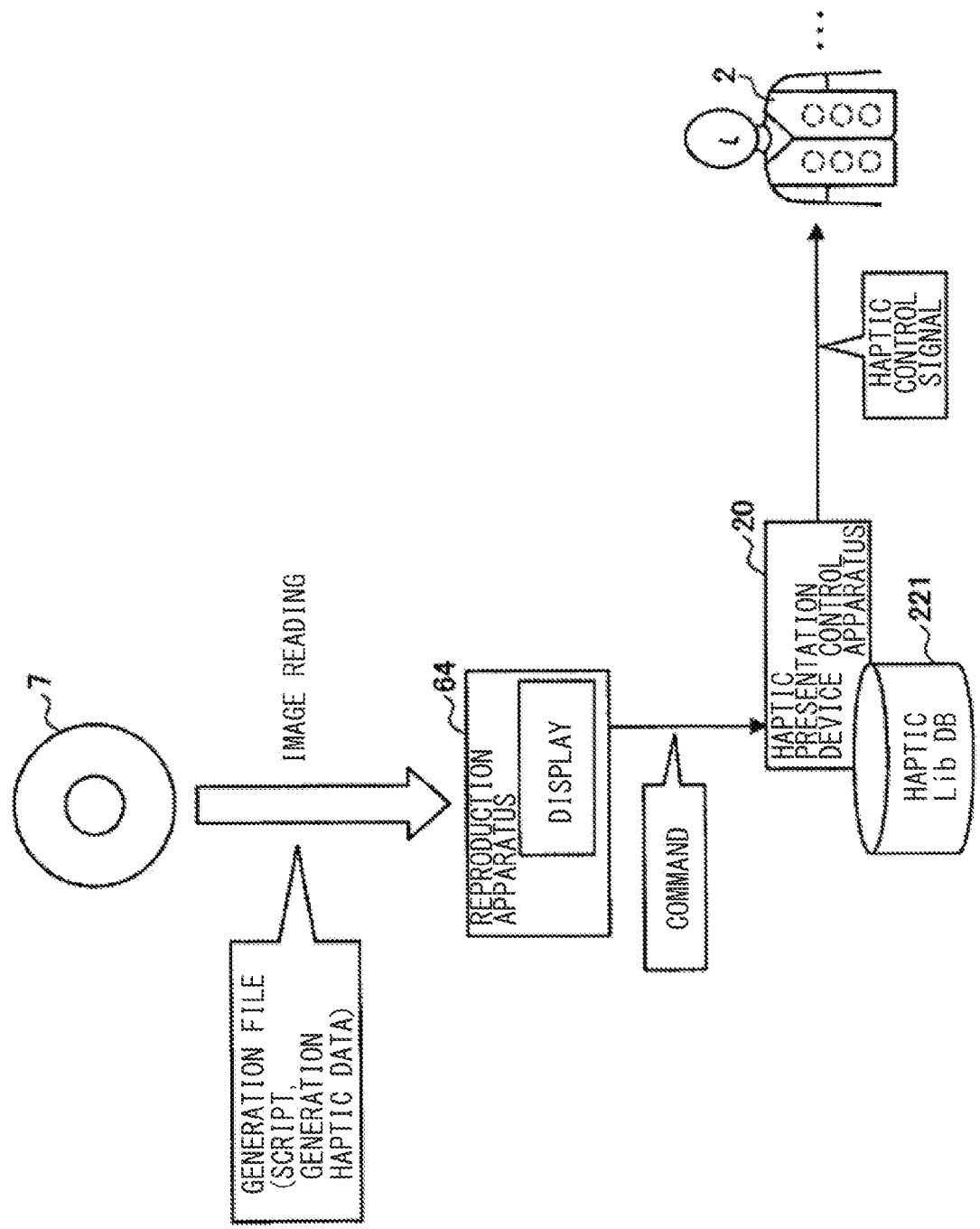

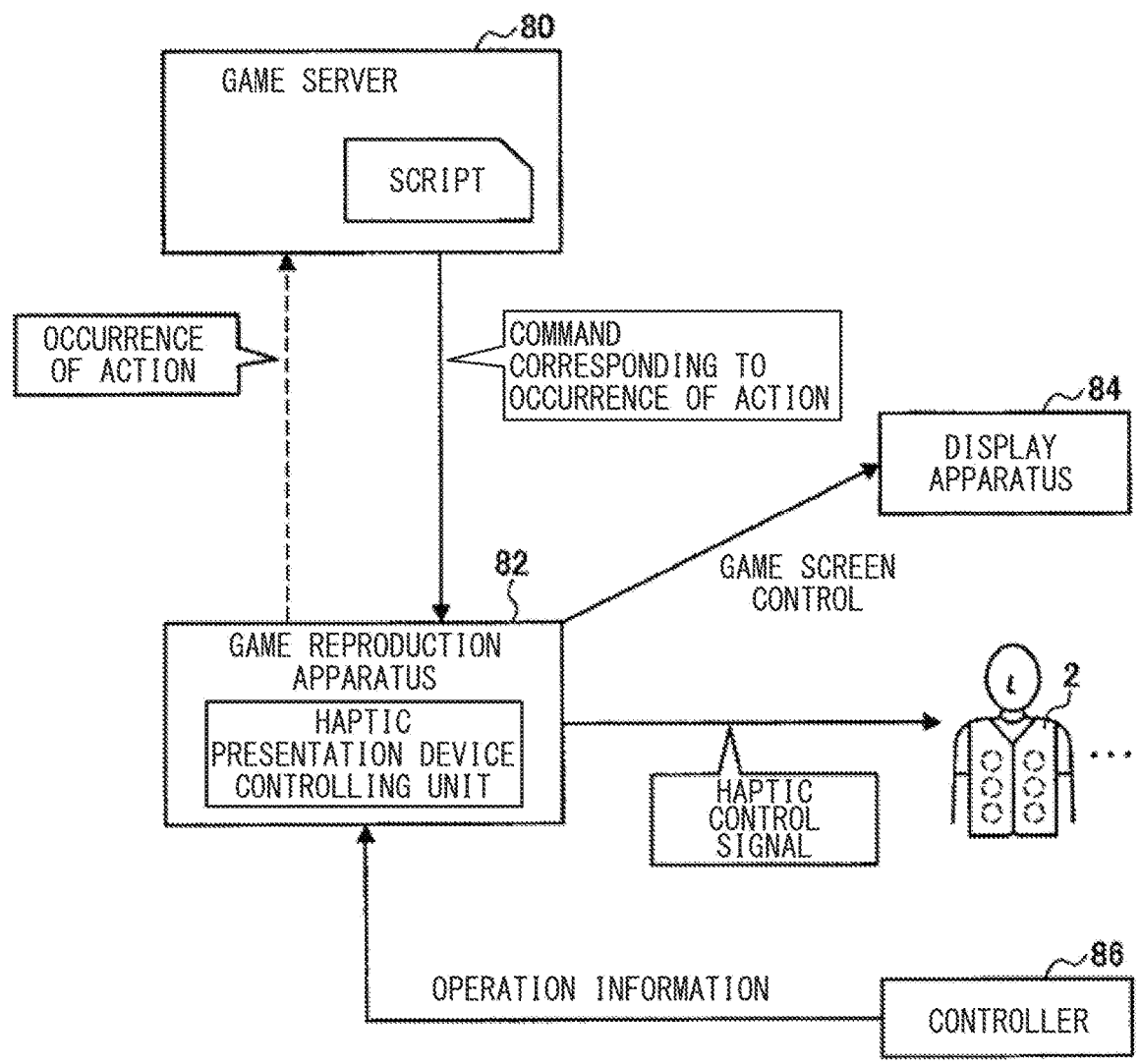
[ FIG. 20 ]

[ FIG. 21 ]
ENCRYPTION

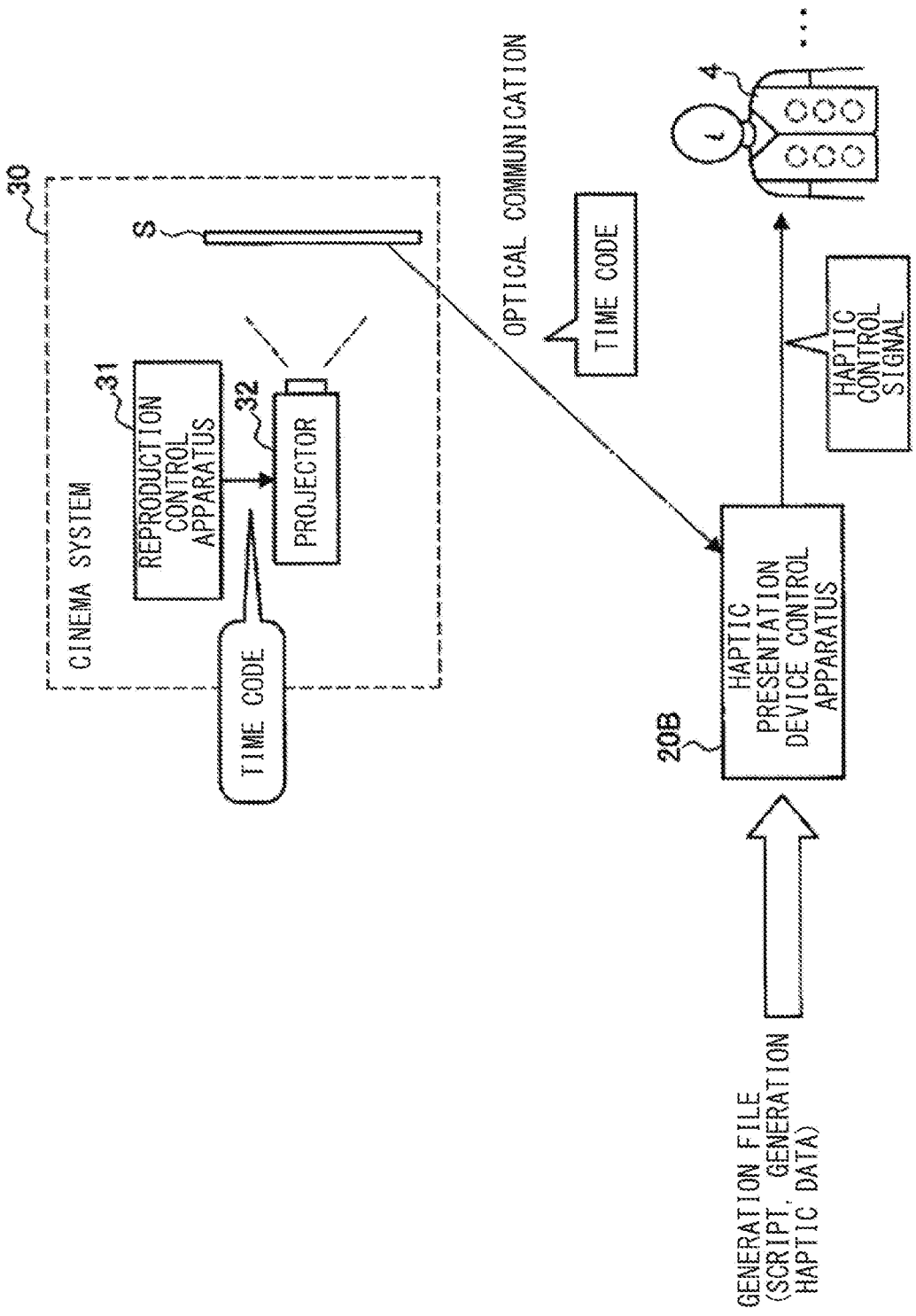
[FIG. 22]

[FIG. 23]
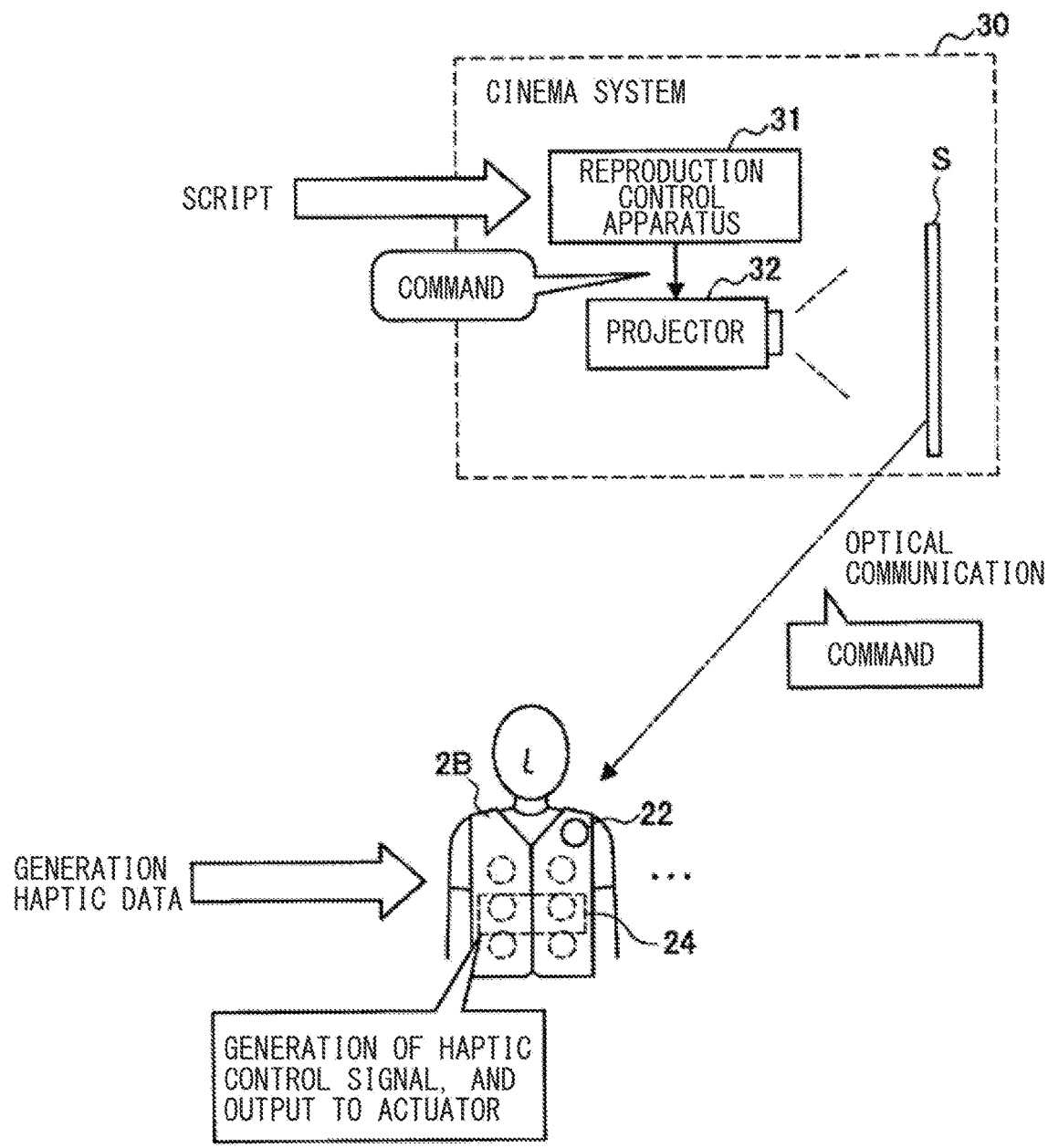

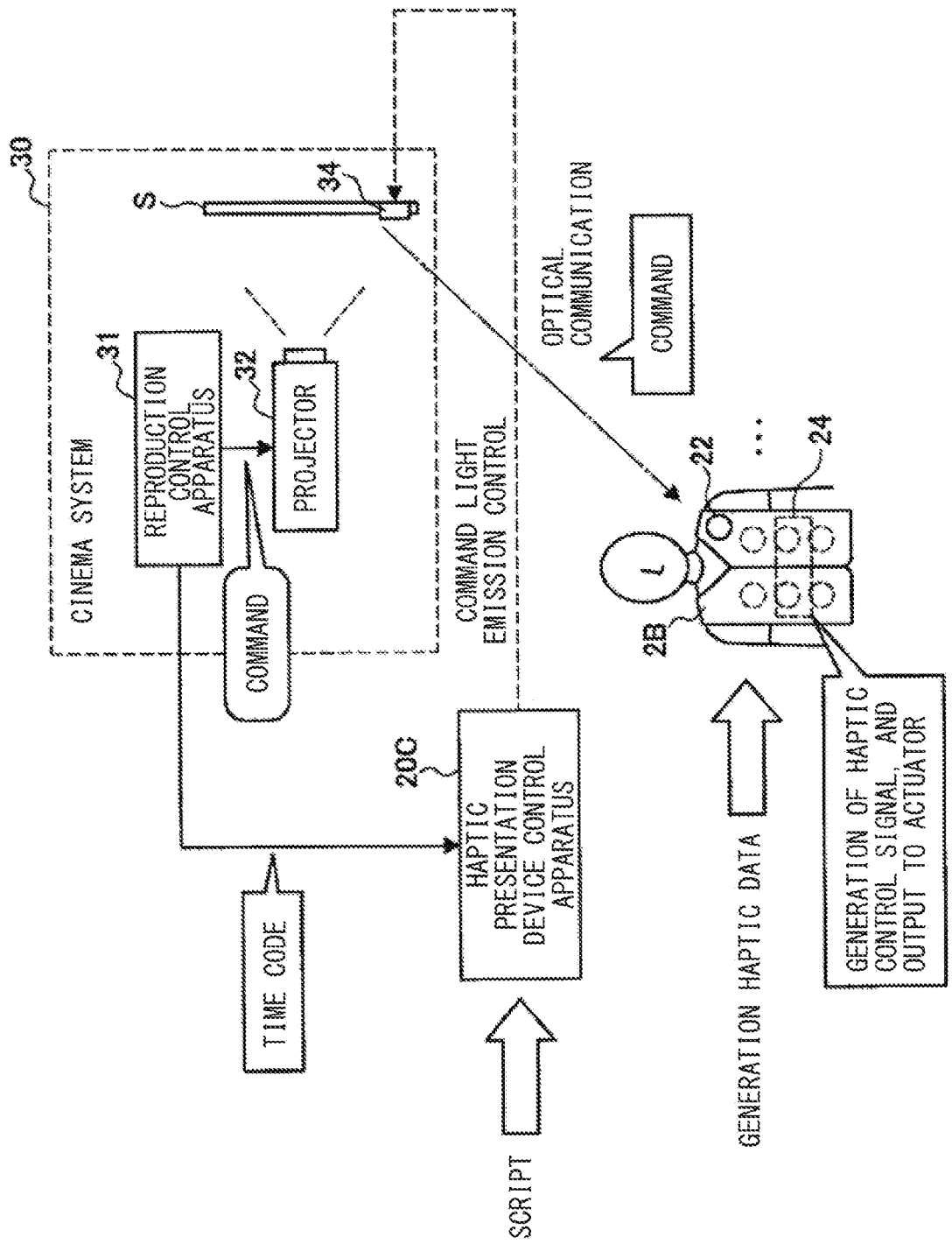
[FIG. 24]

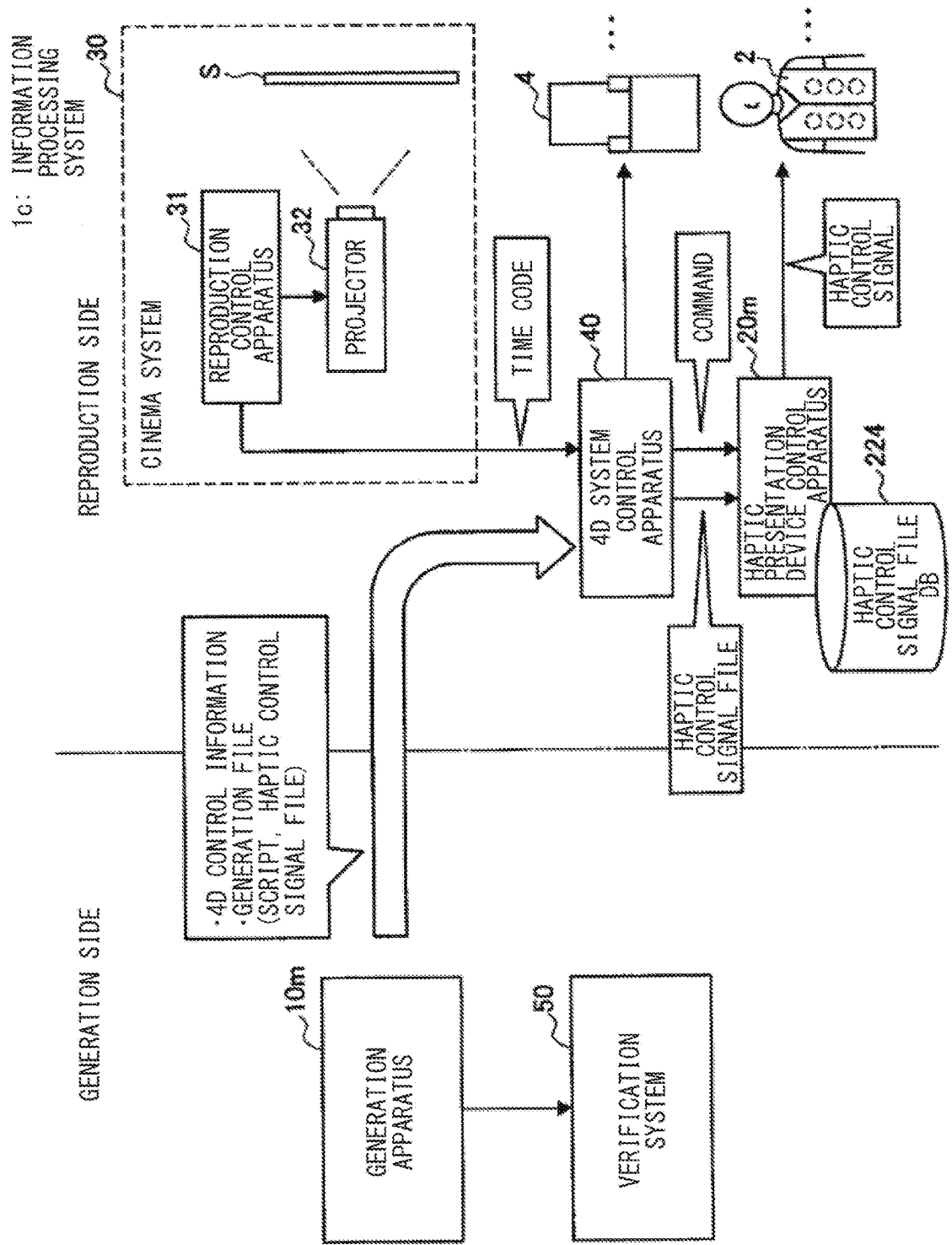
[FIG. 25]

[FIG. 26]
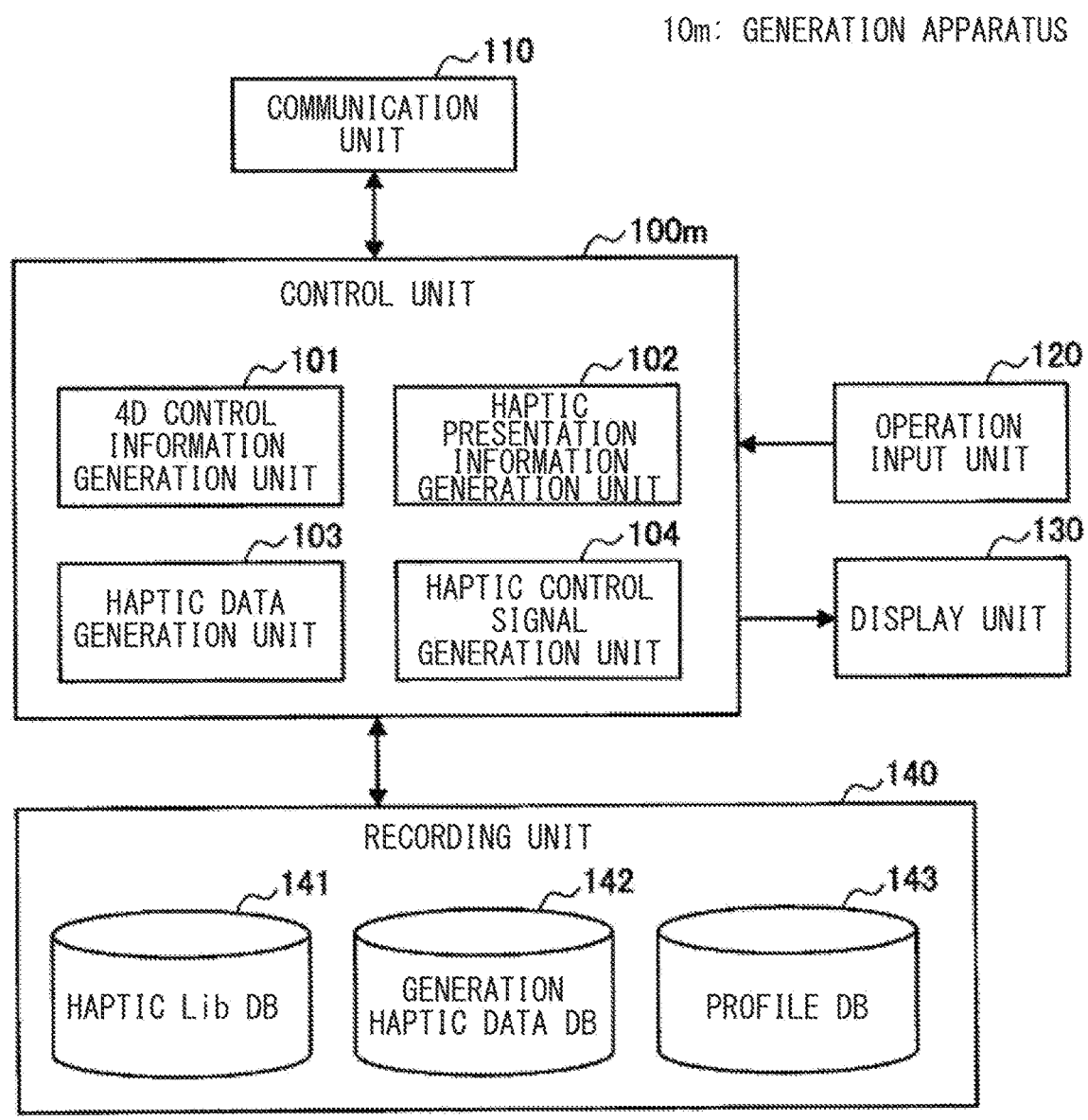

[FIG. 27]
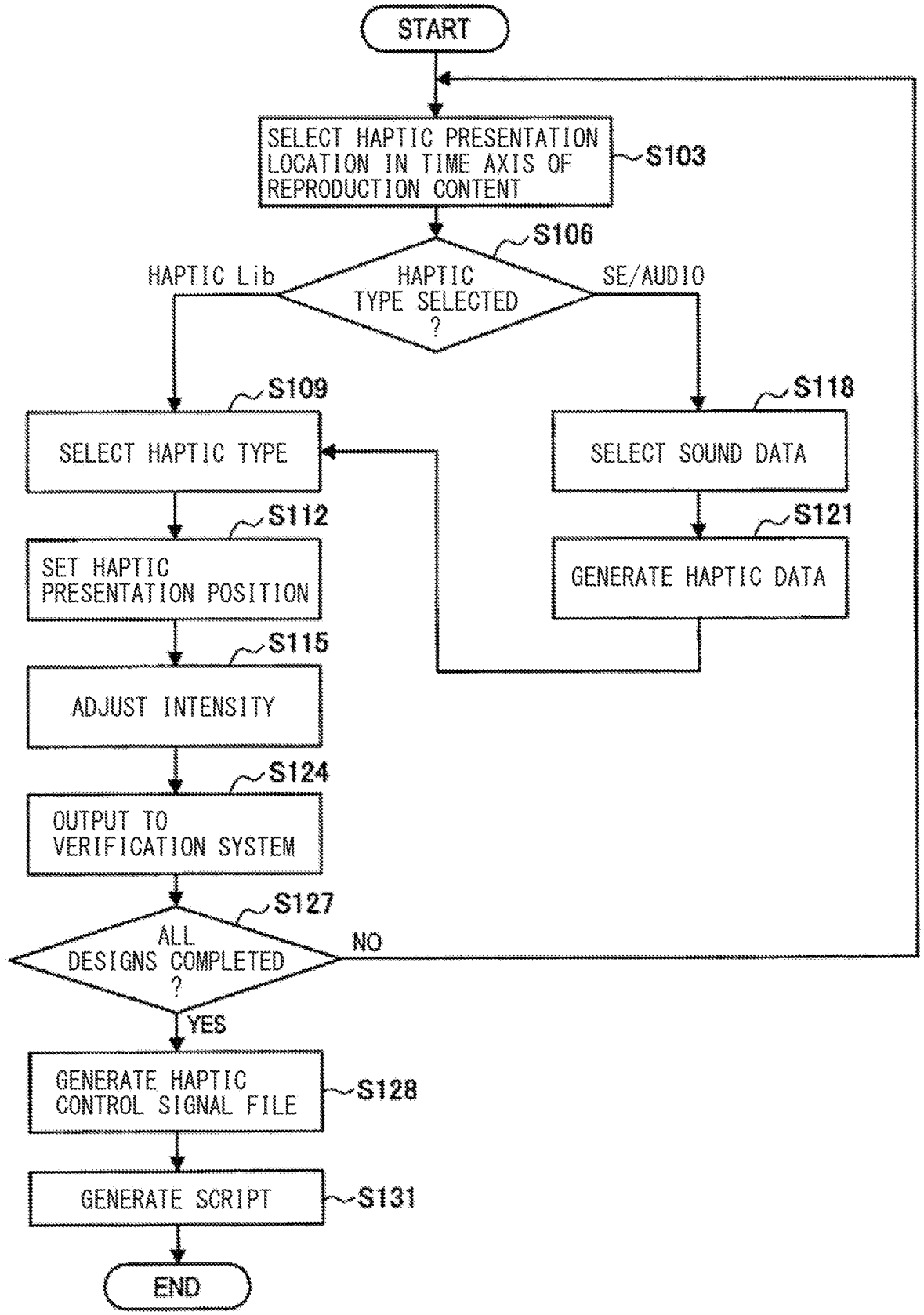

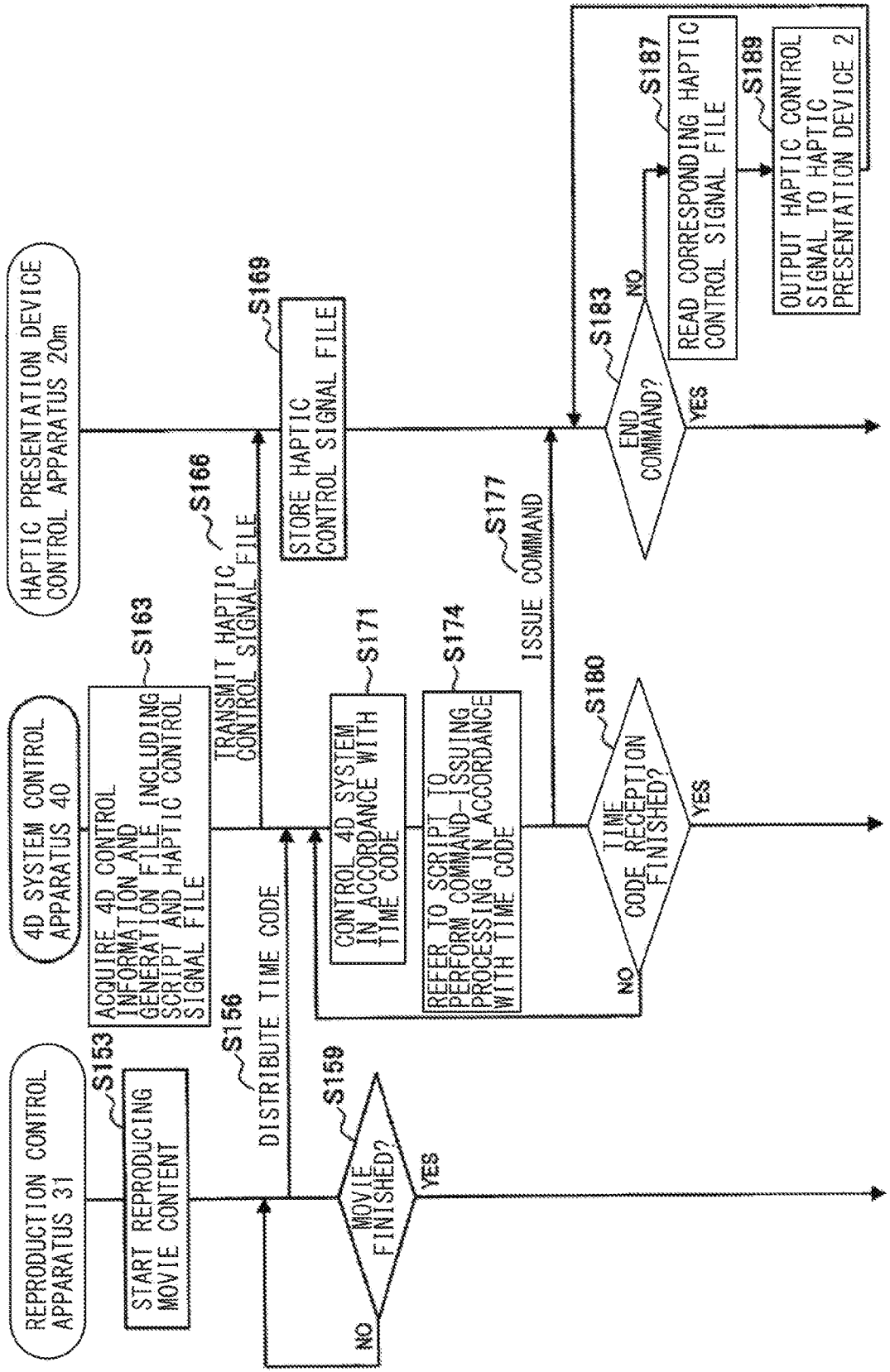
[FIG. 28]

[ FIG. 29 ]
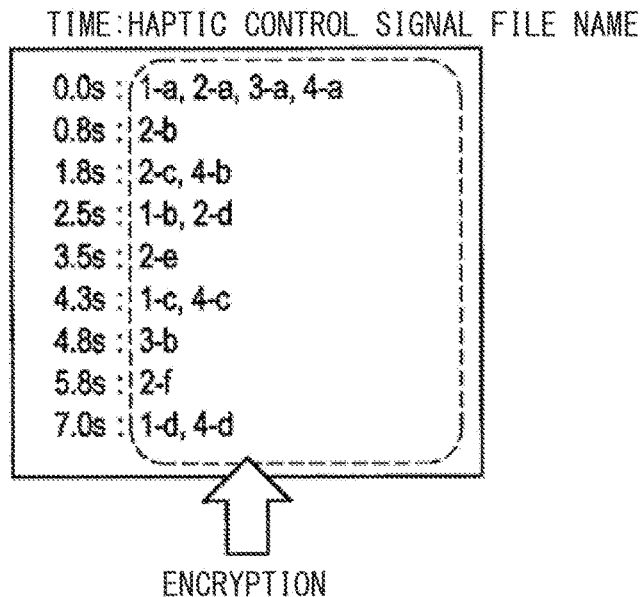
[ FIG. 30 ]
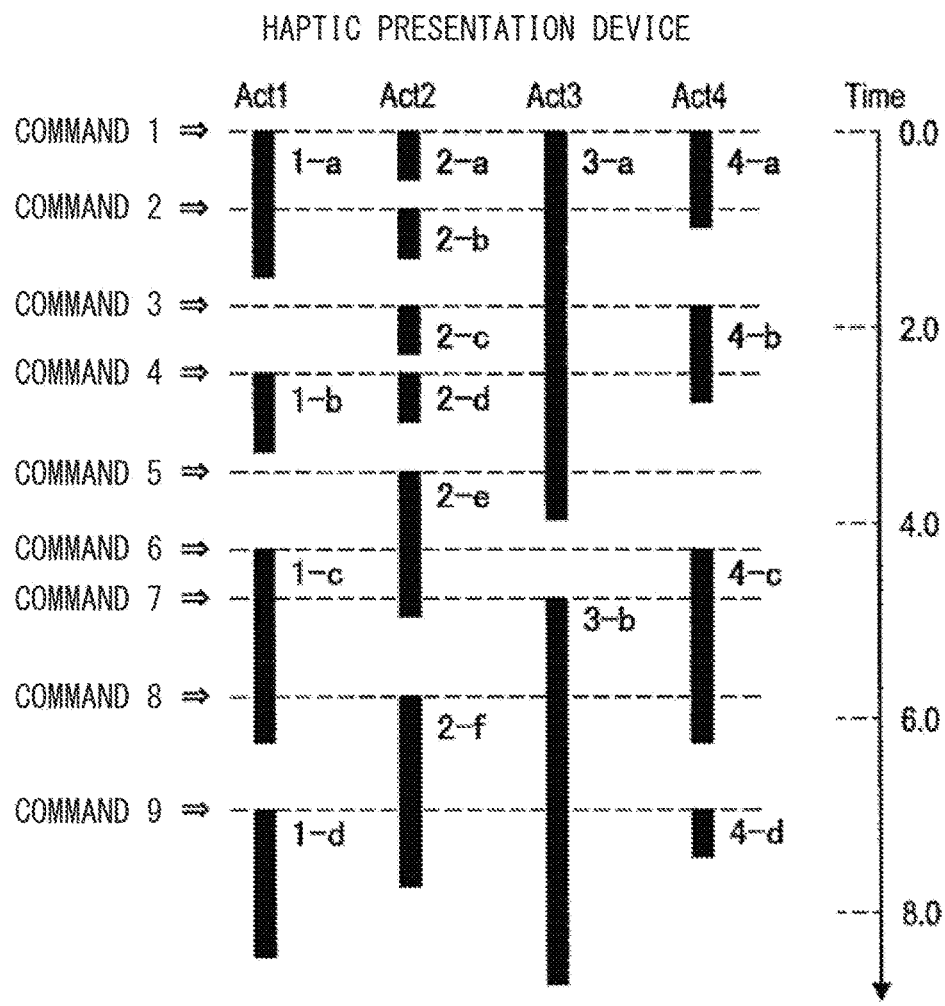

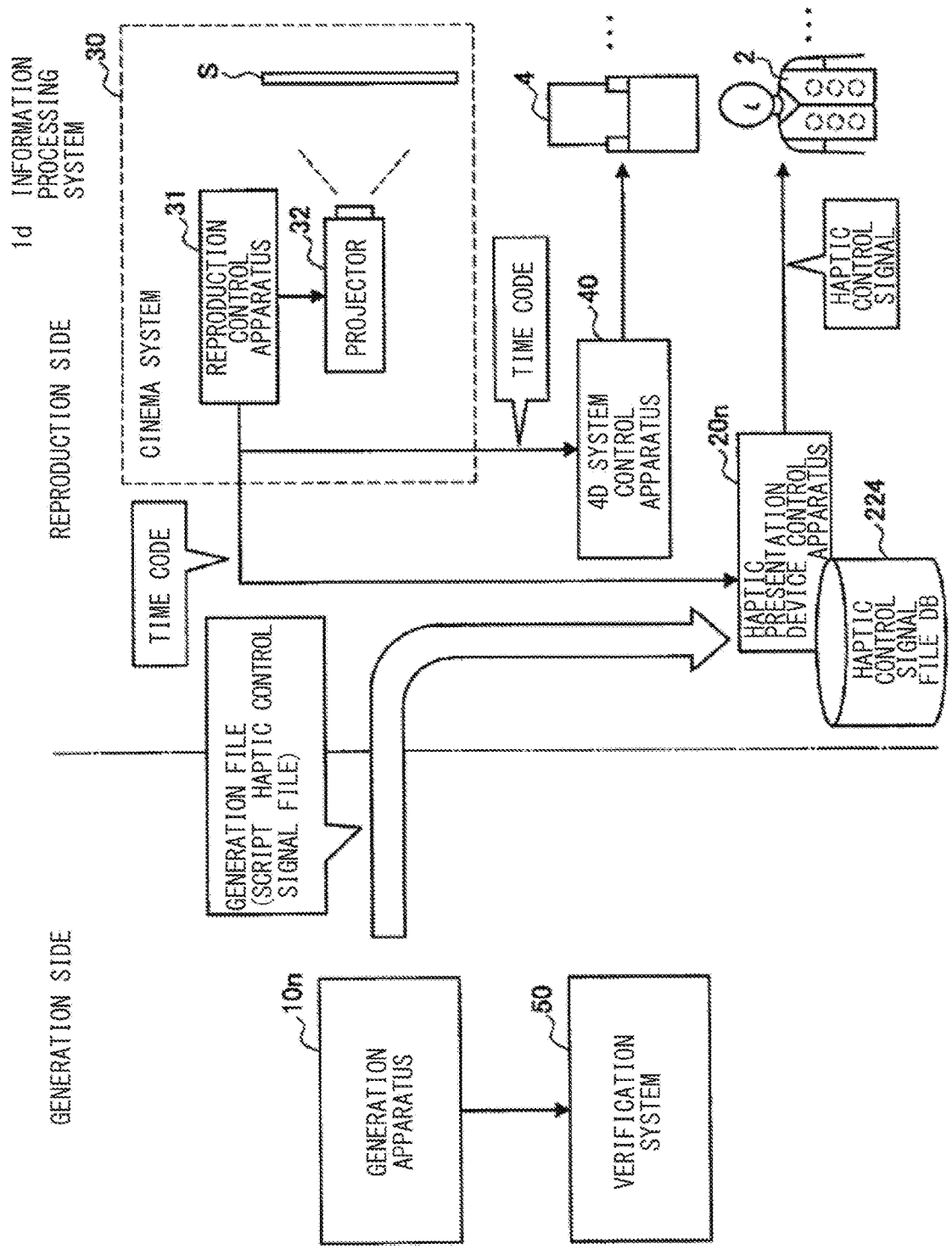
[FIG. 31]

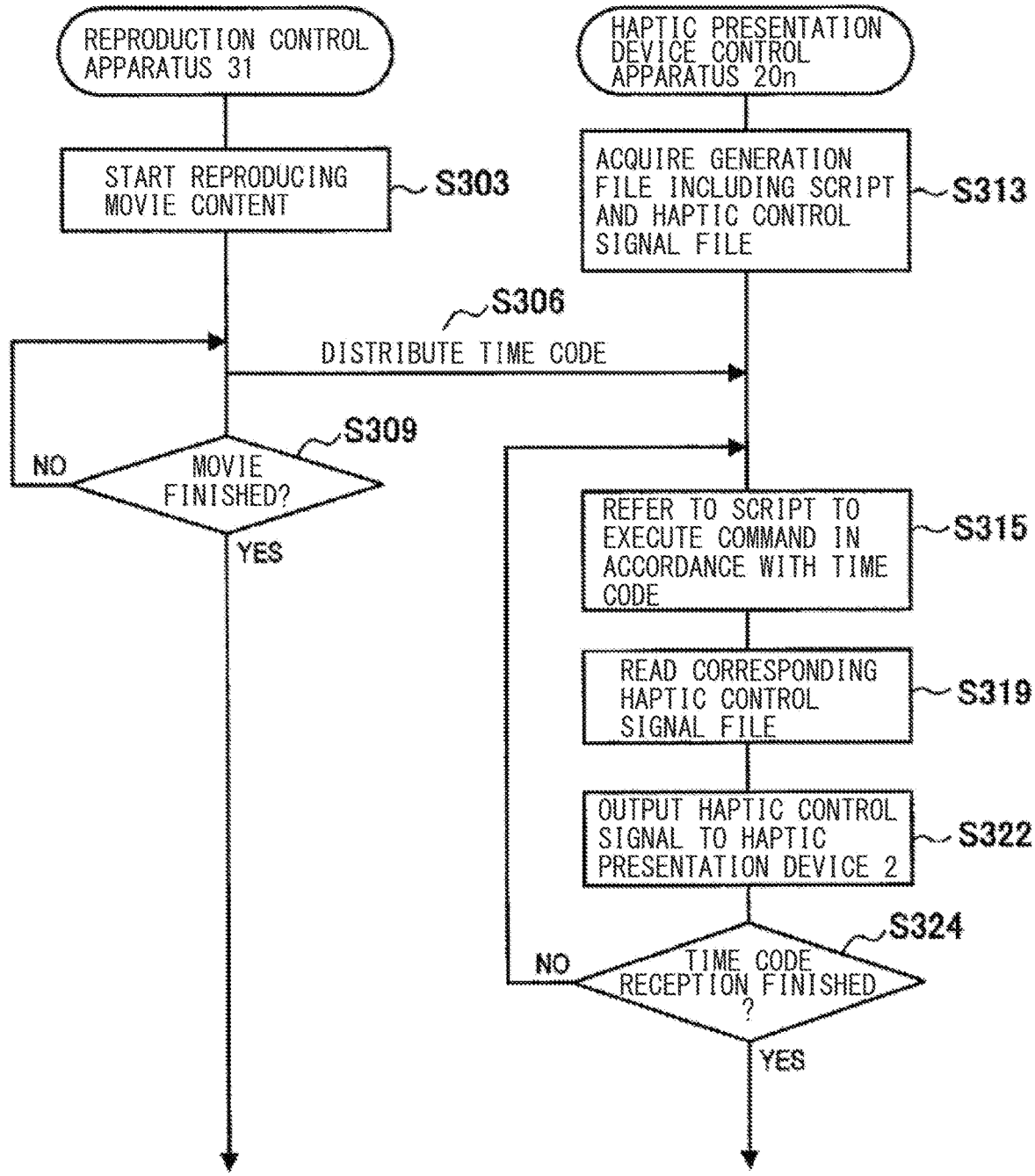
[FIG. 32]

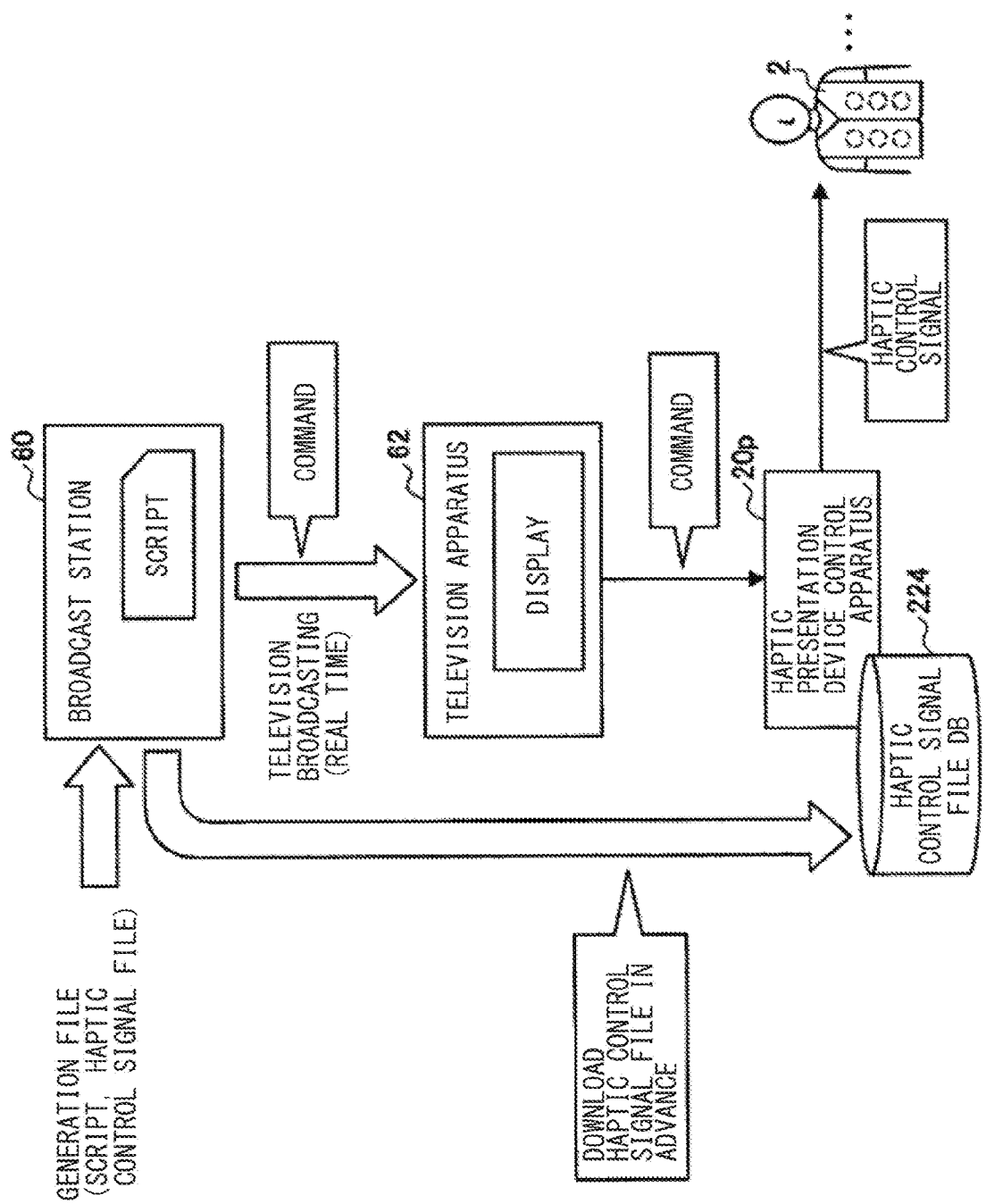
[FIG. 33]

[FIG. 34]
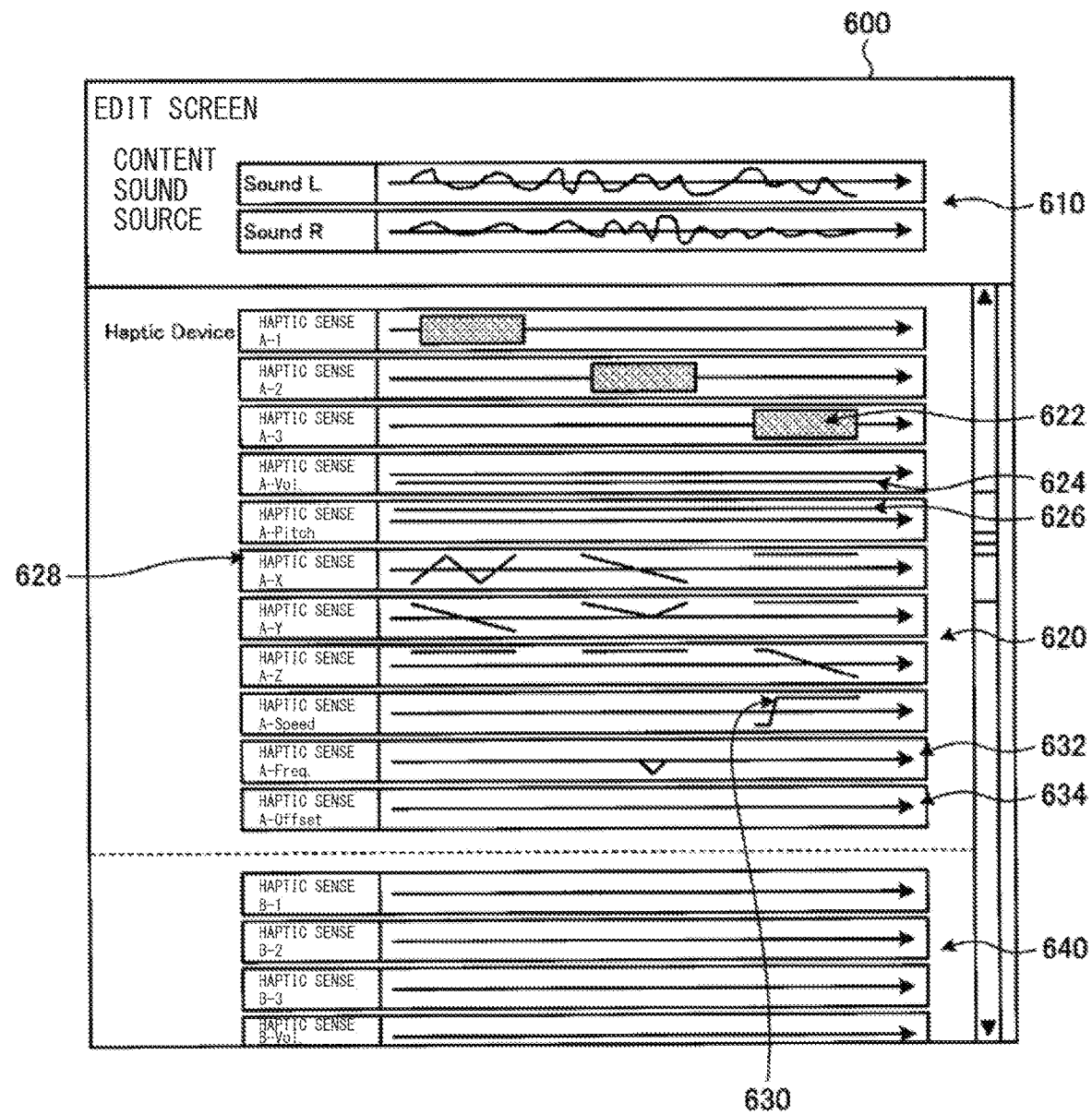

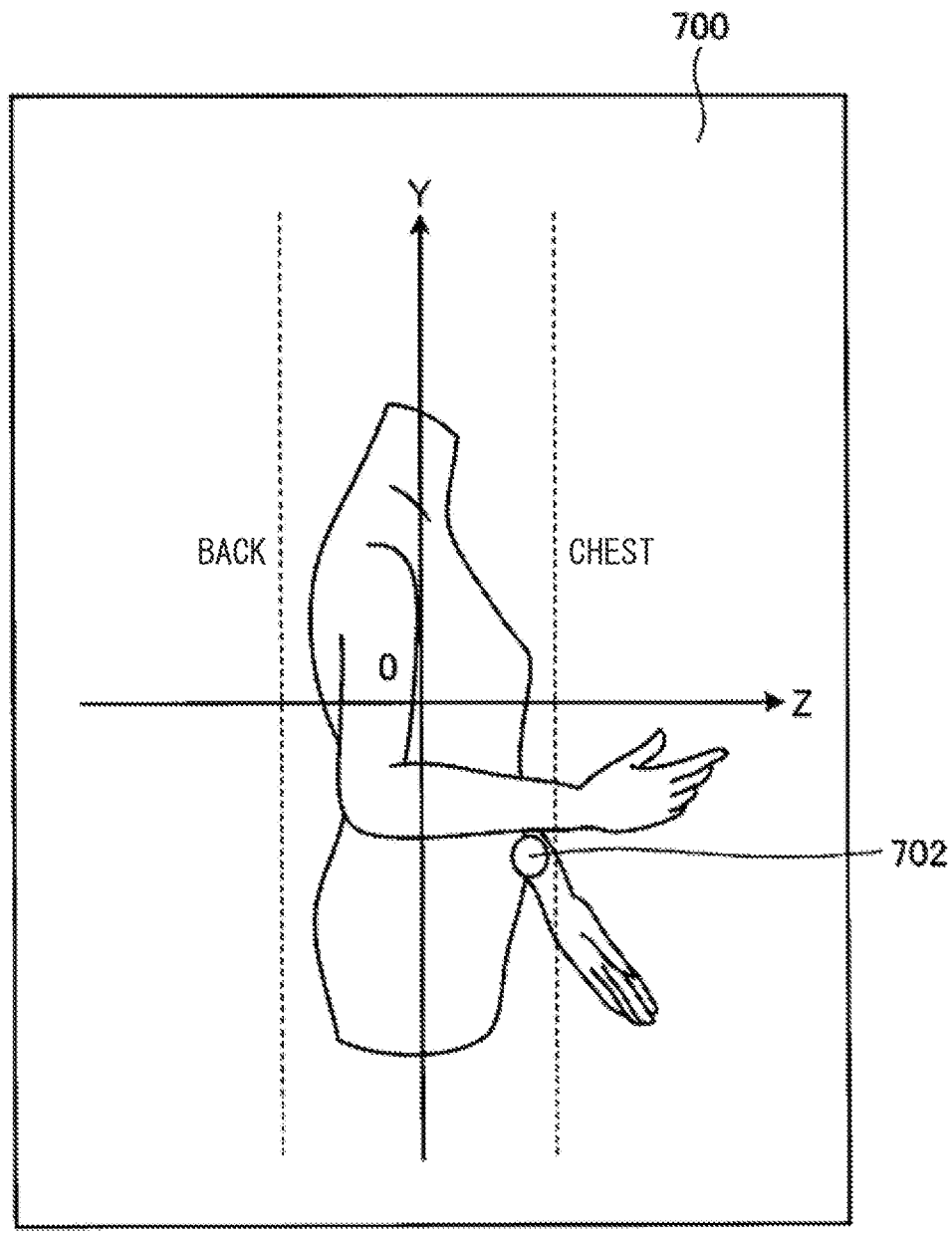
[ FIG. 35 ]

[ FIG. 36 ]
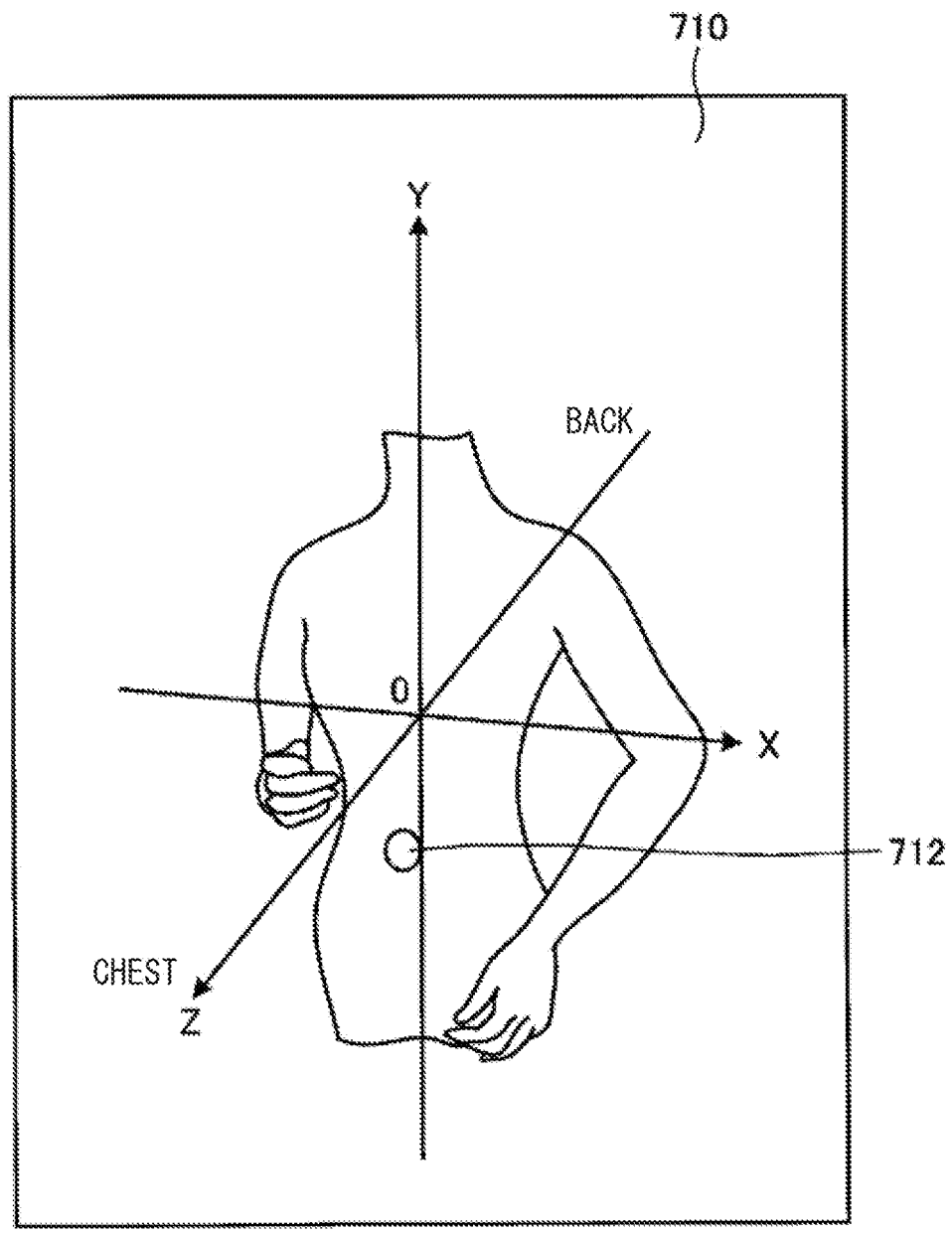

[FIG. 37]
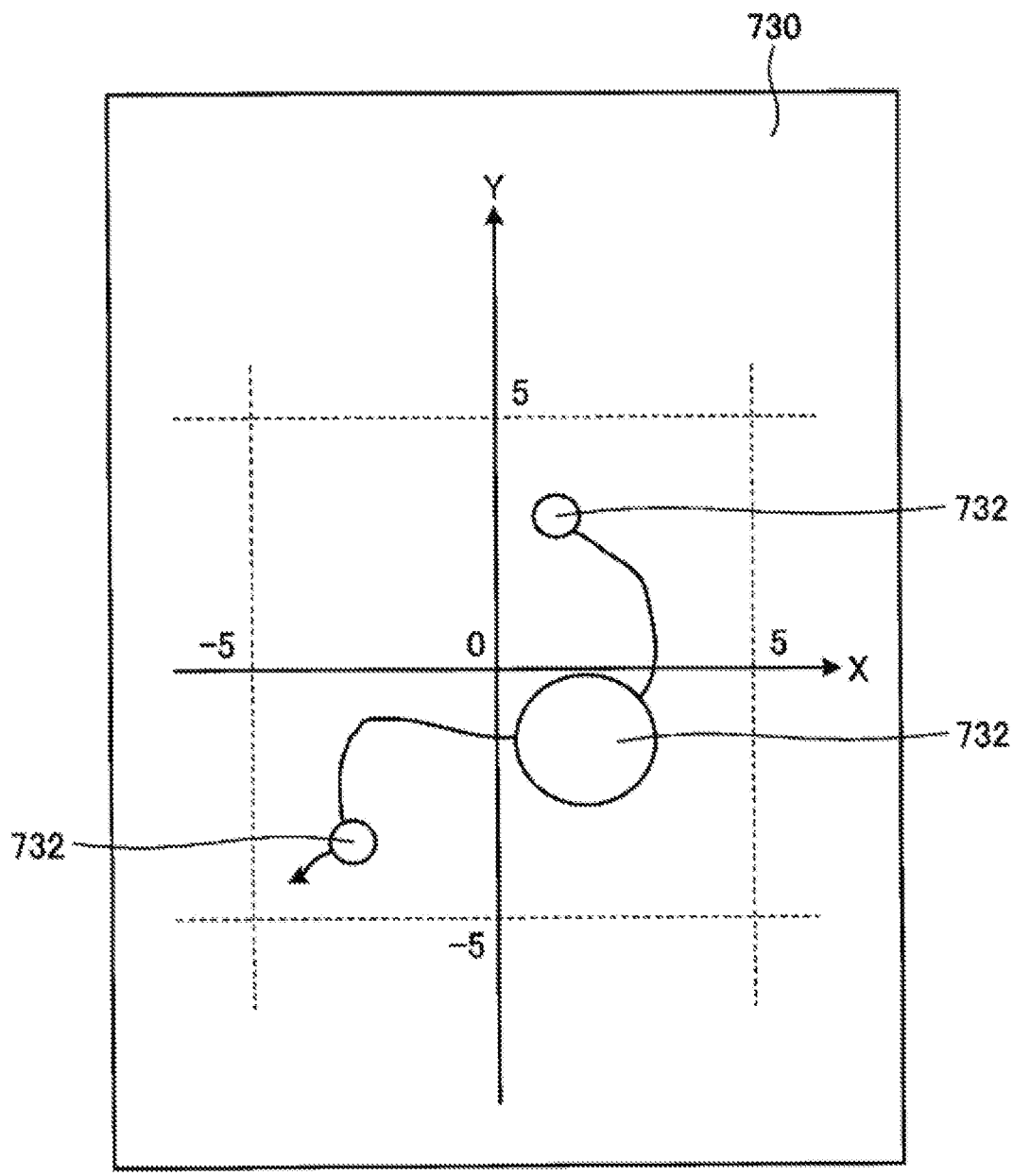

INFORMATION PROCESSOR, INFORMATION PROCESSING METHOD, AND PROGRAM

CROSS REFERENCE TO PRIOR APPLICATION

This application is a National Stage Patent Application of PCT International Patent Application No. PCT/JP2019/040744 (filed on Oct. 16, 2019) under 35 U.S.C. § 371, which claims priority to Japanese Patent Application No. 2018-197254 (filed on Oct. 19, 2018), which are all hereby incorporated by reference in their entirety.

TECHNICAL FIELD

The present disclosure relates to an information processor, an information processing method, and a program.

BACKGROUND ART

There has heretofore been proposed an apparatus for presenting a haptic stimulus such as a vibration to a user.

For example, PTL 1 below discloses a wearable-type receiving apparatus that is configured in a shape of a vest to be worn by a user and is provided with a vibration unit around the chest and abdomen, and further describes a system that is able to vibrate only a device in a particular area of a receiving area that receives a radio signal. In addition, a speaker is also provided at the shoulder of the wearable-type receiving apparatus described in PTL 1 below: vibration from the vibration unit and audio from the speaker make it possible to present a haptic feeling and audio filled with a realistic sensation.

CITATION LIST

Patent Literature

PTL 1: Japanese Unexamined Patent Application Publication No. 2018-45270

SUMMARY OF THE INVENTION

Problem to be Solved by the Invention

A haptic presentation device that presents the haptic stimulus such as a vibration to the user is able to further amplify the realistic sensation by performing a control in synchronization with a reproduction content viewed by the user in a movie theater or an attraction in a theme park. However, a system that performs generation and reproduction of control data of the haptic presentation device has not yet been sufficiently constructed, in a case of assuming the control in synchronization with the reproduction content.

Means for Solving the Problem

According to the present disclosure, there is proposed an information processor including a control unit that generates a script in which time information on a reproduction content and a control command of a haptic presentation device are associated with each other, in which the control command includes position information indicating a perceptual position that causes a haptic stimulus to be perceived in the haptic presentation device, and haptic stimulus type information specifying a type of the haptic stimulus.

According to the present disclosure, there is proposed an information processing method including causing a processor to generate a script in which time information on a reproduction content and a control command of a haptic presentation device are associated with each other, in which the control command includes position information indicating a perceptual position that causes a haptic stimulus to be perceived in the haptic presentation device, and haptic stimulus type information specifying a type of the haptic stimulus.

According to the present disclosure, there is proposed a program that causes a computer to function as a control unit generating a script in which time information on a reproduction content and a control command of a haptic presentation device are associated with each other, in which the control command includes position information indicating a perceptual position that causes a haptic stimulus to be perceived in the haptic presentation device, and haptic stimulus type information specifying a type of the haptic stimulus.

According to the present disclosure, there is proposed an information processor including a control unit that generates a haptic control signal to be inputted to a haptic presentation device in accordance with a command corresponding to a time code indicating a reproduction position of a reproduction content, based on a script in which time information on the reproduction content and a control command of the haptic presentation device are associated with each other, in which the command includes position information indicating a perceptual position that causes a haptic stimulus to be perceived in the haptic presentation device, and haptic stimulus type information specifying a type of the haptic stimulus; and, in accordance with an arrangement of one or more haptic stimulus units provided in the haptic presentation device, the control unit generates the haptic control signal to each of the haptic stimulus units for presentation of the haptic stimulus of the type specified at the perceptual position, and outputs the haptic control signal to the haptic presentation device.

BRIEF DESCRIPTION OF THE DRAWINGS

FIG. 1 illustrates an example of an overall configuration of an information processing system according to a first embodiment of the present disclosure.

FIG. 2 is a block diagram illustrating an example of a configuration of a generation apparatus according to the first embodiment.

FIG. 3 is a block diagram illustrating an example of a configuration of a haptic presentation device control apparatus according to the first embodiment.

FIG. 4 is a flowchart illustrating an example of a flow of the entire processing of control information generation of a haptic presentation device 2 on generation side of the information processing system according to the first embodiment.

FIG. 5 illustrates an example of an edit screen according to the first embodiment.

FIG. 6 illustrates an example of a detailed setting screen of haptic presentation setting in the haptic presentation device of the first embodiment.

FIG. 7 is a flowchart illustrating an example of a flow of the entire operation processing on reproduction side using a script according to the first embodiment.

FIG. 8 describes an example of command processing in a control signal generation unit of the haptic presentation device according to the first embodiment.

FIG. 9 illustrates an example of a script including offset information according to the first embodiment.

FIG. 10 is a flowchart illustrating an example of a flow of the entire processing of command execution in a haptic presentation device control apparatus 20 in consideration of the offset information according to the first embodiment.

FIG. 11 describes a case where a haptic presentation position according to the first embodiment moves in a linear shape.

FIG. 12 describes an example of construction of a system without involving a 4D system according to a first modification example of the first embodiment.

FIG. 13 describes an example of construction of a system without the 4D system according to the first modification example of the first embodiment.

FIG. 14 is a flowchart illustrating an example of a flow of the entire operation processing on the reproduction side of the information processing system according to the first modification example of the first embodiment.

FIG. 15 describes distribution of a haptic control signal in response to profile information on each haptic presentation device according to a second modification example of the first embodiment.

FIG. 16 illustrates an example of a script described for each specific profile type according to the second modification example of the first embodiment.

FIG. 17 illustrates an example of a configuration in which a vibration actuator and a resistor are arranged in series according to a third modification example of the first embodiment.

FIG. 18 describes an example of performing presentation of a haptic stimulus when viewing a content on TV broadcasting or through the Internet distribution according to a fourth modification example of the first embodiment.

FIG. 19 describes an example of performing presentation of a haptic stimulus when viewing a content recorded in a recording medium according to the fourth modification example of the first embodiment.

FIG. 20 describes a haptic presentation system in an Internet game according to a fifth modification example of the first embodiment.

FIG. 21 illustrates an example of a script describing control commands for respective actions according to the fifth modification example of the first embodiment.

FIG. 22 describes a time code distribution method by optical communication according to a sixth modification example of the first embodiment.

FIG. 23 describes a command distribution method by optical communication according to a seventh modification example of the first embodiment.

FIG. 24 describes a method of performing command distribution by optical communication using a light source different from that for projection, according to the seventh modification example of the first embodiment.

FIG. 25 illustrates an example of an overall configuration of an information processing system according to a second embodiment.

FIG. 26 is a block diagram illustrating an example of a configuration of a generation apparatus according to the second embodiment.

FIG. 27 is a flowchart illustrating an example of a flow of the entire operation processing on generation side of the information processing system according to the second embodiment.

FIG. 28 is a flowchart illustrating an example of a flow of the entire operation processing on reproduction side of the information processing system according to the second embodiment.

FIG. 29 illustrates an example of a script describing as commands names of a haptic control signal file according to the second embodiment.

FIG. 30 describes a case of performing controlling (presentation of haptic stimulus) of each vibration actuator of the haptic presentation device in accordance with the script illustrated in FIG. 29.

FIG. 31 describes an example of construction of a system without involving a 4D system according to a first modification example of the second embodiment.

FIG. 32 is a flowchart illustrating an example of a flow of the entire operation processing on reproduction side of the system without involving the 4D system according to the first modification example of the second embodiment.

FIG. 33 describes an example of performing presentation of a haptic stimulus when viewing a content on TV broadcasting according to a second modification example of the second embodiment.

FIG. 34 is a (1st) diagram illustrating an example of an edit screen according to a third embodiment.

FIG. 35 is a (2nd) diagram illustrating an example of the edit screen according to the third embodiment.

FIG. 36 is a (3rd) diagram illustrating an example of the edit screen according to the third embodiment.

FIG. 37 is a (4th) diagram illustrating an example of the edit screen according to the third embodiment.

MODES FOR CARRYING OUT THE INVENTION

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

In addition, the description is given in the following order.
1. Overview of Information Processing System according to an Embodiment of Present Disclosure
2. First Embodiment (Control of Haptic Presentation Device via 4D System)
   2-1. Configuration Example
      (2-1-1. System Configuration Example)
      (2-1-2. Configuration Example of Generation Apparatus 10)
      (2-1-3. Configuration Example of Haptic Presentation Device Control Apparatus 20)
   2-2. Operation Processing
      (2-2-1. Operation Processing on Generation Side)
      (2-2-2. Operation Processing on Reproduction Side)
         Supplement 1 . . . Setting of Offset Information
         Supplement 2 . . . Presentation of Recommended Value upon Generation of Haptic Data
         Supplement 4 . . . Concerning Data Transmission Between Haptic Presentation Device 2 and Haptic Presentation Device Control Apparatus 20
   2-3. Modification Examples
      (2-3-1. Example of System Construction without Involving 4D System)
      (2-3-2. Distribution of Haptic Control Signal in Response to Profile Information on Each Haptic Presentation Device 2)

(2-3-3. Achievement of Presentation of Haptic Stimulation Suitable for Children)
(2-3-4. Example of Construction of Home System)
(2-3-5. Haptic Presentation System in Internet Game)
(2-3-6. Time Code Distribution Method by Optical Communication)
(2-3-7. Command Distribution Method by Optical Communication)
3. Second Embodiment (Creation of Haptic Control Signal on Generation Side)
  3-1. Configuration Example
  3-2. Operation Processing
  (3-2-1. Operation Processing on Generation Side)
  (3-2-2. Operation Processing on Reproduction Side)
  3-3. Modification Examples
  (3-3-1. Example of System Construction without Involving 4D System)
  (3-3-2. Example of Construction of Home System)
4. Third Embodiment (Example of Editing Function for Haptic Presentation)
5. Conclusion 1. Overview of Information Processing System According to an Embodiment of Present Disclosure An information processing system according to an embodiment of the present disclosure proposes a system that performs generation and reproduction of control data of a haptic presentation device assuming that a control is performed in synchronization with a reproduction content, and construction of the system is proposed which achieves reduction in a burden of processing and improvement in convenience.

First, description is given below of a haptic presentation device 2 (see FIG. 1) used in the present disclosure. The haptic presentation device 2 is assumed to be utilized in a movie theater or an attraction in a theme park, or is assumed to be utilized when viewing a television or playing a game in a home.

(Haptic Presentation Device 2)

The haptic presentation device 2 is formed, for example, by a wearable-type apparatus. For example, in the present embodiment, a vest-type one to be worn by a user is assumed. The haptic presentation device 2 of a vest type includes therein a plurality of haptic stimulus units (also referred to as actuators). For example, a predetermined number (e.g., six) of the haptic stimulus units may be arranged inside the haptic presentation device 2 on each of front side and rear side of the user. As one example, the individual haptic stimulus units arranged on the front side and the individual haptic stimulus units arranged on the rear side are arranged in a positional relationship to be opposed to each other.

It is to be noted that a shape of the haptic presentation device 2 is not limited to the vest type (jacket shape without sleeves), and may be a jacket shape having sleeves. In this case, one or more haptic stimulus units may be arranged not only in the chest and abdomen of the user but also in positions corresponding to both arms of the user. In addition, the haptic presentation device 2 according to the present embodiment is not limited to the jacket shape, and may be trousers, shoes, a belt, a hat, gloves, a mask, or the like.

In addition, one audio output unit may be arranged on each of the left and right shoulders of the haptic presentation device 2. Alternatively, either only one audio output unit or three or more audio output units may be arranged in the haptic presentation device 2. In addition, the audio output unit may be arranged on the periphery as another apparatus independent of the haptic presentation device 2.

(Haptic Stimulation Unit)

In a case where the plurality of haptic stimulus units included in the haptic presentation device 2 generate vibrations individually of each other, the generated vibrations may be perceived only on the periphery of the haptic stimulus unit. That is, in a case where the individual haptic stimulus units are spaced apart from each other, vibrations generated separately by the individual haptic stimulus units may be discretely perceived in the body of the user.

Meanwhile, an illusion phenomenon referred to as phantom sensation has been medically clarified. The phantom sensation is an illusion phenomenon in which, when stimuli are presented simultaneously to different positions on the skin, a person perceives only one stimulus between the presented stimulus positions. For example, it is known that, when stimuli are simultaneously outputted to two haptic stimulus units arranged on the body of the user, a position of a haptic stimulus perceived by the user (hereinafter, referred to as a "perceptual position") is usually a position between the two haptic stimulus units. In addition, varying output intensity of the plurality of haptic stimulus units makes it possible to continuously expand a range of a haptic stimulus that is able to be presented by the plurality of haptic stimulus units without varying an interval at which the individual haptic stimulus units are arranged.

Description is given, as one example, of a relationship (phantom sensation) between output intensity and a perceptual position in each of two haptic stimulus units. For example, suppose that, as time lapses, output intensity of a first haptic stimulus unit is continuously decreased as, for example, "1", "0.6", and "0", and output intensity of a second haptic stimulus unit is continuously increased as "0", "0.6", and "1". In this case, the perceptual position (perceived by the user) may move continuously from a contact position of the first haptic stimulus unit to a contact position of the second haptic stimulus unit.

In this manner, controlling the output intensity of each of the haptic stimulus units makes it possible to move the perceptual position optionally without being limited to the position of the haptic stimulus unit.

Accordingly, when creating the perceptual effects of the haptic presentation device 2, a perceptual position is optionally determined regardless of the position of the haptic stimulus unit to set intensity of a haptic stimulus (referred to as "perceptual intensity") and a type of the haptic stimulus (referred to as "haptic stimulus type") to be presented in the perceptual position. Meanwhile, when controlling the haptic presentation device 2, it is necessary to calculate a signal (referred to as "haptic control signal") to be inputted to the individual haptic stimulus unit provided in the haptic presentation device 2 in order to present set intensity and a set type of a haptic stimulus in a specified perceptual position.

The present embodiment proposes construction of a system including side of producing the perceptual effects of the haptic presentation device 2 (i.e., side of generating control data of the haptic presentation device 2) and side of controlling reproduction of a content and the haptic presentation device 2 in synchronization with the reproduction (i.e., side of controlling the haptic presentation device 2 using the above-described generated control data), which system achieves reduction in a burden of processing and improvement in convenience.

It is to be noted that a vibration stimulus is used herein as an example of a "haptic stimulus". Specifically, the haptic presentation device 2 is provided with a vibration actuator as the haptic stimulus unit, thereby presenting a vibration stimulus. In addition, a "type of the haptic stimulus" refers to a pattern of perception to be presented, and for example, waveform data (perceptual waveform data) of a vibration is assumed. In addition, the "haptic control signal" refers to waveform data (control waveform data corresponding to a drive signal) to be inputted to the individual haptic stimulus unit (vibration actuator) provided in the haptic presentation device 2.

The description has been given above of an overview of the information processing system according to an embodiment of the present disclosure. Next, specific description is given of the information processing system according to the present embodiment referring to a plurality of embodiments.

2. First Embodiment (Control of Haptic Presentation Device Via 4D System)>>

2-1. Configuration Example

2-1-1. System Configuration Example

FIG. 1 illustrates an example of an overall configuration of an information processing system 1a according to a first embodiment. As illustrated in FIG. 1, the information processing system 1a according to the present embodiment includes a generation apparatus 10, a haptic presentation device control apparatus 20, a cinema system 30, a 4D system control apparatus 40, and a verification system 50. In the present embodiment, a case is assumed where the haptic presentation device 2 is used in a movie theater.
(Reproduction Side)

The cinema system 30 includes a reproduction control apparatus 31, a projector 32, and a screen S. and the reproduction control apparatus 31 projects an image (movie content) on the screen S using the projector 32 to screen the movie. In addition, the cinema system 30 further cooperates with an acoustic system to perform a control of reproducing audio data included in the movie content from the acoustic system, although no illustration is given in FIG. 1.

The reproduction control apparatus 31 controls reproduction of the movie content, and outputs a time code indicating a reproduction position of the movie content to the 4D system control apparatus 40 in real time.

The 4D system control apparatus 40 has a function of controlling a 4D technique introduced into a movie theater. The 4D technique refers to a technique that performs new dimension definition different from dimensional definition of a three-dimension such as current time and space, and is used when presenting a real element other than a digital content (e.g., image). More specific examples of the 4D technique used in the movie theater include a seating apparatus for movie appreciation (hereinafter referred to as "4D seat") that have functions of vibrating and moving in accordance with screening of a movie as well as emitting air (wind), water, fog, light, scent, etc. to audience. In accordance with a time code received from the reproduction control apparatus 31, the 4D system control apparatus 40 appropriately controls the vibration of a 4D seat 4, the emission of air, water, scent, etc. to achieve a 4D output in synchronization with the movie. The 4D system control apparatus 40, the 4D seat 4, and a peripheral apparatus (unillustrated) used to emit air, water, scent, etc. from the 4D seat 4 are herein collectively referred to as a "4D system".

In addition, the control of 4D technique by the 4D system control apparatus 40 in accordance with a time code is performed in line with "4D control information" (4D system file) generated in advance by the generation apparatus 10 on generation side of the present system. The "4D control information" includes control commands related to a control of a vibration corresponding to a time code and a control of emission of air, water, scent, etc. It is to be noted that the detailed substance of the 4D control according to the present embodiment is not particularly limited, and, for example, an existing 4D control may be used.

In addition, the 4D system control apparatus 40 according to the present embodiment refers to text data (referred to herein as a "script"), in which the control commands of the haptic presentation device 2 are described in a way corresponding to a time axis of a reproduction content, included in a generation file generated in advance and acquired by the generation apparatus 10 on the generation side of the present system, and outputs a command related to the control of the haptic presentation device 2 to the haptic presentation device control apparatus 20 appropriately in accordance with a time code received from the reproduction control apparatus 31.

The haptic presentation device control apparatus 20 may control the haptic presentation device 2 in accordance with a command received from the 4D system control apparatus 40 to thereby present a haptic stimulus in synchronization with a movie (image and audio) and the 4D seat 4. Specifically, the haptic presentation device control apparatus 20 generates a haptic control signal in accordance with a command received from the 4D system control apparatus 40, and outputs the generated haptic control signal to the haptic presentation device 2. Such a command includes a perceptual position of a vibration stimulus, a waveform type of the vibration stimulus, and intensity information on the vibration stimulus. The haptic presentation device control apparatus 20 generates (calculates) and outputs a haptic control signal (waveform data) to be inputted to the individual haptic stimulus unit provided in the haptic presentation device 2 to present a vibration stimulus by a specified waveform at specified intensity at a perceptual position specified by the command.

It is to be noted that, as for the "waveform type of the vibration stimulus", a haptic data library (i.e., a basic vibration waveform pattern that may be used in a versatile manner in many movies; also referred to herein as "haptic library") generated in advance and accumulated in a haptic Lib DB 221, or generation haptic data generated on the basis of audio data of the movie (i.e., a vibration waveform pattern created for the movie to be screened at this occasion) is specified. The generation haptic data is acquired from the generation side (via the 4D system control apparatus 40), and is accumulated in a storage unit in the haptic presentation device control apparatus 20.

In addition, an audio signal may be used as a haptic control signal generated by the haptic presentation device control apparatus 20. For example, in a case where a vibration actuator that is driven on the basis of an inputted audio signal (e.g., that is able to convert the inputted audio signal into an excitation signal to output the excitation signal as a vibration) is provided in the haptic presentation device 2, the haptic presentation device control apparatus 20 generates an audio signal (data indicating a waveform of audio) to be inputted to the individual haptic stimulus units, as a haptic control signal (drive signal), to output the haptic control signal.

In this manner, in the information processing system 1a according to the present embodiment, the 4D seat 4 and the haptic presentation device 2 are able to be introduced in combination into a movie theater, thus making it possible to further enhance a realistic sensation of a movie and thus to give a further sense of immersion to audience. In addition, by utilizing a 4D system (specifically, the 4D system control apparatus 40) to achieve the control of the haptic presentation device 2, it is possible to easily introduce the haptic presentation device 2 into a movie theater in which the 4D system has been already constructed and thus to incorporate the haptic presentation device 2 into the system.

Subsequently, description is given of generation side for generating control information (4D control information and "script") that achieves the control of the 4D system and the control of the haptic presentation device 2 which have been described above.

(Generation Side)

The generation apparatus 10 generates control information on the 4D system (4D control information) and control information on the haptic presentation device 2 in accordance with an operation of the user (creator). The control information on the haptic presentation device 2 according to the present embodiment refers to a script (text data) in which a control command is described in response to a time code of a reproduction content (e.g., movie content). In addition, the generation apparatus 10 is also able to generate perceptual data (haptic data) to be presented by the haptic presentation device 2 from audio data of the reproduction content (e.g., sound effects. BGM, or dialogue sounds of a movie content). Haptic data to be generated by the generation apparatus 10 (generation haptic data) is, for example, data indicating a waveform pattern of a vibration. The generation apparatus 10 includes, in the generation file, a script and generation haptic data generated in response to the reproduction content, and distributes the script and the generation haptic data to the 4D system control apparatus 40. It is to be noted that the generation file including the 4D control information to be generated by the generation apparatus 10 and the control information on the haptic presentation device 2 may be distributed to the 4D system control apparatus 40 via a network by wired/wireless communication, or a storage medium storing the data may be installed in the 4D system control apparatus 40.

In addition, when the generation apparatus 10 generates the control information, the user is also able to use the verification system 50 located locally to confirm an experience. The verification system 50 includes a control apparatus 52, a haptic presentation device 54, a 4D seat 56, and a display apparatus 58. The control apparatus 52 reproduces a movie content on the display apparatus 58, and drives the 4D seat 56 and the haptic presentation device 54 on the basis of the control information generated by the generation apparatus 10 to be able to actually confirm a perceptual experience and to perform correction (feedback) of the control information appropriately.

The description has been given above of an example of the system configuration according to the present embodiment. Subsequently, description is given below of a specific configuration of the main apparatuses included in the present system.

2-1-2. Configuration Example of Generation Apparatus 10

FIG. 2 is a block diagram illustrating an example of a configuration of the generation apparatus 10 according to the present embodiment. As illustrated in FIG. 2, the generation apparatus 10 includes a control unit 100, a communication unit 110, an operation input unit 120, a display unit 130, and a storage unit 140.

The control unit 100 functions as an arithmetic processor and a controller, and controls overall operations inside the generation apparatus 10 in accordance with various programs. The control unit 100 is implemented by electronic circuits such as a CPU (Central Processing Unit) and a microprocessor. In addition, the control unit 100 may include a ROM (Read Only Memory) that stores programs and arithmetic parameters to be used, and a RAM (Random Access Memory) that temporarily stores parameters, etc. that vary appropriately.

In addition, the control unit 100 also functions as a 4D control information generation unit 101, a haptic presentation information generation unit 102, and a haptic data generation unit 103.

The 4D control information generation unit 101 generates control information (4D control information) for controlling the 4D seat 4 to synchronize with a reproduction content on the basis of an operational input by the user (creator) (it is to be noted that the generation apparatus 10 takes in the reproduction content in advance). For example, the 4D control information generation unit 101 generates control commands indicating a control signal of a vibration of the 4D seat 4 associated with a time code of the reproduction content and a control signal of emissions of air, water, scent, etc. In addition, the 4D control information generation unit 101 displays a screen for generating the 4D control information on the display unit 130, and generates the 4D control information on the basis of a substance of an operation of the user detected by the operation input unit 120. In the present specification, the detail of the 4D control information is not particularly limited: for example, an existing 4D control technique may be used.

The haptic presentation information generation unit 102 generates control information for controlling the haptic presentation device 2 to synchronize with the reproduction content on the basis of the operational input by the user (creator). Specifically, the haptic presentation information generation unit 102 generates a script (text data) describing a control command in association with a time code of a reproduction content (e.g., movie content). The control command includes a perceptual position of the vibration stimulus, a waveform type of the vibration stimulus, and intensity information on the vibration stimulus. In addition, the haptic presentation information generation unit 102 displays a screen for script generation on the display unit 130, and generates a script on the basis of a substance of an operation of the user detected by the operation input unit 120. The screen for the script generation may be added to the screen for generating the 4D control information for the displaying. The present system may provide, as a plug-in, a script generation function (a function of the haptic presentation information generation unit 102), which is control information on the haptic presentation device 2, in an application (a function of the 4D control information generation unit 101) for generating the 4D control information to be activated by the generation apparatus 10. Description is given later, with reference to FIG. 5, of an example of a display screen in a case of providing the script generation function as a plug-in of an existing application for generating the 4D control information.

The haptic data generation unit 103 has a function of generating a perceptual pattern (i.e., haptic data) of a haptic stimulus to be presented by the haptic presentation information generation unit 102 from audio data (sound effects. BGM (background music), dialogue sounds, etc.) of a reproduction content (haptic data generated from audio data of the reproduction content in the haptic data generation unit 103 is also referred to herein as "generation haptic data"). The audio data of the reproduction content may be provided as an audio track, for example, in a movie content. It is assumed that tracks are allocated to the audio data of the sound effects together with time information at timings generated (used) within the movie content. In addition, the BGM is assumed to be a separate sound source in which tracks are separated for each piece of music to be used (including time information) and L/R are also separated. It is to be noted that the BGM may have separated tracks not only for the L/R but also for 5.1-ch speakers. The haptic data generation unit 103 allows the user to select which audio track to use, and generates haptic data from the selected audio track. In addition, tracks may also be allocated to the dialogue sounds together with the time information at timings generated in the movie content.

An algorithm for generation of haptic data from audio data (audio track) is not particularly limited. However, for example, the haptic data generation unit 103 performs processing (spectrum calculation, time derivative, beat determination, etc.) for extracting a beat component from an audio signal, generates a beat waveform, amplifies at least a predetermined frequency band of the audio signal using the generated beat waveform as a gain to generate a beat-emphasized audio signal which may be used as haptic data. It is to be noted that, in arithmetic processing when extracting the beat component from the audio signal, the haptic data generation unit 103 may refer to profile information (e.g., resonant frequency, etc.) of the haptic presentation device 2 stored in a profile DB 143 to adjust parameters appropriately.

In addition, the generation of the haptic data from the dialogue sound may be performed manually by a creator in accordance with a substance, an intonation, a volume, and the like of the dialogue.

The communication unit 110 is coupled to an external apparatus by wired or wirelessly to transmit and receive data. The communication unit 110 may be coupled to a network by, for example, a wired/wireless LAN (Local Area Network). Wi-Fi (registered trademark), Bluetooth (registered trademark), a mobile communication network (LTE (Long Term Evolution), 3G (third-generation mobile communication system)), or the like, and may transmit and receive data to and from the external apparatus via the network.

The communication unit 110 according to the present embodiment transmits, for example, the generated 4D control information, the script, and the generation haptic data to the verification system 50 or to the 4D system control apparatus 40 via the network.

The operation input unit 120 accepts an operation instruction from the user, and outputs a substance of the operation to the control unit 100. The operation input unit 120 may be a touch sensor, a pressure sensor, or a proximity sensor. Alternatively, the operation input unit may be a physical configuration such as a button, a switch, and a lever.

The display unit 130 is a display apparatus that outputs a screen, etc. for generation of control information. The display unit 130 may be, for example, a display apparatus such as a liquid crystal display (LCD: Liquid Crystal Display), an organic EL (Electro Luminescence) display.

The storage unit 140 is implemented by a ROM (Read Only Memory) that stores programs, arithmetic parameters, and the like used in processing of the control unit 100, and a RAM (Random Access Memory) that temporarily stores parameters, etc. that vary appropriately. Specifically, the storage unit 140 according to the present embodiment includes, for example, a haptic Lib DB 141, a generation haptic data DB 142, and the profile DB 143.

The haptic Lib DB 141 stores a haptic data library (vibration waveform pattern) generated in advance. The haptic data library of the haptic Lib DB 141 is data common to the haptic Lib DB 221 on movie theater side. In the present embodiment, describing a script to utilize the haptic data library owned in advance by the movie theater side enables the movie theater side to present a haptic stimulus based on a target haptic data library without transmitting the target haptic data to the movie theater side. This makes it possible to achieve reduction in an amount of data to be distributed to the 4D system control apparatus 40.

The generation haptic data DB 142 stores generation haptic data (waveform pattern of vibration) generated by the generation apparatus 10 on the basis of the audio data of the reproduction content. The generation haptic data is included in the generation file together with the script, and is distributed to the 4D system control apparatus 40.

The profile DB 143 stores the profile information on the haptic presentation device 2 to be used by the movie theater. Specifically, for example, information such as the number of the vibration actuators of the haptic presentation device 2 and positions thereof (x, y), transient response characteristics (1 to 5), and resonant frequency (Hz) is stored as profile information. On the basis of such profile information, for example, the haptic presentation information generation unit 102 is able to generate and display a selection screen of perceptual positions (display an arrangement of vibration actuators), and calculate a delay amount in the haptic presentation device 2 to set, in a control code of the script, offset information for a time axis. In addition, when the haptic data generation unit 103 generates haptic data from audio data, it is possible to adjust parameters appropriately by referring to the profile information. It is to be noted that the haptic presentation device 54 of the verification system 50 is also able to confirm an experience more reliably by utilizing the one having a profile similar to that of the haptic presentation device 2.

The specific description has been given above of the configuration of the generation apparatus 10 according to the present embodiment. It is to be noted that the configuration of the generation apparatus 10 is not limited to the example illustrated in FIG. 2, and, for example, a portion of the generation apparatus 10 may be provided in an external apparatus.

2-1-3. Configuration Example of Haptic Presentation Device Control Apparatus 20

FIG. 3 is a block diagram illustrating an example of a configuration of the haptic presentation device control apparatus 20 according to the present embodiment. As illustrated in FIG. 3, the haptic presentation device control apparatus 20 includes a control unit 200, a communication unit 210, and a storage unit 220.

The control unit 200 functions as an arithmetic processor and a controller, and controls overall operations inside the haptic presentation device control apparatus 20 in accordance with various programs. The control unit 200 is implemented by electronic circuits such as a CPU (Central Processing Unit) and a microprocessor. In addition, the control unit 200 may include a ROM (Read Only Memory) that stores programs and arithmetic parameters to be used, and a RAM (Random Access Memory) that temporarily stores parameters. etc. that vary appropriately.

In addition, the control unit 200 also functions as a control signal generation unit 201 and an output control unit 202.

The control signal generation unit 201 generates a haptic control signal (a control signal to be inputted to an individual vibration actuator) to drive one or more vibration actuators provided in the haptic presentation device control apparatus 20 in accordance with commands received from the 4D system control apparatus 40.

The command includes a perceptual position (presentation position of haptic stimulus), perceptual intensity (intensity of haptic stimulus), and a type of a haptic stimulus. In response to a perceptual position and perceptual intensity specified in the command, the control signal generation unit 201 identifies a plurality of vibration actuators to perceive predetermined perceptual intensity at the perceptual position, determines (calculates) vibration intensity at each of the vibration actuators, and generates respective control signals to be outputted to the plurality of vibration actuators. As described above, in the present embodiment, adjusting the output intensity of the plurality of vibration actuators on the basis of the illusion phenomenon referred to as the phantom sensation makes it possible to present a haptic stimulus also at a position other than the arrangement positions of the individual vibration actuators.

Specifically, on the basis of respective positional relationships (distances) between the plurality of vibration actuators positioned near a specified perceptual position and the specified perceptual position, and on the basis of the specified perceptual intensity, the control signal generation unit 201 calculates output intensity of each of the plurality of vibration actuators to present predetermined perceptual intensity at a perceptual position. In addition, the control signal generation unit 201 generates a waveform pattern of a control signal to be generated, in accordance with the type of haptic stimulus specified by the command. As for the type of the haptic stimulus specified by the command, the haptic data library stored in the haptic Lib DB 221 or the generation haptic data distributed and stored in the generation haptic data DB 222 is assumed.

It is to be noted that, as used herein, the "perceptual position" may also include a movement path of the perceptual position (perceptual path). In addition, the "perceptual position" includes not only a surface of the body but also the inside of the body. Using the illusion phenomenon referred to as the phantom sensation as described above makes it also possible to present such a haptic stimulus as penetrating from the front surface to the rear surface of the body, for example. Further, in the present embodiment, a perceptual range may be included in the command in addition to the perceptual position. The perceptual range may be, for example, a circle or an arc having a radius. In addition, it is also possible to specify elements such as whether intensity in the perceptual range is uniform, whether the haptic stimulus extends concentrically (in this case, an extending speed as well), whether the haptic stimulus moves concentrically toward the center from the outer circumference, and the like. The specifying of these elements may be defined, for example, in a "haptic presentation position" included in the control command described in the script ("origin (x, y), radius", etc.).

The output control unit 202 has a function of controlling a vibration output (presentation of haptic stimulus) of the haptic presentation device 2 by sending each haptic control signal generated by the control signal generation unit 201 to the haptic presentation device 2 (or vibration actuator of haptic presentation device 2) using a haptic presentation device I/F 212.

The communication unit 210 is coupled to an external apparatus by wired or wirelessly to transmit and receive data. The communication unit 210 may be coupled to a network by, for example, a wired/wireless LAN (Local Area Network), Wi-Fi (registered trademark), Bluetooth (registered trademark), a mobile communication network (LTE (Long Term Evolution), 3G (third-generation mobile communication system)), or the like, and may transmit and receive data to and from the external apparatus via the network.

The communication unit 210 according to the present embodiment includes a system I/F 211 and the haptic presentation device I/F 212. The system I/F 211 is a communication unit that transmits and receives data to and from the system. For example, the system I/F 211 is coupled in communication with the 4D system, and the 4D system control apparatus 40 refers to the script to receive a command issued in accordance with a time code acquired from the cinema system 30 as well as the generation haptic data extracted from the generation file acquired from the generation apparatus 10 by the 4D system control apparatus 40. In addition, the haptic presentation device I/F 212 is a communication unit that transmits and receives data to and from the haptic presentation device 2. For example, the haptic presentation device I/F 212 acquires profile information from the haptic presentation device 2, and transmits the haptic control signal generated by the control signal generation unit 201 to the haptic presentation device 2.

The storage unit 220 is implemented by a ROM (Read Only Memory) that stores programs, arithmetic parameters, and the like used in processing of the control unit 200, and a RAM (Random Access Memory) that temporarily stores parameters. etc. that vary appropriately. Specifically, the storage unit 220 according to the present embodiment includes, for example, the haptic Lib DB 221, the generation haptic data DB 222, and a profile DB 223.

The haptic Lib DB 221 stores a haptic data library (vibration waveform patterns) generated in advance. The generation haptic data DB 222 stores generation haptic data (vibration waveform pattern) generated by the generation apparatus 10 on the basis of audio data of a reproduction content. The generation haptic data may be extracted from the generation file acquired from the generation apparatus 10 by the 4D system control apparatus 40, and may be transmitted from the 4D system control apparatus 40 via the system I/F 211.

The profile DB 223 stores the profile information on the haptic presentation device 2. Specifically, for example, information such as the number of the vibration actuators of the haptic presentation device 2 and positions thereof (x, y), transient response characteristics (1 to 5), resonant frequency (Hz), frequency characteristic (dB), maximum input voltage (Vpp), processing (delay) time (ms), and version information (ID) is stored as profile information.

The number of vibration actuators refers to the total number of vibration actuators provided in the haptic presentation device 2. In addition, the position of the vibration actuator may be indicated by coordinates (x, y) in which the center of the haptic presentation device 2 is set as the origin. In addition, a coordinate system of the vibration actuators provided on the front surface of the haptic presentation device 2 and a coordinate system of the vibration actuators provided on the back surface thereof may be included.

The transient response characteristics mean a degree of reaction from a resting state of the haptic presentation device 2 to a state in which the haptic presentation device 2 correctly follows an input signal (as an example, the degree of reaction may be divided into levels of 1 to 5). In addition, the resonant frequency means a frequency at which the vibration actuator vibrates efficiently. In addition, the frequency characteristics mean acceleration of each frequency when the acceleration of the resonant frequency is set to zero (dB) (e.g., indicated by a combination of "frequency, dB value"). In addition, the maximum input voltage means a maximum voltage value that may be applied during normal use (e.g., a value of Peak to Peak of a signal waveform). In addition, processing (delay) time means signal processing time expected on side of the haptic presentation device 2, and means that a delay for this time occurs.

Here, an example of data configuration of the profile information is set forth below. In this example, the positions of the respective vibration actuators are indicated by a coordinate system in an x-axis direction (−5 to 5) and a y-axis direction (−5 to 5) with the center of the haptic presentation device 2 being set as the origin (0, 0).

Data Configuration Example of Profile Information
Number: 9
Position: (−4.0, 2.5), (0.0, 4.0), (4.0, 2.5).
  (−3.0, −0.5), (0.0, 0.0), (3.0, −0.5),
  (−3.0, −2.5), (0.0, −4.0), (3.0, −2.5)
Transient: 3
Resonance: 100
Frequency Characteristics: (10, −10), (50, −6), (100, 0) . . .
Maximum Input Voltage: 20
Processing Delay Time: 300

The specific description has been given above of the configuration of the haptic presentation device control apparatus 20 according to the present embodiment. It is to be noted that the configuration of the haptic presentation device control apparatus 20 is not limited to the example illustrated in FIG. 3, and, for example, a portion of the haptic presentation device control apparatus 20 may be provided in an external apparatus.

2-2. Operation Processing

Subsequently, specific description is given of operation processing of the information processing system according to the present embodiment with reference to the drawings.

2-2-1. Operation Processing on Generation Side

FIG. 4 is a flowchart illustrating an example of a flow of the entire processing of control information generation of the haptic presentation device 2 on generation side of the information processing system according to the present embodiment.

As illustrated in FIG. 4, first, the control unit 100 of the generation apparatus 10 accepts selection by a user (creator) of a haptic presentation location in a time axis of a reproduction content (step S103). For example, the control unit 100 presents an edit screen 1300 as illustrated in FIG. 5 on the display unit 130. The edit screen 1300 displays a waveform of audio data (L/R) of a reproduction content on the time axis, and further displays a setting screen 1320 for the 4D seat and a setting screen 1330 for the haptic presentation device 2. While browsing the waveform of the audio data of the reproduction content as well as an image (unillustrated) of the reproduction content, the user specifies a time zone (location of temporal position) at which a vibration, etc. is generated by the 4D seat 4 or the haptic presentation device 2 on the setting screen 1320 and the setting screen 1330. The setting screen 1320 and the setting screen 1330 are provided with presentation of a time axis corresponding to the reproduction content, thus making it possible to specify a time zone at which the vibration, etc. is generated by the 4D seat 4 or the haptic presentation device 2. For example, the user specifies a time zone 1331 at which a vibration is desired to be generated by the haptic presentation device 2 with a swipe operation. etc. on a time axis displayed on the setting screen 1330 for the haptic presentation device 2. In addition, when the specified time zone 1331 is selected with a tap (or click, etc.) operation, a detailed setting screen 1340 for performing more specific setting is displayed as illustrated in FIG. 6. In the detailed setting screen 1340, selection of a haptic type (waveform type of vibration stimulus) described next (step S109), setting of a haptic presentation position (perceptual position) (step S112), and adjustment of perceptual intensity (step S115) may be performed.

In the selection of a haptic type (waveform type of vibration stimulus) (step S109), as illustrated in the detailed setting screen 1340 of FIG. 6, selection from haptic data generated from the audio data of the reproduction content (see a selection screen 1345) is possible, in addition to the selection from the haptic library generated in advance (e.g., typical waveform pattern) (see a selection screen 1344).

Specifically, when the user selects sound data (sound effects/BGM/dialogue sounds) (step S118), the control unit 100 generates haptic data by the haptic data generation unit 103 on the basis of the selected sound data (step S121). The selection of the sound data may be performed by a rectangle surrounding a waveform data of each of the sounds (sound effects/BGM/dialogue sounds) in the selection screen 1345 illustrated in FIG. 6.

The user is able to select waveform data from the selection screen 1344 or the selection screen 1345, for example, and to move the selected waveform data onto any haptic presentation position (or haptic presentation path) by drag and drop operations to thereby set the type of a haptic stimulus in the haptic presentation position (or haptic presentation path). The set type of the haptic stimulus is displayed in a way corresponding to the time axis on a time-series display image 1342 illustrated in FIG. 6, for example.

The above-described function of generating the haptic data from the audio data of the reproduction content may also be added as a plug-in 2 to an existing 4D system editing application.

Next, in setting of a haptic presentation position (perceptual position) (step S112), the perceptual position (or perceptual path) may be optionally set by the user. For example, in a setting screen 1341 indicating positions 521*a* to 521*i* of respective vibration actuators of the haptic presentation device 2 as illustrated in FIG. 6, a perceptual position 523 and a path 524 through which the perceptual position 523 moves may be specified by an operation such as a tap, a click, or a swipe.

Then, in adjustment of perceptual intensity (step S115), the user may optionally set perceptual intensity at a perceptual position (or perceptual path). The set perceptual intensity is displayed in a way corresponding to the time axis, for example, in a time-series display image 1343 illustrated in FIG. 6.

Subsequently, the control unit 100 outputs information on the set perceptual position, haptic type, and intensity to the verification system 50 (step S124). In the verification system 50, on the basis of the information on the perceptual position, the haptic type, and the intensity acquired from the generation apparatus 10, the control apparatus 52 generates (calculates) a haptic control signal to be inputted to the vibration actuator of the haptic presentation device 54, and outputs the generated haptic control signal to the haptic presentation device 54. This makes it possible, in the haptic presentation device 54, to verify a bodily sensation in a case of actually driving the haptic presentation device 2 using a substance of the setting. It is therefore desirable that the profile of the haptic presentation device 54 be similar to that of the haptic presentation device 2.

The above-described processing from steps S103 to S124 is repeated until all designs related to the reproduction content are completed (step S127/No). It is to be noted that the processing in S106 and thereafter may be basically repeated, and the processing may proceed to step S103 in a case where the user explicitly demonstrates an intension, by an operation, to change or add a haptic presentation location in the time axis of the reproduction content.

When all the designs related to the reproduction content are completed (step S127/Yes), the haptic presentation information generation unit 102 generates a script on the basis of information on the set perceptual position, haptic type, and intensity (step S130). Specifically, the haptic presentation information generation unit 102 generates text data describing a control command in association with a time code (time axis) of the reproduction content. The control command includes the information on the perceptual position, the haptic type, and the intensity. The control command may be encrypted.

The generated script is included in a "generation file" together with the generation haptic data, in a case where there is any, and is distributed to reproduction side (e.g., 4D system control apparatus 40). In addition, the 4D control information generated by the generation apparatus 10 is also distributed together to the reproduction side.

The function of generating the script described above may also be added as a plug-in 1 to an existing 4D system editing application.

2-2-2. Operation Processing on Reproduction Side

Subsequently, description is given, with reference to FIG. 7, of operation processing on the reproduction side using the script generated by the generation apparatus 10. FIG. 7 is a flowchart illustrating an example of a flow of the entire operation processing on the reproduction side using the script according to the present embodiment. A case is assumed here, as an example, where the reproduction side is a movie theater and the reproduction content is a movie content.

As illustrated in FIG. 7, when reproduction of the movie content is started (step S153), the reproduction control apparatus 31 distributes a time code indicating a reproduction position in the movie content to the 4D system control apparatus 40 (step S156). The distribution of the time code is repeated until the reproduction of the movie content is finished (step S159).

Meanwhile, the 4D system control apparatus 40 acquires (from the generation apparatus 10) the 4D control information and the generation file including at least the script (step S162).

Next, in a case where generation haptic data is included in the generation file, the 4D system control apparatus 40 transmits the generation haptic data to the haptic presentation device control apparatus 20 (step S165).

Then, the haptic presentation device control apparatus 20 stores the generation haptic data received from the 4D system control apparatus 40 (step S168).

Next, when the time code is distributed from the reproduction control apparatus 31, the 4D system control apparatus 40 refers to the 4D control information to drive the 4D system in accordance with the time code (step S171).

Then, the 4D system control apparatus 40 refers to the script to perform command-issuing processing in accordance with the same time code (step S174). Specifically, the 4D system control apparatus 40 extracts a control command corresponding to the distributed time code from script description, and issues the extracted control command as a command (which may be an encrypted command).

The 4D system control apparatus 40 issues the command to the haptic presentation device control apparatus 20 (step S177).

The 4D system control apparatus 40 repeats the processing from the above steps S171 to S177 until the reception of the time code from the reproduction control apparatus 31 is finished (step S180). It is to be noted that, when the reception of the time code is finished, the 4D system control apparatus 40 issues an end command to the haptic presentation device control apparatus 20 to finish the processing.

Subsequently, in a case where a command issued from the 4D system control apparatus 40 is other than the end command (step S183/No), the haptic presentation device control apparatus 20 generates a haptic control signal (which may be an audio signal that drives the vibration actuator) on the basis of the command by the control signal generation unit 201 (step S186).

Next, the haptic presentation device control apparatus 20 outputs the generated haptic control signal to the haptic presentation device 2 (or each vibration actuator of haptic presentation device 2) (step S189).

Here, specific description is given, with reference to FIG. 8, of the command processing by the control signal generation unit 201. FIG. 8 describes an example of the command processing in the control signal generation unit 201 of the haptic presentation device 2 according to the present embodiment. As illustrated in FIG. 8, when a command is inputted, the control signal generation unit 201 of the haptic presentation device control apparatus 20 analyzes the inputted command, and extracts a waveform type, a haptic presentation position, intensity, and offset information (the detail thereof is described later). Ina case where the command is encrypted, the control signal generation unit 201 decrypts the encrypted command, and extracts the waveform type, the haptic presentation position, the intensity, and the offset information.

Then, on the basis of the waveform type, the control signal generation unit 201 acquires a haptic library or generation haptic data (basically, the target waveform data is used from the head thereof forward, but in a case where information such as "Use from a position at some seconds" is added to the control command of the script, such information is to be followed). Next, the control signal generation unit 201 considers the acquired haptic data and the haptic presentation position to identify a plurality of vibration actuators and to calculate haptic control signals (waveform data) to be inputted to the respective vibration actuators. Upon the calculation, the control signal generation unit 201 refers to the profile information (number/position, transient response characteristics, resonant frequency, and frequency characteristics of vibration actuators) of the haptic presentation device 2.

Next, on the basis of "intensity" extracted from the command, the control signal generation unit 201 performs Gain adjustment such as amplification and attenuation of signal amplitude of the above-calculated haptic control signals to be outputted to the respective vibration actuators. It is to be noted that, upon the amplification of the signal amplitude, the control signal generation unit 201 refers to the profile information, and performs arithmetic operation not to allow the output to be equal to or more than the "maximum input voltage". In addition, upon the attenuation of the signal amplitude, arithmetic operation to set a value to "0" may be performed in a case of being equal to or less than a predetermined level. This makes it possible to eliminate small noises.

Then, in a case where the offset information is extracted by the command analysis, the control signal generation unit 201 performs signal delay processing based on the offset information in consideration of a delay amount in a preceding stage (a delay amount generated in the processing in the control signal generation unit 201 from the command input to the current point in time). Specifically, for example, in a case where the offset information is set at 4s, if the delay amount in the preceding stage is 3s, the generated haptic control signal is outputted to the haptic presentation device 2 after the elapse of 1s. Further, the control signal generation unit 201 may perform signal delay in which an amount of "processing time" generated in a subsequent stage (e.g., data transmission with the haptic presentation device 2, or a processing delay amount in the haptic presentation device 2) is subtracted. For example, in a case where the offset information is set at 5 s, if information, in which a delay amount in the preceding stage is 2 s while the "processing time" generated in the subsequent stage is 2 s, is acquired from the profile information, a control may be performed to allow the haptic control signal to be outputted to the haptic presentation device 2 after 1$s$ as a result of subtraction of these values. It is to be noted that, in a case where the offset information is not set, such signal delay processing is skipped.

As described above, using the script generated by the generation apparatus 10 and interposing the 4D system control apparatus 40 make it possible to achieve the control of the haptic presentation device 2 synchronized with the reproduction content and the 4D system.

In the present embodiment, the haptic presentation device control apparatus 20 on the reproduction side generates the haptic control signal on the basis of the control command described in the script, and only a script including text data with a relatively small data volume is sufficient as the data received from side of the generation apparatus 10. This makes it possible to reduce an amount of data distribution between the generation side and the reproduction side.

Supplement 1 . . . Setting of Offset Information

In a case where offset information is included in the command issued from the 4D system control apparatus 40, the haptic presentation device control apparatus 20 according to the present embodiment is able to control the haptic presentation device 2 (execute the command) at a timing set in consideration of the offset information.

The offset information may be set when generating a script in the generation apparatus 10. For example, the haptic presentation information generation unit 102 considers a processing delay amount on the reproduction side (e.g., a processing delay amount of the haptic presentation device control apparatus 20) to be able to automatically set offset information relative to a time axis or to enable the user to optionally set the offset information relative to the time axis.

FIG. 9 illustrates an example of a script including offset information according to the present embodiment. As illustrated in FIG. 9, a script is assumed in which a control command (that may be encrypted) including a haptic presentation position, a waveform type, intensity, and offset information is associated with a time axis.

The 4D system control apparatus 40 issues an associated command (including the offset information) to the haptic presentation device control apparatus 20 in accordance with a time code issued from the reproduction control apparatus 31. After reception of the command, the haptic presentation device control apparatus 20 executes the command after elapse of time of the offset information included in the command (specifically, outputs a haptic control signal generated in accordance with the command to the haptic presentation device 2). This makes it possible to eliminate the processing delay amount that may occur in the haptic presentation device control apparatus 20.

For example, in the example illustrated in FIG. 9, a control command in the first row described in the script is issued to the haptic presentation device control apparatus 20 at a timing of a time code 0 s, and the haptic presentation device control apparatus 20 immediately generates and outputs the haptic control signal to the haptic presentation device 2 because of the offset information "0(s)". Meanwhile, a control command in the second row described in the script of FIG. 9 is issued to the haptic presentation device control apparatus 20 at a timing of a time code Is, but the haptic presentation device control apparatus 20 outputs the generated haptic control signal to the haptic presentation device 2 (executes the command) 2 s after receiving the command because of the offset information "2(s)". In this case, on the time axis of the reproduction content, the control command in the second row is executed actually at a timing of "3 s". In this manner, the setting of the offset information "2(s)" allows for a margin in processing time of the haptic presentation device control apparatus 20, thus making it possible to eliminate the processing delay amount in the haptic presentation device control apparatus 20. Hereinafter, specific description is given with reference to FIG. 10.

FIG. 10 is a flowchart illustrating an example of a flow of the entire processing of command execution in the haptic presentation device control apparatus 20 in consideration of the offset information according to the present embodiment.

As illustrated in FIG. 10, when receiving a command from the 4D system control apparatus 40 (step S203), the haptic presentation device control apparatus 20 acquires offset information (n seconds) included in the command (step S206).

Next, in a case where n>0 holds true for the offset information (n seconds) (step S209/Yes), the haptic presentation device control apparatus 20 repeats arithmetic processing of n−1 (step S212) in a unit of one second until n becomes zero or less.

In a case where n becomes zero or less (step S209/No), the haptic presentation device control apparatus 20 executes a command (step S215). It is to be noted that the haptic presentation device control apparatus 20 may perform processing of generation of a haptic control signal based on the command in parallel with the processing from the above steps S206 to S212 after the reception of the command.

The description has been given above of the processing of the command execution in consideration of the offset information. It is to be noted that the offset information and a subtracted value indicated in the above step S212 may be a value equal to or less than a decimal point.

In addition, the haptic presentation device control apparatus 20 may observe elapsed time from the reception of the command and make comparison with the offset information to determine a timing for execution.

In addition, as a result of the processing of the command execution in consideration of the offset information, there is a case where the order of command reception and the order of command execution may not coincide with each other, depending on the offset information.

Supplement 2 . . . Presentation of Recommended Value Upon Generation of Haptic Data In the above-described generation of the haptic data from the audio data of the reproduction content (a function that is able to be added as the plug-in 2), the haptic data generation unit 103 is able to automatically select a haptic presentation position and intensity together on the basis of the audio data and to present them to the user as recommended values. For example, in a case where a sound effect, BGM, or dialogue is selected in the selection screen 1345 of FIG. 6, the haptic data generation unit 103 generates haptic data (waveform pattern) based on the selected audio data, and also automatically calculates a haptic presentation position (perceptual position) and intensity (perceptual intensity) based on such audio data, which haptic presentation position and intensity may be presented as recommended values in the setting screen 1341 of FIG. 6, for example. The user may also modify the presented recommended value.

In addition, the presentation of the recommended value of the haptic presentation position is not limited to the movement in a point shape as illustrated in FIG. 6: however, it is also possible to present a vertical, horizontal, or oblique movement, etc. (or rotation) in a linear shape (which may include a straight line or a curved line) as illustrated in FIG. 11. It is to be noted that such a movement in a linear shape may also be inputted when the user optionally sets the perceptual position.

For example, in a case where selected audio data (e.g., SE such as BGM or sound effects) is stereo data and a sound source is moving, a haptic presentation position that matches a moving direction of the sound source may be presented as a recommended value of the haptic presentation position. In addition, as the recommended value of the intensity, for example, intensity that matches a volume (sound volume) of the selected audio data may be presented. In addition, when recommending the intensity in accordance with the volume (sound volume), the haptic presentation information generation unit 102 may not reflect a small sound volume equal to or less than a predetermined value.

In this manner, automatically presenting a recommended value such as a perceptual position on the basis of audio data makes it possible to reduce the number of steps to be processed by a creator.

In addition, in a case where the haptic data generated from the audio data is close to data of an existing haptic Lib, the haptic data generation unit 103 may recommend the data of the haptic Lib. The selection of a haptic Lib that is not grasped by the creator makes it possible to reduce an amount of data to be distributed.

Supplement 3 . . . Concerning Installing Position of AMP (Amplifier)

In a case where the haptic presentation device 2 is coupled in a wired manner to the haptic presentation device control apparatus 20, it is preferable to provide (install at one location) an AMP (amplifier) on side of the haptic presentation device control apparatus 20.

In addition, in a case where the haptic presentation device 2 is wirelessly coupled to the haptic presentation device control apparatus 20, it is preferable to provide the AMP (amplifier) or a battery on the side of the haptic presentation device 2 because of large load of wirelessly distributing amplified data.

In addition, in a case where the haptic presentation device 2 is coupled to the 4D seat 4 in a wired manner to output a control signal to the haptic presentation device 2 via the 4D system control apparatus 40 and the 4D seat 4 from the haptic presentation device control apparatus 20 (in this case, a function of the haptic presentation device control apparatus 20 may be added to the 4D system control apparatus 40), it is preferable to provide the AMP on side of the 4D seat 4.

In addition, in a case where the haptic presentation device 2 is wirelessly coupled to the 4D seat 4 to output a control signal to the haptic presentation device 2 via the 4D system control apparatus 40 and the 4D seat 4 from the haptic presentation device control apparatus 20 (in this case, the function of the haptic presentation device control apparatus 20 may be added to the 4D system control apparatus 40), it is preferable to provide the AMP (amplifier) or the battery on the side of the haptic presentation device 2 because of large load of wirelessly distributing amplified data.

Supplement 4 . . . Concerning Data Transmission Between Haptic Presentation Device 2 and Haptic Presentation Device Control Apparatus 20

In data transmission between the haptic presentation device 2 and the haptic presentation device control apparatus 20, channels (e.g., 12 channels, in a case where 12 vibration actuators are provided in the haptic presentation device 2) for the number of the vibration actuators may be provided.

In addition, in order to reduce the number of the channels, data transmission may be performed using parallel/serial conversion. This makes it possible to perform the data transmission in one channel even for the plurality of vibration actuators. However, in this case, a delay for the serial/parallel conversion occurs on the side of the haptic presentation device 2. Specifically, when the haptic presentation device control apparatus 20 performs parallel/serial conversion output to perform serial communication with the haptic presentation device 2, it is necessary to increase a communication speed as compared with the case of parallel communication; however, even an example of the shortest case is assumed, a delay may occur. That is, for example, in a case of converting four pieces of parallel data into one piece of serial data, it is desirable to increase the communication speed by four times or more: however, for example, even an example of the shortest case is assumed where the communication speed is four times and conversion delay is zero, a delay equivalent to 1.5 Packet (in a case where data size to be converted is referred to as one Packet) may occur even for the shortest case, when the four pieces of parallel data are serially converted and transmitted. In addition, an increase in the number of pieces of parallel data results in being gradually closer to a delay equivalent to 2.0 Packets even for the shortest case. Therefore, in the present embodiment, it is possible to cope with the delay that may occur in this manner using the offset information in advance by setting a "separate delay" and thus to eliminate the delay amount.

In addition, as for the delay amount generated in the haptic presentation device 2, aside from the delay due to the parallel/serial conversion as described above, for example, transmission delay or processing delay due to packetization of continuous data may occur in a case of using packet communication for data transmission between the haptic presentation device control apparatus 20 and the haptic presentation device 2. Also in this case, it is possible to cope with the delay using the offset information in advance by setting the "separate delay".

In addition, the parallel/serial conversions may be performed on digital data, and the AMP may be provided on the side of the haptic presentation device 2.

In addition, frequency shift may be performed on a haptic control signal (haptic waveform data) to be transmitted to the haptic presentation device 2 to perform frequency multiplexing communication in each channel (in this case, the AMP is provided on the side of the haptic presentation device 2).

2-3. Modification Examples

Next, description is given of modification examples of the present embodiment.

2-3-1. Example of System Construction without Involving 4D System

As illustrated in FIG. 1, in the foregoing embodiment, the 4D system control apparatus 40 acquires a time code from the reproduction control apparatus 31, and refers to the script to issue a command appropriately to the haptic presentation device control apparatus 20 in response to the time code, but the present disclosure is not limited thereto; a system without involving the 4D system may be constructed. For example, there may be assumed a case where the haptic presentation device 2 is utilized in a movie theater in which the 4D system is not introduced, a case where the 4D system is introduced but a control system of the haptic presentation device 2 is constructed without being involved with the 4D system, or other cases.
(Configuration)

FIG. 12 describes an example of construction of a system without involving a 4D system according to a first modification example of the first embodiment. An information processing system 1*b* illustrated in FIG. 12 includes a generation apparatus 10A and a haptic presentation device control apparatus 20A.

The generation apparatus 10A is configured not to include the 4D control information generation unit 101, among the configuration of the generation apparatus 10 illustrated in FIG. 2. The haptic presentation device control apparatus 20A acquires a generation file including at least a script, generated by the generation apparatus 10A. Then, when acquiring a time code of a reproduction content from the reproduction control apparatus 31, the haptic presentation device control apparatus 20A refers to the script to execute a command appropriately. Specifically, on the basis of the time code received from the reproduction control apparatus 31, the haptic presentation device control apparatus 20A extracts a corresponding control command from the script (decrypts the extracted control command in a case of being encrypted), and generates a haptic control signal in accordance with the control command to output the generated haptic control signal to the haptic presentation device 2 (or each vibration actuator of the haptic presentation device 2).

In addition, FIG. 13 describes an example of construction of a system without a 4D system (an information processing system 1*b'*) according to the present modification example. In the example illustrated in FIG. 13, illustration of the configuration on the generation side is omitted; also in this case, the information processing system 1*b'* includes the generation apparatus 10A and the haptic presentation device control apparatus 20A.
(Operation Processing)

Processing of script generation in the generation apparatus 10A is similar to that of the foregoing first embodiment described with reference to FIG. 4, and thus detailed description thereof is omitted here.

FIG. 14 is a flowchart illustrating an example of a flow of the entire operation processing on the reproduction side of the information processing system 1*b* according to the present modification example. As illustrated in FIG. 14, when reproduction of the movie content is started (step S303), the reproduction control apparatus 31 distributes a time code indicating a reproduction position in the movie content to the haptic presentation device control apparatus 20A (step S306). The distribution of the time code is repeated until the reproduction of the movie content is finished (step S309).

Meanwhile, the haptic presentation device control apparatus 20A acquires (from the generation apparatus 10) the generation file including at least the script (step S312). In a case where a control code described in the script is encrypted, the haptic presentation device control apparatus 20A decrypts the encrypted control code.

Next, when a time code is distributed from the reproduction control apparatus 31, the haptic presentation device control apparatus 20A refers to the script to perform processing of command execution in accordance with the time code (step S315). Specifically, the haptic presentation device control apparatus 20A first extracts a control command of a time axis corresponding to the distributed time code from description of the script.

Then, the haptic presentation device control apparatus 20A generates a haptic control signal (which may be an audio signal that drives the vibration actuator) on the basis of the extracted control command (step S318).

Next, the haptic presentation device control apparatus 20A outputs the generated haptic control signal to the haptic presentation device 2 (or each vibration actuator of haptic presentation device 2) (step S321).

Then, the haptic presentation device control apparatus 20A repeats the processing indicated in the above steps S315 to S318 until the reception of the time code from the reproduction control apparatus 31 is finished (step S324).
(Effects)

As described above, it is possible, in the present modification example, to cause the haptic presentation device control apparatus 20A to control the presentation of a haptic stimulus in the haptic presentation device 2 on the basis of the script and the time code without involving the 4D system. This enables introduction into a movie theater, etc. not provided with the 4D system, thus allowing for wider variety of destinations of introduction. Enabling introduction into more and more movie theaters, etc. allows for lowered unit price of the system, thus allowing more business development of the system to be expected.

In addition, employing a system configuration to generate a haptic control signal on the basis of the script on the reproduction side only requires distribution of the script (text data) from the generation side, thus making it possible to reduce an amount of data.

2-3-2. Distribution of Haptic Control Signal in Response to Profile Information on Each Haptic Presentation Device 2

Not all the profile information (types of devices) of the haptic presentation device 2 utilized on the reproduction side need to be the same. That is, for example, not all the people in a movie theater need to wear common haptic presentation devices 2, and the haptic presentation devices 2 brought in by respective persons may be mixedly present. In this case, it is assumed that the profile information on each haptic presentation device 2 may vary; as illustrated in FIG. 15, the haptic presentation device control apparatus 20 according to the present modification example is able to acquire the profile information from each of the haptic presentation devices 2, refer to each profile information, and generate and send respective haptic control signals corresponding to the haptic presentation devices 2. FIG. 15 describes distribution of a haptic control signal in response to profile information on each haptic presentation device 2 according to a second modification example of the present embodiment.

As illustrated in FIG. 15, the respective haptic presentation devices 2 (2a to 2e) have different (types) of profile information (Pr-A to Pr-E). For example, it is assumed that number/position, transient response characteristics, resonant frequency, frequency characteristics, maximum input voltage, processing (delay) time, or the like of the vibration actuator varies.

The haptic presentation device control apparatus 20 may distribute a haptic control signal of the maximum available value to the individual haptic presentation device 2 on the basis of the profile information on each haptic presentation device 2.

It is to be noted that, in a case where each haptic presentation device 2 has an ID (type information, etc.), the haptic presentation device control apparatus 20 may acquire, on the basis of the ID acquired from each haptic presentation device 2, profile information from a database (which may be included in the haptic presentation device control apparatus 20 or may be provided on a network) in which the ID and the profile information are associated with each other.

This makes it possible to utilize the haptic presentation device 2 that matches a preference of the user. For example, the user is able to purchase and utilize the haptic presentation device 2 that matches his or her own physical constitution, instead of a common haptic presentation device 2 rented by a movie theater. Wearing the haptic presentation device 2 that matches the physical constitution makes it possible to fully exhibit performance of a bodily sensation in presentation of haptic stimuli of the haptic presentation device 2.

In addition, there are some people who are not able to appreciate a bodily sensation by the common haptic presentation device 2 due to circumstances where a person has a body part (abdomen, back, flanks, etc.) on which an arrangement of a vibration actuator is desired to be avoided due to a tickling sensation arising from a vibration or a person requires a vibration actuator to be arranged at a safe position due to use of a heart pacemaker. Even such people are able to appreciate the bodily sensation by bringing in the haptic presentation device 2 customized to each person into a movie theater for use.

In this manner, enabling the haptic presentation device control apparatus 20 to cope with a difference in the profiles between the haptic presentation devices 2 makes it only necessary to describe the control command on the basis of a standard-type profile on the generation side (generation apparatus 10), thus making it easier to introduce a new-type haptic presentation device 2 uniquely in each movie theater.

In addition, also when performing revival screening in a movie theater, there is no need to generate a new script on the generation side, and the haptic presentation device control apparatus 20 is able to correspond by reflecting the profile of the haptic presentation device 2 currently utilized in the movie theater and generating a haptic control signal.

It is to be noted then the generation side either may refer to a standard profile or a predetermined profile to generate a control command, or may use a type-specific profile to generate the control command. In a case of using the type-specific profile to generate the control command, the generation apparatus 10 may describe the control command for each specific profile type. Here, FIG. 16 illustrates an example of a script described for each specific profile type.

As illustrated in FIG. 16, a haptic presentation position (x,y-coordinates), a waveform type, and intensity are described for each specific profile type. In addition, offset information may be set in common for the profile types, and a delay for each profile may be managed by the side of the haptic presentation device control apparatus 20. On the basis of an ID acquired from each haptic presentation device 2, the haptic presentation device control apparatus 20 generates a haptic control signal using a control command of each corresponding profile type. It is to be noted that, in a case where there is no corresponding profile type, the haptic presentation device control apparatus 20 may use a predetermined standard profile type (e.g., Pr-A).

2-3-3. Achievement of Presentation of Haptic Stimulation Suitable for Children In the present embodiment, in a case where the haptic presentation device 2 is worn by a child, it is possible to adjust intensity of the haptic presentation to allow also the child to enjoy more safely.

Specifically, for example, each individual haptic presentation device 2 may determine child/adult use on the basis of a size (or on the basis of a setting) of the haptic presentation device 2 to adjust intensity in the haptic presentation from each vibration actuator. That is, a common haptic control signal (haptic control signal amplified uniformly on the side of the haptic presentation device control apparatus 20) transmitted from the haptic presentation device control apparatus 20 is subjected to signal attenuation to drive the vibration actuator in the haptic presentation device 2 for each child. Alternatively, the common haptic control signal transmitted from the haptic presentation device control apparatus 20 is amplified by changing respective signal amplification factors in the individual haptic presentation devices 2 (low signal amplification factor for children, and high signal amplification factor for adults) to drive the vibration actuators.

It is to be noted that, as a way to perform signal attenuation for (the haptic control signal amplified uniformly on the side of the haptic presentation device control apparatus 20) on the side of the haptic presentation device 2 for children, for example, it is possible to subject the signal to voltage dividing by configuring the vibration actuator and the resistor to be arranged in series. FIG. 17 illustrates an example of the configuration in which the vibration actuator and the resistor are arranged in series. In the haptic presentation device 2 for children, as illustrated in FIG. 17, the arrangement of the vibration actuator and the resistor in series enables, even for the same voltage, the haptic presentation device 2 for children to halve a voltage to be applied to the actuator as compared with that for adults (the same vibration actuator may be used both for adults and children).

As described above, according to the present modification example, it becomes possible, even for a child who is not able to appreciate a bodily sensation due to age restriction in the haptic presentation device 2 for adults in view of somatic effects, to appreciate a bodily sensation by performing intensity adjustment (signal attenuation, etc.) in the haptic presentation device 2 worn by a child. Accordingly, movie contents such as animation also falls under a movie for which the haptic presentation device 2 is utilized, which is advantageous in terms of entertainment. In addition, as in the configuration illustrated in FIG. 17, simplifying the mechanism for adjusting intensity makes it possible to inexpensively manufacture the haptic presentation device 2 for children.

2-3-4. Example of Construction of Home System

The above-described system on the reproduction side is not limited to the viewing of a movie in a movie theater descried above. For example, in a case where a user in a home wears the haptic presentation device 2 to view a content (a drama, a movie, a documentary, etc.) on TV broadcasting or distributed through the Internet, the above-described system on the reproduction side performs presentation of a haptic stimulus by the haptic presentation device 2 in synchronization with the reproduction of the content, thus making it possible to provide a viewing experience filled with a realistic sensation in a location other than the movie theater.

Hereinafter, description is given, with reference to FIGS. 18 and 19, of examples of construction of the system when applying to a home.

FIG. 18 describes an example of performing presentation of a haptic stimulus when viewing a content on TV broadcasting or through the Internet distribution. In this case, as illustrated in FIG. 18, a generation file including at least a script is distributed from a broadcast station 60 and a streaming server 66 together with the content on the TV broadcasting or through streaming distribution. The distribution of the script may be performed before reproduction of the content (before start of broadcast of a program, etc.).

A television apparatus 62 or a PC 68 having a display function reproduces the content, and, on the basis of a time code indicating a reproduction position of the content to be reproduced, refers to the script to sequentially transmit a corresponding command to the haptic presentation device control apparatus 20 (television apparatus 62 or PC 68 has a function of distributing a command in accordance with the acquired script). In addition, in a case where generation haptic data is also included in the generation file, the television apparatus 62 or the PC 68 transmits the generation haptic data to the haptic presentation device control apparatus 20 in advance.

The haptic presentation device control apparatus 20 generates a haptic control signal in accordance with the command received from the television apparatus 62 or the PC 68, and transmits the generated haptic control signal to the haptic presentation device 2 (or each vibration actuator provided in the haptic presentation device 2). Similarly to the foregoing embodiment, the command includes a presentation position of a haptic stimulus, intensity, a type of a haptic stimulus waveform, offset information, and the like. In addition, in a case where the command is encrypted, the haptic presentation device control apparatus 20 decrypts the encrypted command to generate the haptic control signal. In addition, the haptic presentation device control apparatus 20 includes the haptic Lib DB 221, where a haptic library (presentation waveform pattern) generated in advance is accumulated, which is appropriately utilized when generating the haptic control signal in accordance with the command distributed from the television apparatus 62 or the PC 68.

In addition, in the present modification example, it is possible to control the haptic presentation device 2 to be in synchronization with a reproduction content to perform presentation of a haptic stimulus, not only in a content distributed on TV broadcasting or through the Internet but also when a user views a content using a recording medium such as a Blu-ray (registered trademark) disc or a DVD. Hereinafter, detailed description is given with reference to FIG. 19.

FIG. 19 describes an example of performing presentation of a haptic stimulus when viewing a content recorded in a recording medium according to the present modification example. In a recording medium 7, an image data (content) and a generation file including at least a script are recorded. A reproduction apparatus 64 reads the content and the generation file from the recording medium 7.

A reproduction apparatus 64 having a display function reproduces the content, and, on the basis of a time code indicating a reproduction position of the content to be reproduced, refers to the script to sequentially transmit a corresponding command to the haptic presentation device control apparatus 20. In addition, in a case where generation haptic data is also included in the generation file, the reproduction apparatus 64 transmits the generation haptic data to the haptic presentation device control apparatus 20 in advance.

The haptic presentation device control apparatus 20 generates a haptic control signal in accordance with the command received from the reproduction apparatus 64, and transmits the generated haptic control signal to the haptic presentation device 2 (or each vibration actuator provided in the haptic presentation device 2). Similarly to the foregoing embodiment, the command includes a presentation position of a haptic stimulus, intensity, a type of a haptic stimulus waveform, offset information, and the like. In addition, in a case where the command is encrypted, the haptic presentation device control apparatus 20 decrypts the encrypted command to generate the haptic control signal. In addition, the haptic presentation device control apparatus 20 includes the haptic Lib DB 221, where a haptic library (presentation waveform pattern) generated in advance is accumulated, which is appropriately utilized when generating the haptic control signal in accordance with the command distributed from the reproduction apparatus 64. It is to be noted that, as an example of using a recording medium (Media medium), aside from the configuration illustrated in FIG. 19, a configuration may be conceivable, in which a script Disc is set in the haptic presentation device control apparatus 20 and the haptic presentation device control apparatus 20 executes a command from the script. That is, a double Disc for a content and a script is prepared in advance, the content Disc is set in a (versatile) reproduction apparatus, and the script Disc is set in the haptic presentation device control apparatus 20. The reproduction apparatus reproduces a content from the content Disc, and inputs reproduced audio data to the haptic presentation device control apparatus 20. The haptic presentation device control apparatus 20 performs timing extraction from the inputted audio data, and executes the command from the script. Here, in the script, a control command is described in association with a pattern of the audio data instead of time information.

As described above, when viewing a content distributed on TV broadcasting or through the Internet, the script is also distributed on the TV broadcasting, etc., thereby causing the haptic presentation device 2 to enable the user to feel a bodily sensation of a haptic stimulus corresponding to the latest content.

In addition, also when viewing a content stored in storage medium, reading a script from the storage medium causes the haptic presentation device 2 to enable the user to feel a bodily sensation of a haptic stimulus corresponding to the content stored in the storage medium. It is also possible for the user to repeatedly feel a bodily sensation of only a favorite scene at favorite time.

It is to be noted that operation processing when viewing the content distributed on the TV broadcasting or through the Internet is not limited to the example illustrated in FIG. 18. The description has been given, in the example illustrated in FIG. 18, of the example in which the script is distributed from the broadcast station 60 or the streaming server 66 to a reproduction apparatus (television apparatus 62 or PC 68) of a home to cause the reproduction apparatus to generate and distribute a command. However, the present modification example is not limited thereto; the broadcast station 60 or the streaming server 66 may refer to the script to distribute a command in response to a time code of a content to be reproduced.

The reproduction apparatus (television apparatus 62 or PC 68) in the home outputs the received command to the haptic presentation device control apparatus 20, and the haptic presentation device control apparatus 20 generates a haptic control signal in accordance with the command to transmit the haptic control signal to the haptic presentation device 2.

At this time, when generation haptic data is included in the generation file acquired from the generation side, the broadcast station 60 or the streaming server 66 transmits the generation haptic data to the reproduction apparatus (television apparatus 62 or PC 68) in advance (prior to distribution of the content) via the TV broadcasting. The reproduction apparatus (television apparatus 62 or PC 68) transmits the received generation haptic data to the haptic presentation device control apparatus 20.

In this manner, side of the broadcast station distributes a corresponding command in synchronization with the reproduction content, and the haptic presentation device control apparatus 20 generates a haptic control signal in accordance with the command, thus making it possible to utilize the haptic presentation device control apparatus 20 used in the system of a movie theater without adding a command generation function to the home reproduction apparatus (television apparatus 62 or PC 68).

2-3-5. Haptic Presentation System in Internet Game

Subsequently, description is given of a haptic presentation system in Internet games as a fifth modification example of the present embodiment.

FIG. 20 describes a haptic presentation system in an Internet game according to a fifth modification example of the present embodiment. Here, a case is assumed where a user wears the haptic presentation device 2 and operates a game using a controller 86, etc. while viewing a game screen displayed on a display apparatus 84. The input of operation information is not limited to an operation of the controller 86, and may be a sound input, a gesture input based on a motion of the user, etc. A game reproduction apparatus 82 for a home controls the display apparatus 84 to display a game screen. In addition, the game reproduction apparatus 82 also controls outputting of a gaming sound from a speaker provided in the display apparatus 84 and a peripheral speaker. Here, a case is assumed where game information is acquired from a game server 80 on the Internet and is outputted by the game reproduction apparatus 82. In addition, the game reproduction apparatus 82 includes a controlling unit of the haptic presentation device, and may execute generation of a haptic control signal to be inputted to the haptic presentation device 2.

In a case where some action occurs in a game by user operation (or in a case where some action occurs in the game regardless of the user operation), the game reproduction apparatus 82 notifies the game server 80 of the action that has occurred.

The game server 80 includes a script describing haptic presentation control corresponding to the game, and extracts a command corresponding to the action (reproduction content) that has occurred in the game to output the extracted command to the game reproduction apparatus 82. Here, FIG. 21 illustrates an example of a script describing control commands for respective actions according to the present modification example. As illustrated in FIG. 21, a plurality of actions is defined in one script file. In addition, a command group is defined for each action. One action is defined by several hundred (ms) to several (s). At a time point when an output of the last waveform type of each action is completed, presentation of a haptic stimulus corresponding to the action is finished. In addition, a command corresponding to the action is preferably transmitted collectively to the game reproduction apparatus 82 (for a countermeasure against fluctuation in Internet-based communication). In addition, intensity of the haptic stimulus may be optionally adjusted on side of the game reproduction apparatus 82 ("intensity: *" as illustrated in FIG. 21).

Then, the game reproduction apparatus 82 generates a haptic control signal in accordance with the received command, and outputs the generated haptic control signal to the haptic presentation device 2. Consequently, in the present modification example, a haptic stimulus corresponding to an action such as an explosion or the like that has occurred in the game is presented by the haptic presentation device 2, thus enabling the user to actually feel a bodily sensation of the action that has occurred in the game and to obtain a realistic sensation.

It is to be noted that the game reproduction apparatus 82 may be provided in advance with a database of a haptic library, and may receive (download) generation haptic data to be utilized in the game in advance from the game server 80 prior to start of the game.

In addition, a profile of the haptic presentation device 2 is uploaded to the game reproduction apparatus 82 prior to the start of the game.

In addition, the game reproduction apparatus 82 is assumed here to be a stationary-type dedicated apparatus, but the present modification example is not limited thereto, and may be, for example, the game reproduction apparatus 82 with versatility integrated with the display apparatus 84, such as a smartphone or a PC.

In addition, the description has been given here, as an example, of the case of Internet game distribution, but the present embodiment is not limited thereto, causing the game reproduction apparatus 82 to execute the function of the game server 80 enables application to a case where a game is performed locally. In addition, the present embodiment is also applicable to a case of distribution of a competition type game through the Internet. In this case, it is also assumed that an action of one player may cause haptic presentation to be given to the other player. That is, the haptic presentation to the user is not limited to haptic presentation originated from an action taken by the user him- or herself or from game progress, and haptic presentation originated from another user is also assumed.

As described above, it is possible to provide a system that enables a more realistic sensation even in a case where a game is performed. In addition, providing the interactive system makes it possible to further increase value of a bodily sensation of the user.

2-3-6. Time Code Distribution Method by Optical Communication

In the respective systems (information processing systems 1, 1b, and 1b') applied to a movie theater described with reference to FIGS. 1, 12 and 13, a time code distributed from the cinema system 30 via wired/wireless communication coupling is used to synchronize the haptic presentation device control apparatus 20 with the cinema system 30: however, the present disclosure is not limited thereto.

For example, as illustrated in FIG. 22, a method may be employed, in which a time code projected on the screen S by the projector 32 is read by a haptic presentation device control apparatus 20B to acquire the time code.

The haptic presentation device control apparatus 20B observes an image projected on the screen S (continuously captures an image by visible light, an IR camera, or the like) to extract a synchronization component (here, a time code) from results of the observation. Specifically, for example, the projector 32 superimposes, on an image to be projected, a blink indicating a time code transmitted from the reproduction control apparatus 31 using visible light or IR light.

It is to be noted that the time code distribution by the optical communication is not limited to a scheme using reflected light from the screen S; direct light from the projector 32 may be observed by the haptic presentation device control apparatus 20B to extract the time code.

In addition, a synchronization signal to be projected on the screen S may not be projected on the entire screen S, but on a limited portion thereof.

In this manner, in the present modification example, using the optical communication for the distribution of the time code makes it possible to install the cinema system 30 and the haptic presentation device control apparatus 20 independently (without a need of coupling by wired/wirelessly to the cinema system 30 or the 4D system control apparatus 40 coupled to the cinema system 30).

2-3-7. Command Distribution Method by Optical Communication

In addition, the command distribution to the haptic presentation device control apparatus 20 is not limited to the one by the wired/wireless coupling from the 4D system control apparatus 40 as illustrated in FIG. 1; for example, as illustrated in FIG. 23, a method may be employed, in which a command projected on the screen S by the projector 32 of the cinema system 30 is read by each haptic presentation device 2B.

As illustrated in FIG. 23, the haptic presentation device 2B observes an image projected on the screen S by an observation unit 22 (such as a visible light or an IR camera) to extract a trigger component (here, a command) from results of the observation. Specifically, for example, the projector 32 superimposes, on an image to be projected, a blink indicating a command transmitted from the reproduction control apparatus 31 using visible light or IR light.

The haptic presentation device 2B includes a controlling unit 24 that generates a haptic control signal. The controlling unit 24 generates a haptic control signal to be inputted to each vibration actuator in accordance with a command extracted from the results of the observation to control the vibration actuator. That is, the haptic presentation device 2B may present a haptic sense in a haptic waveform specified by the command using reception (light reception) of the command signal as a trigger.

It is to be noted that the command distribution by the optical communication is not limited to the scheme using reflected light from the screen S: direct light from the projector 32 may be observed by the haptic presentation device 2B to extract the command.

In addition, a trigger signal to be projected on the screen S may not be projected on the entire surface of the screen S, but on a limited portion thereof.

In this manner, in the present modification example, employing wireless command distribution and providing the haptic presentation device 2B with the function of generating a haptic control signal allow the haptic presentation device 2B itself to be wireless (in this case, the haptic presentation device 2B is driven by a battery), thus making it easier to introduce the system into a movie theater (because there is no need to install a wiring line in each seat). In addition, as for a difference between profiles of respective haptic presentation devices 2B, the controlling unit 24 executes difference processing, etc. with respect to a standard profile, thereby making it easier to bring in the haptic presentation device 2B of an audience him- or herself.

In addition, causing the haptic presentation device 2B to be wireless makes it also possible to utilize the haptic presentation device 2B according to the present modification example in a Walkthrough system that allows one to move around with a free viewpoint in a virtual space, etc. in a game or an attraction.

It is to be noted that, as a practical application example, the command to be projected on the screen S may be outputted by the haptic presentation device control apparatus 20 using a light source different from that for the projection of the content (image). FIG. 24 describes a method of performing command distribution by optical communication using a light source different from that for the projection.

As illustrated in FIG. 24, when receiving a time code from the reproduction control apparatus 31, a haptic presentation device control apparatus 20C refers to a script to extract a command, controls a light-emitting unit 34 provided in a portion of the screen S or in the vicinity thereof, and controls output of light indicating the command.

The haptic presentation device 2B observes the light emitted from the light-emitting unit by the observation unit 22 (such as visible-light or IR camera, etc.), and extracts a trigger component (here, a command) from results of the observation. Specifically, for example, the haptic presentation device control apparatus 20C outputs a blink indicating a command from the light-emitting unit 34 using visible light or IR light.

The haptic presentation device 2B includes the controlling unit 24 that generates a haptic control signal. The controlling unit 24 generates a haptic control signal to be inputted to each vibration actuator in accordance with a command extracted from the results of the observation to control the vibration actuator. That is, the haptic presentation device 2B may present a haptic sense in a haptic waveform specified by the command using reception (light reception) of the command signal as a trigger.

3. Second Embodiment (Creation of Haptic Control Signal on Generation Side)

Subsequently, description is given, with reference to FIGS. 25 to 33, of a case where a haptic control signal is created on the generation side. In the foregoing first embodiment, the haptic control signal to be inputted to each vibration actuator of the haptic presentation device 2 is generated on the reproduction side in accordance with the command extracted by referring to the script generated on the generation side; however, the present disclosure is not limited thereto. Description is given, in a second embodiment of the present disclosure, of a case where a haptic control signal to be inputted to each vibration actuator in response to the reproduction content is generated in advance on the generation side, and a generation file including the haptic control signal is outputted to the reproduction side.

According to the present embodiment, a burden of arithmetic processing (processing of generation of a haptic control signal) in a haptic presentation device control apparatus 20*m* is reduced, thus making it possible to suppress specifications (processing performance) of the haptic presentation device control apparatus 20*m* to be introduced into a movie theater, for example.

3-1. Configuration Example (Overall Configuration)

FIG. 25 illustrates an example of an overall configuration of an information processing system 1*c* according to the second embodiment. As illustrated in FIG. 25, the information processing system 1*c* according to the present embodiment includes a generation apparatus 10*m*, the haptic presentation device control apparatus 20*m*, the cinema system 30, the 4D system control apparatus 40, and the verification system 50. In the present embodiment, a case is assumed where the haptic presentation device 2 is used in a movie theater.

Unlike the first embodiment described with reference to FIG. 1, in the present embodiment, the generation apparatus 10*m* generates a haptic control signal file, and distributes the haptic control signal file to the 4D system control apparatus 40. The haptic control signal file is data of a vibration waveform pattern to be inputted to each vibration actuator. That is, the generation apparatus 10*m* performs an arithmetic operation on the basis of haptic data (waveform pattern desired to be perceived) used for the current content (e.g., a movie to be screened), in consideration of a haptic presentation position, intensity, a waveform type, etc. (based on the profile of the haptic presentation device 2) to generate a haptic control signal to be inputted to each vibration actuator of the haptic presentation device 2.

In addition, the generation apparatus 10*m* also generates a script corresponding to a time axis of the reproduction content, and distributes the generated script to the 4D system control apparatus 40. Haptic control signal file names corresponding to the time axis are described in the script.

The 4D system control apparatus 40 transmits the haptic control signal file to the haptic presentation device control apparatus 20*m* prior to start of the movie. The haptic presentation device control apparatus 20*m* accumulates the haptic control signal file in a haptic control signal file DB 224.

Then, the 4D system control apparatus 40 outputs a command indicating the corresponding haptic control signal file name to the haptic presentation device control apparatus 20*m* on the basis of description of the script in accordance with a time code distributed from the reproduction control apparatus 31. The haptic presentation device control apparatus 20*m* outputs a haptic control signal file specified by the command to the haptic presentation device 2. At this time, the haptic presentation device control apparatus 20*m* may be adjusted a little in accordance with the profile acquired from the haptic presentation device 2, and then may output a haptic control signal to the haptic presentation device 2. The haptic presentation device control apparatus 20*m* may be configured not to include the haptic control signal generation function (control signal generation unit 201), among the respective configurations described with reference to FIG. 3 in the first embodiment.

(Configuration of Apparatus)

Next, description is given, with reference to FIG. 26, of a configuration of the generation apparatus 10*m* according to the present embodiment. FIG. 26 is a block diagram illustrating an example of a configuration of the generation apparatus 10*m* according to the present embodiment. As illustrated in FIG. 26, the generation apparatus 10*m* includes a control unit 100*m*, the communication unit 110, the operation input unit 120, the display unit 130, and the storage unit 140. Detailed description of the configurations of the same reference numerals described with reference to FIG. 2 is omitted here.

The control unit 100*m* according to the present embodiment also functions as the 4D control information generation unit 101, the haptic presentation information generation unit 102, the haptic data generation unit 103, and a haptic control signal generation unit 104.

The haptic control signal generation unit 104 generates a haptic control signal (control signal to be inputted to each individual vibration actuator) for driving each vibration actuator provided in the haptic presentation device 2 during reproduction. Specifically, the haptic control signal generation unit 104 generates haptic control signals (e.g., audio signal data) that drive respective vibration actuators to present a haptic stimulus at a specified haptic presentation position, by a specified haptic stimulus type, and with specified intensity, in accordance with an operational input by a user (creator). It is to be noted that the haptic control signals are generated for vibration actuators (for the number of channels), and are generated independently for respective scenes. That is, the haptic control signals to be inputted to the respective vibration actuators are generated not as one data throughout the entire content, but are generated as independent data (file) for respective scenes in which the haptic presentation device 2 is vibrated in the content.

In response to a time axis of the reproduction content, a script describing file names of the haptic control signals generated by the haptic control signal generation unit 104 is generated in the haptic presentation information generation unit 102. It is to be noted that FIGS. 5 to 6 described in the first embodiment are applicable to an operation screen during generation of the script. In addition, similarly to the first embodiment, a haptic stimulus type may be selected from generation haptic data (waveform pattern) generated by the haptic data generation unit 103 on the basis of audio data of sound effects, BGM, or dialogue of a reproduction content selected by the user, or from a (versatile) haptic library (waveform pattern) generated in advance and accumulated in the haptic Lib DB 141. In addition, similarly to the first embodiment, a haptic presentation position and intensity may be automatically selected and presented as recommended values to the user. For example, when generating haptic data (waveform patterns) on the basis of audio data of sound effects, BGM, or dialogue, the haptic presentation position (perceptual position) and the intensity (perceptual intensity) based on the same audio data may be automatically calculated and presented as recommended values on the screen. In addition, it may also be possible for the user to change the presented recommended values.

3-2. Operation Processing

Next, description is given, with reference to FIGS. 27 and 28, of operation processing of the information processing system 1c according to the present embodiment.

3-2-1. Operation Processing on Generation Side

FIG. 27 is a flowchart illustrating an example of a flow of the entire operation processing on generation side of the information processing system according to the present embodiment.

Each processing from steps S103 to S127 illustrated in FIG. 27 is similar to the processing indicated by the same reference numeral described with reference to FIG. 4.

Next, the haptic control signal generation unit 104 of the generation apparatus 10m generates a file of a haptic control signal (e.g., audio signal data) that drives each vibration actuator on the basis of a haptic presentation position, a haptic stimulus type, and intensity specified by a user (step S128).

Then, the haptic presentation information generation unit 102 generates a script (text data) in which file names of the haptic control signals are described (as commands) in association with a time code (time axis) of a reproduction content (step S131). It is to be noted that the haptic presentation information generation unit 102, upon the generation of the script, may refer to the profile (e.g., processing delay amount) of the haptic presentation device 2 to include the offset information in the command appropriately, similarly to the first embodiment. In addition, similarly to the first embodiment, setting of the offset information may be performed automatically taking into consideration a processing delay amount on the reproduction side (e.g., a processing delay amount of the haptic presentation device control apparatus 20), or the offset information may be optionally set by the user. In addition, similarly to the first embodiment, the generation apparatus 10m according to the present embodiment may generate a haptic control signal for each specific profile type and describe a control code for each specific profile type, or may generate a haptic control signal on the basis of a standard profile type. Ina case where the haptic control signal is generated on the basis of the standard profile type, the haptic control signal may be adjusted appropriately and outputted on the reproduction side depending on the profile type (depending on the difference from the standard profile type).

The generated script is included in the "generation file" together with the haptic control signal, and distributed to the reproduction side (e.g., 4D system control apparatus 40). In addition, the 4D control information generated in the generation apparatus 10m is also distributed together to the reproduction side (e.g., 4D system control apparatus 40).

The function of generating the script and the haptic control signal described above may be added as the plug-in 1 to an existing 4D system editing application.

3-2-2. Operation Processing on Reproduction Side

Subsequently, description is given, with reference to FIG. 28, of operation processing on the reproduction side in which the generated generation file is distributed as described above. FIG. 28 is a flowchart illustrating an example of a flow of the entire operation processing on the reproduction side of the information processing system according to the present embodiment.

Among each processing illustrated in FIG. 28, processing similar to the processing described with reference to FIG. 7 is denoted by the same reference numeral, and detailed description thereof is omitted here. Description is given mainly here of a point different from that of the operation processing on the reproduction side according to the first embodiment.

First, the 4D system control apparatus 40 acquires 4D control information and a generation file including a script and a haptic control signal file (step S163).

Next, the 4D system control apparatus 40 transmits the haptic control signal file included in the generation file to the haptic presentation device control apparatus 20m (step S166).

Then, the haptic presentation device control apparatus 20m stores the haptic control signal file received from the 4D system control apparatus 40 (step S169).

Next, when a time code is distributed from the reproduction control apparatus 31, the 4D system control apparatus 40 refers to the 4D control information to drive the 4D system in accordance with the time code (step S171).

In addition, in accordance with the same time code, the 4D system control apparatus 40 refers to the script to perform command-issuing processing (step S174). Specifically, the 4D system control apparatus 40 extracts, from description of the script, haptic control signal file names (which may be encrypted data) corresponding to the distributed time code for issuance as commands. Here, FIG. 29 illustrates an example of a script in which the haptic control signal file names are described as commands. As illustrated in FIG. 29, the haptic control signal file names are described as commands to be outputted in accordance with the time axis of the reproduction content. In addition, the haptic control signal indicated by the haptic control signal file name is a file corresponding to each vibration actuator. It is assumed, in the example illustrated in FIG. 29, that outputs are given to vibration actuators 1 to 4 (four vibration actuators) provided in the haptic presentation device 2. For example, the first row of the script indicates a haptic control signal file 1-a to be inputted to the vibration actuator 1 (Act1), a haptic control signal file 2-a to be inputted to the vibration actuator 2 (Act2), a haptic control signal file 3-a to be inputted to the vibration actuator 3 (Act3), and a haptic control signal file 4-a to be inputted to the vibration actuator 4 (Act4).

It is to be noted that these file names may be encrypted.

Then, the 4D system control apparatus 40 issues a command to the haptic presentation device control apparatus 20m in accordance with the time code (step S177).

Next, in a case where the command issued from the 4D system control apparatus 40 is other than an end command (step S183/No), the haptic presentation device control apparatus 20m reads a haptic control signal file specified by the command from the haptic control signal file DB 224 (step S187), and outputs the read haptic control signal file to the haptic presentation device 2 (or each vibration actuator of the haptic presentation device 2) (step S189). In addition, in a case where a substance of the command distributed from the 4D system control apparatus 40 is encrypted, the haptic presentation device control apparatus 20m decrypts the encryption, and extracts a haptic control signal file name for reading from the haptic control signal file DB 224. In addition, in a case where the command includes the offset information, output control is performed on the haptic control signal, in consideration thereof, similarly to the first embodiment.

Description is given here, with reference to FIG. 30, of a case of performing a control (presentation of haptic stimulus) of each of the vibration actuators (Act1 to Act4) of the haptic presentation device 2 in accordance with the script illustrated in FIG. 29. For example, in accordance with a substance of a command 1 (first row of the command illustrated in FIG. 29) issued in response to a time code at 0.0 s of the reproduction content, the haptic presentation device control apparatus 20m reproduces the haptic control signal file 1-a at the vibration actuator 1 (Act1), reproduces the haptic control signal file 2-a at the vibration actuator 2 (Act2), reproduces the haptic control signal file 3-a at the vibration actuator 3 (Act3), and reproduces the haptic control signal file 4-a at the vibration actuator 4 (Act4). The reproduction time may vary depending on the respective haptic control signal files.

Next, in accordance with a substance of a command 2 (second row of the command illustrated in FIG. 29) issued in response to a time code at 0.8 s of the reproduction content, the haptic presentation device control apparatus 20m reproduces a haptic control signal file 2-b at the vibration actuator 2 (Act2).

Subsequently, in accordance with a substance of a command 3 (third row of the command illustrated in FIG. 29) issued in response to a time code at 1.8 s of the reproduction content, the haptic presentation device control apparatus 20m reproduces a haptic control signal file 2-c at the vibration actuator 2 (Act2), and reproduces a haptic control signal file 4-b at the vibration actuator 4 (Act4).

In this manner, in accordance with a command, the haptic presentation device control apparatus 20m inputs a haptic control signal to a corresponding vibration actuator for reproduction (presentation of a haptic stimulus).

The specific description has been given above of the information processing system according to the second embodiment. It is to be noted that, even in a case where there is the same data as a haptic control signal for different file names (e.g., in a case where the haptic control signal file 1-a and the haptic control signal file 1-d are the same audio signal data), the generation apparatus 10m is able to reduce the size of transmission data by describing use of the haptic control signal file 1-a at a location of the haptic control signal file 1-d upon the generation of the script. In this case, for example, "7.0 s: 1-d, 4-d" in the ninth row of the command illustrated in FIG. 29 is described into "7.0 s: 1-a, 4-d".

In addition, the haptic control signal file included in the generation file may be stored in the 4D system control apparatus 40, and the 4D system control apparatus 40 may be controlled to refer to a command to transmit a corresponding haptic control signal file to the haptic presentation device 2 in accordance with the time code. That is, mounting the 4D system control apparatus 40 with the functions of the haptic presentation device control apparatus 20m illustrated in FIG. 25 makes it possible to simplify the system on the reproduction side.

Subsequently, several descriptions are given of modification examples of the present embodiment.

3-3. Modification Examples

3-3-1. Example of System Construction without Involving 4D System

As illustrated in FIG. 25, in the foregoing embodiments, the 4D system control apparatus 40 acquires a time code from the reproduction control apparatus 31, and refers to the script to issue a command appropriately to the haptic presentation device control apparatus 20m in response to the time code, but the present disclosure is not limited thereto; a system without involving the 4D system may be constructed. For example, there may be assumed a case where the haptic presentation device 2 is utilized in a movie theater in which the 4D system is not introduced, a case where the 4D system is introduced but a control system of the haptic presentation device 2 is constructed without being involved with the 4D system, or other cases.

(Configuration)

FIG. 31 describes an example of construction of an information processing system $1_d$ without involving a 4D system according to a first modification example of the second embodiment. The information processing system 1d illustrated in FIG. 31 includes a generation apparatus 10n and a haptic presentation device control apparatus 20n.

The generation apparatus Ion is configured not to include the 4D control information generation unit 101, among the configuration of the generation apparatus 10m illustrated in FIG. 26. The haptic presentation device control apparatus 20n acquires a generation file including a script and a haptic control signal file, generated by the generation apparatus 10n. Then, when acquiring a time code of a reproduction content from the reproduction control apparatus 31, the haptic presentation device control apparatus 20n refers to the script to execute a command appropriately. Specifically, on the basis of the time code received from the reproduction control apparatus 31, the haptic presentation device control apparatus 20n extracts a corresponding command from the script (decrypts the extracted command in a case of being encrypted), and outputs a haptic control signal specified by the command to the haptic presentation device 2 (or each vibration actuator of the haptic presentation device 2). The haptic control signal file DB 224 stores the haptic control signal file extracted from the generation file.

FIG. 31 exemplifies a case where, in a movie theater to which the 4D system is applied, the haptic presentation device control apparatus 20n controls the haptic presentation device 2 in synchronization with a reproduction content without being involved with the 4D system; however, the present system is also applicable, as a matter of course, to a movie theater in which the 4D system is not introduced.

(Operation Processing)

Processing of script generation in the generation apparatus Ion is similar to that of the foregoing second embodiment described with reference to FIG. 27, and thus detailed description thereof is omitted here.

FIG. 32 is a flowchart illustrating an example of a flow of the entire operation processing on the reproduction side of the information processing system 1d according to the present modification example. Among each processing illustrated in FIG. 32, processing similar to the processing described with reference to FIG. 14 is denoted by the same reference numeral, and detailed description thereof is omitted here. Description is given mainly here of a point different from that of the operation processing on the reproduction side according to the first modification example of the first embodiment in which a haptic control signal is generated on the reproduction side.

As illustrated in FIG. 32, the haptic presentation device control apparatus 20n acquires (from the generation apparatus 10n) a generation file including a script and a haptic control signal file (step S313). The haptic control signal file is stored in the haptic control signal file DB 224.

Next, when a time code of a reproduction content is distributed from the reproduction control apparatus 31, the haptic presentation device control apparatus 20*n* refers to the script to perform processing of command execution in accordance with the time code (step S315).

Then, the haptic presentation device control apparatus 20*n* reads a haptic control signal file (which may be an audio signal that drives the vibration actuator) specified by the extracted command from the haptic control signal file DB 224 (step S319).

Next, the haptic presentation device control apparatus 20*n* outputs the read haptic control signal to the haptic presentation device 2 (or each vibration actuator of the haptic presentation device 2) (step S322).

As described above, it is possible, in the present modification example, to cause the haptic presentation device control apparatus 20*n*, without involving the 4D system, to read a haptic control signal corresponding to a time code on the basis of a script and output the read haptic control signal to the haptic presentation device 2, thus making it possible to control the presentation of a haptic stimulus. This enables introduction into a movie theater, etc. not provided with the 4D system, thus allowing for a wider variety of destinations of introduction. Enabling introduction into more and more movie theaters, etc. allows for lowered unit price of the system, thus allowing more business development of the system to be expected.

In addition, employing a system configuration to read a haptic control signal on the basis of the script on the reproduction side makes it possible to reduce a burden of processing on the reproduction side.

3-3-2. Example of Construction of Home System

The above-described system on the reproduction side is not limited to viewing of a movie in a movie theater as described above. Similarly to the modification example of the first embodiment, for example, in a case where a user wears the haptic presentation device 2 in a home to view a content (a drama, a movie, a documentary, etc.) distributed on TV broadcasting or through the Internet or in a case where the user plays an Internet game, it is possible, for the haptic presentation device 2, to perform the presentation of a haptic stimulus in synchronization with reproduction of the content or an action that occurs in the game, thus making it possible to provide a viewing experience with a realistic sensation even in a location other than a movie theater.

Hereinafter, description is given, with reference to FIG. 33, of an example of construction of a system upon application to a home.

FIG. 33 describes an example of performing presentation of a haptic stimulus when viewing a content on TV broadcasting according to the present modification example. As illustrated in FIG. 33, a haptic presentation device control apparatus 20*p* receives (downloads) a haptic control signal from the broadcast station 60 in advance (prior to distribution of the content). Downloading of the haptic control signal may be performed by the television apparatus 62 through the TV broadcasting.

In this manner, in a case where the generation side generates the haptic control signal corresponding to the content (broadcast program) and distributes the generated haptic control signal included in the generation file to the broadcast station 60, the broadcast station 60 transmits a haptic control signal with a large data volume to home side in advance through the TV broadcasting, etc., thereby making it possible to distribute large volume data without being influenced by a communication band of the TV broadcasting, etc.

Then, at the start of broadcasting, in response to a time code of a content to be reproduced (program to be broadcast), the broadcast station 60 refers to a script to sequentially distribute a command (indicating a haptic control signal file to be reproduced in response to the time code) to each home (television apparatus 62). The television apparatus 62 displays the content (broadcast program) received through the TV broadcasting on the display, and outputs the distributed command to the haptic presentation device control apparatus 20*p*.

The haptic presentation device control apparatus 20*p* reads a haptic control signal specified by the command from the haptic control signal file DB 224, and outputs the read haptic control signal to the haptic presentation device 2.

As described above, also in the second embodiment, it is possible to synchronize the presentation of a haptic stimulus by the haptic presentation device 2 when viewing the TV broadcasting, thus making it possible to experience viewing filled with a more realistic sensation also in a home.

It is to be noted that description has been given here of the case of viewing a TV broadcast program (movie, drama, etc.) as an example, but the present modification example is not limited thereto, and is also applicable to the time when viewing Internet distribution or when playing an Internet game, similarly to the first embodiment.

In addition, in a case where the present embodiment is applied to the movie theater as illustrated in FIGS. 25 and 31, the distribution of the time code is not limited to the distribution using the wired/wireless coupling with the reproduction control apparatus 31 and the 4D system control apparatus 40; it may also be possible to utilize the time code distribution method by optical communication (see FIG. 22) as described in the modification example of the foregoing first embodiment.

In addition, also for the distribution of a command for specifying a haptic control signal file name, it may also be possible to utilize the command distribution method by optical communication (see FIGS. 23 and 24) as described in the modification example of the foregoing first embodiment.

4. Third Embodiment

Subsequently, description is given, with reference to FIGS. 34 to 37, of a modification example of an editing function of haptic presentation (generation haptic data) by a user. FIGS. 34 to 37 each illustrate an example of an edit screen according to a third embodiment.

In the embodiment described hereinbefore, the user specifies the setting screen 1330 for the haptic presentation device 2 included in the edit screen 1300 as illustrated in FIG. 5 to thereby be able to specify a time zone when generating a vibration. etc. in the haptic presentation device 2. In addition, when the user selects the specified time zone 1331 by a tap (or click, etc.) operation on the setting screen 1330, the detailed setting screen 1340 illustrated in FIG. 6 is displayed, thus making it possible to select a haptic type (waveform type of vibration stimulus), set a haptic presentation position (perceptual position), and adjust perceptual intensity on the detailed setting screen 1340. However, in the present embodiment, the selection, setting, and adjustment are performed by making selection (i.e., constraint exists) from haptic data or a haptic library (e.g., a typical waveform pattern) generated in advance; the user is not able to freely and finely perform the setting and the adjustment. Therefore, description is given, in the present embodiment, of an editing function that enables the user to finely and freely perform editing on the waveform of a vibration stimulus, the setting of the haptic presentation position, the adjustment of perceptual intensity, and the like in accordance with an intention of the user. It is to be noted that the editing function described later may also be added as a plug-in to an existing 4D system editing application.

First, in the present embodiment, for example, the control unit 100 of the generation apparatus 10 presents an edit screen 600 as illustrated in FIG. 34 on the display unit 130, and accepts editing of a haptic sense (Haptic Device) for the haptic presentation device 2 by the user (creator) in a time axis of a reproduction content. In the edit screen 600, a waveform of audio data (L/R) (Sound L/R) of the reproduction content is displayed on the time axis, and setting screens 620, 640, and the like for the haptic presentation device 2 are further displayed. While browsing waveforms of audio data of the reproduction content as well as an image (unillustrated) of the reproduction content, the user is able to individually edit, for example, a vibration, etc. given by the haptic presentation device 2 in the setting screen 620 or 640. It is to be noted that, in the present embodiment, the haptic sense is divided individually into such haptic senses as a haptic sense A and a haptic sense B for editing depending on a difference in fine settings (such as a waveform), thus making it possible to assign the haptic senses to respective tracks of the reproduction content. For example, in FIG. 34, setting screens are provided for the respective haptic senses divided individually, and operations are performed on the respective setting screens, thereby making it possible to edit the respective haptic senses. In addition, in the present embodiment, the number of haptic senses is not particularly limited.

For example, the user specifies a time zone 622 at which a vibration is desired to be generated by the haptic presentation device 2, on the time axis corresponding to the reproduction content displayed on the setting screen 620 of the haptic sense A of the haptic presentation device 2 by a swipe operation, etc. In the example illustrated in FIG. 34, the haptic sense A is handled separately as three haptic senses of a haptic sense A-1, a haptic sense A-2, and a haptic sense A-3 for respective time zones. It is to be noted that the present embodiment is not limited to the division of one haptic sense and that no limitation is made to the number into which a haptic sense is divided (e.g., the haptic sense may be divided into 99 haptic senses from the haptic sense A-1 to a haptic sense A-99)

For example, the user specifies vibration intensity (perceptual intensity) (Vol.) of the haptic sense A by the haptic presentation device 2 on the time axis displayed on the setting screen 620 of the haptic sense A of the haptic presentation device 2 by inputting a waveform 624 using a swipe operation. In addition, for example, the user specifies a vibration pitch (e.g., a cycle of repetition) (perceptual interval) (Pitch) of the haptic sense A by the haptic presentation device 2 on the time axis displayed on the setting screen 620 of the haptic sense A of the haptic presentation device 2 by inputting a waveform 626 using a swipe operation.

For example, on the time axis displayed on the setting screen 620, the user specifies a haptic presentation position of the haptic sense A at each time zone 622 by individually inputting three coordinates of coordinates on an X-axis, coordinates on a Y-axis, and coordinates on a Z-axis in a three-dimensional orthogonal coordinate system with the center of the body (of a person who wears the haptic presentation device 2) set as the origin. More specifically, the user is able to individually input the three coordinates of coordinates on the X-axis, coordinates on the Y-axis, and coordinates on the Z-axis of a haptic presentation position of the haptic sense A by moving cursors in a time series display screen 628 corresponding to each of the X-axis, the Y-axis, and the Z-axis displayed on the setting screen 620. At this time, the user is able to optionally adjust, within a range of a predetermined width (e.g., +1), each of the coordinates of the haptic presentation position. Then, the width is converted into a range of a specific haptic presentation position in the haptic presentation device control apparatus 20, and the inputted coordinates are converted into coordinates of a specific haptic presentation position on the basis of the converted width. Accordingly, in the present embodiment, the range of the specific haptic presentation position is shared in advance as the profile information between the generation side and the reproduction side.

It is to be noted that, as described above, in a case of setting the haptic presentation position by individually inputting the coordinates on the X-axis, the coordinates on the Y-axis, and the coordinates on the Z-axis, it may be difficult for the user to grasp the haptic presentation position intuitively in some occasions. In such a case, by utilizing another tool or the like separately to generate data of the coordinates of the haptic presentation position and to read the generated coordinate data by the editing function, the time series display screen 628 may be displayed as illustrated in FIG. 34 to set the haptic presentation position. In addition, in the present embodiment, the setting of the haptic presentation position may involve using another input method utilizing, for example, a plug-in function or the like, the detail of which is described later.

Further, for example, the user specifies a reproduction speed (Speed) of the haptic sense A by the haptic presentation device 2 (e.g., the haptic sense A is reproduced at 2× speed or 0.5× speed with respect to the reproduction of the reproduction content) on the time axis displayed on the setting screen 620 of the haptic sense A of the haptic presentation device 2 by inputting a waveform 630 using a swipe operation. In addition, for example, the user specifies a frequency (Frequency) (perceptual frequency) of a vibration or the like of the haptic sense A by the haptic presentation device 2 on the time axis displayed on the setting screen 620 of the haptic sense A of the haptic presentation device 2 by inputting a waveform 632 using a swipe operation. It is to be noted that, in the present embodiment, for example, even when the above-described reproduction speed is changed, the frequency of the vibration of the haptic sense A is fixed to a specified frequency. Further, for example, the user specifies offset information (Offset) (delay time) of the haptic sense A by the haptic presentation device 2 on the time axis displayed on the setting screen 620 of the haptic sense A of the haptic presentation device 2 by inputting a waveform 634 using a swipe operation. It is to be noted that, in the present embodiment, instead of the offset information, a timing of synchronization, etc. with this part on the reproduction content may be specified, and edit items are not limited to the items illustrated in FIG. 34.

In the present embodiment, it is possible, in this manner, to edit the vibration intensity, the vibration pitch, the haptic presentation position, the reproduction speed, the frequency, the offset information, and the like, for the haptic sense A. Further, another haptic sense (e.g., haptic sense B) is also able to be edited similarly to the haptic sense A. It is to be noted that, in the present embodiment, the edit items are not limited to the vibration intensity, the vibration pitch, the haptic presentation position, the reproduction speed, the frequency, and the offset information, and other items may be further edited. Furthermore, it is possible, in the present editing function, to easily edit each item by moving a waveform from a location on any time series display screen to a location on another time series display screen by drag and drop operations.

In addition, in the present embodiment, generation haptic data edited by the above-described editing function is consolidated in a 4D system file. The generation haptic data is integrated with the format for the 4D system file and is unified with the 4D system file to be thereby used, together with the 4D system file, as information for issuing a command along the time axis in accordance with a time code. For example, the X-axis coordinates of the haptic sense A are to be arithmetically processed as X-axis coordinates of a haptic presentation position on a predetermined time axis, in the haptic presentation device control apparatus 20.

Incidentally, as described above, in a case of editing a haptic sense on the time axis on the reproduction content, generating generation haptic data on the basis of the editing, and issuing a command in accordance with the above time code using the generation haptic data, it may not be possible to cope with an amount of arithmetic delay in the haptic presentation device control apparatus 20 in some occasions. For example, in a case of assuming that arithmetic delay of a delay amount of 0.05 s is generated in the haptic presentation device control apparatus 20, when a haptic sense is desired to be presented at a timing of 10.0 s, no generation of a command for presenting the haptic sense at a timing of 9.5 s on the generation side makes it unable to present the haptic sense at a timing of 10.0 s due to the arithmetic delay in the haptic presentation device control apparatus 20.

Accordingly, in order to generate a command with the above-described arithmetic delay into consideration, the generation side and the reproduction side are required to share the delay amount due to the arithmetic delay of the haptic presentation device control apparatus 20. Therefore, in the present embodiment, a feedback of the delay amount due to the arithmetic delay of the haptic presentation device control apparatus 20 on the reproduction side is applied to the generation haptic data in advance to make conversion into data corresponding to the delay amount. In addition, in the present embodiment, when performing calibration of the haptic presentation device control apparatus 20 and the haptic presentation device 2 on the reproduction side, delay amounts, which are differences with respect to the control apparatus 52 and the haptic presentation device 54 on the generation side, are calculated, and a feedback of the delay amount may be applied on the reproduction side to convert the generation haptic data into data corresponding to the delay amount.

In addition, in the present embodiment, the setting of the haptic presentation position may be performed by displaying edit screens 700 and 710 as illustrated in FIGS. 35 and 36 using a plug-in function, etc., for example. FIGS. 35 and 36 each illustrate an orthogonal coordinate system superimposed on a body model. Particularly, FIG. 35 illustrates a plane orthogonal coordinate system (Z-Y coordinate system). In the plane orthogonal coordinate system, the body center of the upper body of the body model is set as the origin, and a positive direction of the Z-axis corresponds to the entire surface (chest side) of the human body, while a positive direction of the Y-axis corresponds to head side of the human body. In addition, FIG. 36 illustrates a three-dimensional orthogonal coordinate system (X-Y-Z coordinate system). In the three-dimensional orthogonal coordinate system, the body center of the upper body of the body model is set as the origin; a positive direction of the X-axis corresponds to left side of the human body, a positive direction of the Y-axis corresponds to the head side of the human body, a positive direction of the Z-axis corresponds to the entire surface (chest side) of the human body, and a positive direction of the Y-axis corresponds to the head side of the human body.

For example, the user is able to set a haptic presentation position or path by moving markers 702 and 712 illustrated on the edit screens 700 and 710 on the orthogonal coordinate system using an operation such as a tap, a click, and a swipe. Then, the control unit 100 of the generation apparatus 10 is able to set the haptic presentation position by converting the haptic presentation position or path inputted in this manner to three coordinates of coordinates on the X-axis, coordinates on the Y-axis, and coordinates on the Z-axis. Such edit screens 700 and 710 enable the user to intuitively grasp the haptic presentation position by using the orthogonal coordinate system superimposed on the body model.

Further, in the present embodiment, the range of the haptic presentation position may be performed by displaying an edit screen 730 as illustrated in FIG. 37 using, for example, a plug-in function, etc. For example, in the edit screen 730, an X-Y coordinate system is displayed in which the center of the body is set as the origin; the user is able to set not only the haptic presentation position and path but also a haptic presentation range and a temporal change thereof by moving, on the coordinates, a marker 732 indicated on the edit screen 730 while changing a size thereof using an operation such as a tap, a click, and a swipe.

5. Conclusion

Although the description has been given above in detail of preferred embodiments of the present disclosure with reference to the accompanying drawings, the present technology is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

For example, it may be possible to prepare a computer program for causing hardware, such as a CPU, a ROM, and a RAM built in the generation apparatus 10, the haptic presentation device control apparatus 20, the 4D system control apparatus 40, or the like described above, to exhibit functions of the generation apparatus 10, the haptic presentation device control apparatus 20, the 4D system control apparatus 40, or the like. Further, a computer-readable storage medium storing the computer program is also provided.

The description has been given of an example of operation processing according to the present embodiment. It is to be noted that the operation processing illustrated in the referenced drawings is merely exemplary, and the present disclosure is not limited to the examples illustrated in the referenced drawings. For example, the present disclosure is not limited to the order of the steps illustrated in the referenced drawings. At least one of the steps may be processed in parallel or may be processed in the reverse order. In addition, every processing illustrated in the referenced drawings need not necessarily be performed. In addition, every processing illustrated in the referenced drawing need not necessarily be performed in a single apparatus.

In addition, the effects described herein are merely illustrative or exemplary, and are not limitative. That is, the technology according to an embodiment of the present disclosure may achieve, in addition to or in place of the above effects, other effects that are obvious to those skilled in the art from the description of the present specification.

The present technology may also have the following configurations.

(1)

An information processor including a control unit that generates a script in which time information on a reproduction content and a control command of a haptic presentation device are associated with each other,
 the control command including
  position information indicating a perceptual position that causes a haptic stimulus to be perceived in the haptic presentation device, and
  haptic stimulus type information specifying a type of the haptic stimulus.

(2)

The information processor according to (1), in which the control command further includes perceptual intensity information indicating perceptual intensity.

(3)

The information processor according to (1) or (2), in which the haptic stimulus type information includes information specifying a type of a haptic data library prepared in advance or a type of generation haptic data generated from the reproduction content.

(4)

The information processor according to (3), in which the control unit generates the generation haptic data from audio data of a sound effect, a background music or a dialogue included in the reproduction content.

(5)

The information processor according to (3) or (4), in which the haptic data library and the generation haptic data each include waveform data of a vibration presented in the haptic presentation device.

(6)

The information processor according to any one of (1) to (5), in which
 the control unit displays an arrangement display screen indicating an arrangement of one or more haptic stimulus units (actuators) provided in the haptic presentation device, and accepts specifying of a perceptual position by a user on the arrangement display screen, and
 the control unit displays a selection screen of the type of the haptic stimulus, and accepts specifying of the type of the haptic stimulus presented at the specified perceptual position via the selection screen.

(7)

The information processor according to (3), in which
 the control unit generates the generation haptic data from audio data of a sound effect, a background music or a dialogue included in the reproduction content, and
 the control unit recommends a perceptual position and perceptual intensity of the generated generation haptic data on a basis of the audio data of the sound effect, the background music or the dialogue included in the reproduction content.

(8)

The information processor according to any one of (1) to (6), in which the control command further includes offset information for the time information on the reproduction content.

(9)

The information processor according to (8), in which the control unit sets the offset information in response to a processing delay amount that is assumed when executing the control command on reproduction side.

(10)

The information processor according to any one of (1) to (9), in which the reproduction content includes image data.

(11)

The information processor according to any one of (1) to (9), in which
 the reproduction content includes an action that occurs in a game, and
 time information on the action and the control command of the haptic presentation device are associated with each other for each action in the script.

(12)

The information processor according to any one of (1) to (11), in which the control unit generates a script in which the time information on the reproduction content and the control command for each specific type of the haptic presentation device are associated with each other.

(13)

An information processing method including causing a processor to generate a script in which time information on a reproduction content and a control command of a haptic presentation device are associated with each other,
 the control command including
  position information indicating a perceptual position that causes a haptic stimulus to be perceived in the haptic presentation device, and
  haptic stimulus type information specifying a type of the haptic stimulus.

(14)

A program that causes a computer to function as a control unit generating a script in which time information on a reproduction content and a control command of a haptic presentation device are associated with each other,
 the control command including
  position information indicating a perceptual position that causes a haptic stimulus to be perceived in the haptic presentation device, and
  haptic stimulus type information specifying a type of the haptic stimulus.

(15)

An information processor including a control unit that generates a haptic control signal to be inputted to a haptic presentation device in accordance with a command corresponding to a time code indicating a reproduction position of a reproduction content, based on a script in which time information on the reproduction content and a control command of the haptic presentation device are associated with each other,
 the command including
  position information indicating a perceptual position that causes a haptic stimulus to be perceived in the haptic presentation device, and
  haptic stimulus type information specifying a type of the haptic stimulus, and
 the control unit, in accordance with an arrangement of one or more haptic stimulus units provided in the haptic presentation device, generating the haptic control signal to each of the haptic stimulus units for presentation of the haptic stimulus of the type specified at the perceptual position, the control unit outputting the haptic control signal to the haptic presentation device.

(16)

The information processor according to (15), in which the control unit outputs the generated haptic control signal to the haptic presentation device at a timing corresponding to offset information included in the control command.

(17)

The information processor according to (15) or (16), in which the control unit refers to the script to extract the command in response to the time code received from an external apparatus.

(18)

The information processor according to (15) or (16), in which the information processor receives the command corresponding to the time code from an external apparatus.

(19)

The information processor according to any one of (15) to (18), in which the haptic stimulus type information includes information specifying a type of a haptic data library prepared in advance or a type of generation haptic data generated from the reproduction content, the information processor includes a storage unit that accumulates the haptic data library or the generation haptic data, and the control unit generates the haptic control signal using the haptic data library or the generation haptic data (20)

The information processor according to any one of (15) to (19), in which the control unit further considers a profile of the haptic presentation device to generate the haptic control signal.

(21)

The information processor according to (6), in which the control unit accepts, on the arrangement display screen, the specifying of the perceptual position by accepting inputs of three coordinates of coordinates on an X-axis, coordinates on a Y-axis, and coordinates on a Z-axis in a three-dimensional orthogonal coordinate system, in which a center of a body is set as an origin.

(22)

The information processor according to (21), in which the control unit accepts the specifying of the perceptual position by accepting an input to the orthogonal coordinate system superimposed on a body model on the arrangement display screen.

(23)

The information processor according to (21) or (22), in which the control command includes the position information indicating the perceptual position of each of a plurality of the haptic stimuli in the haptic presentation device and the haptic stimulus type information specifying a type of each of the haptic stimuli.

(24)

The information processor according to (23), in which the control command includes at least one of perceptual intensity, a perceptual frequency, a perceptual interval, a reproduction speed, or offset information of each of the haptic stimuli.

REFERENCE NUMERALS LIST 1 information processing system
2 haptic presentation device
4 4D seat
40 4D system control apparatus
7 recording medium
10 generation apparatus
100 control unit
101 control information generation unit
102 haptic presentation information generation unit
103 haptic data generation unit
104 haptic control signal generation unit
110 communication unit
120 operation input unit
130 display unit
140 storage unit
  141 haptic Lib DB
  142 generation haptic data DB
  143 profile DB
20 haptic presentation device control apparatus
  200 control unit
  201 control signal generation unit
  202 output control unit
  210 communication unit
    211 system I/F
    212 haptic presentation device I/F
  220 storage unit
    221 haptic Lib DB
    222 generation haptic data DB
    223 profile DB
22 observation unit
24 controlling unit
30 cinema system
31 reproduction control apparatus
32 projector
34 light-emitting unit
50 verification system
52 control apparatus
54 haptic presentation device
56 4D seat
58 display apparatus
60 broadcast station
62 television apparatus
64 reproduction apparatus
66 streaming server
80 game server
82 game reproduction apparatus
84 display apparatus
86 controller
600, 700, 710, 730 edit screen
620, 640 setting screen
622 time zone
624, 626, 630, 632, 634 waveform
628 time series display screen
702, 712, 732 marker

The invention claimed is:

1. An information processor comprising:
a control unit configured to
    generate a script in which time information on a reproduction content and a control command of a haptic presentation device are associated with each other, and
    initiate display of an arrangement display screen indicating an arrangement of one or more haptic stimulus units provided in the haptic presentation device,
wherein the control command includes
    position information indicating a perceptual position that causes a haptic stimulus to be perceived in the haptic presentation device, and
    haptic stimulus information specifying a type of the haptic stimulus,
wherein each haptic stimulus unit includes at least one actuator, and wherein the control unit is implemented via at least one processor.

2. The information processor according to claim 1, wherein the control command further includes perceptual intensity information indicating perceptual intensity.

3. The information processor according to claim 1, wherein the haptic stimulus information comprises information specifying a type of a haptic data library prepared in advance or a type of generation haptic data generated from the reproduction content.

4. The information processor according to claim 3, wherein the control unit generates the generation haptic data from audio data of a sound effect, a background music or a dialogue included in the reproduction content.

5. The information processor according to claim 3, wherein the haptic data library and the generation haptic data each comprise waveform data of a vibration presented in the haptic presentation device.

6. The information processor according to claim 3, wherein
the control unit generates the generation haptic data from audio data of a sound effect, a background music or a dialogue included in the reproduction content, and
the control unit recommends a perceptual position and perceptual intensity of the generated generation haptic data on a basis of the audio data of the sound effect, the background music or the dialogue included in the reproduction content.

7. The information processor according to claim 1, wherein
the control unit is further configured to
accept specifying of a perceptual position by a user on the arrangement display screen,
display a selection screen of the type of the haptic stimulus, and
accept specifying of the type of the haptic stimulus presented at the specified perceptual position via the selection screen.

8. The information processor according to claim 1, wherein the control command further includes offset information for the time information on the reproduction content.

9. The information processor according to claim 8, wherein the control unit sets the offset information in response to a processing delay amount that is assumed when executing the control command on reproduction side.

10. The information processor according to claim 1, wherein the reproduction content comprises image data.

11. The information processor according to claim 1, wherein
the reproduction content comprises an action that occurs in a game, and
time information on the action and the control command of the haptic presentation device are associated with each other for each action in the script.

12. The information processor according to claim 1, wherein the control unit generates a script in which the time information on the reproduction content and the control command for each specific type of the haptic presentation device are associated with each other.

13. An information processing method comprising:
causing a processor to generate a script in which time information on a reproduction content and a control command of a haptic presentation device are associated with each other; and
displaying an arrangement display screen indicating an arrangement of one or more haptic stimulus units provided in the haptic presentation device,
wherein the control command includes
position information indicating a perceptual position that causes a haptic stimulus to be perceived in the haptic presentation device, and
haptic stimulus information specifying a type of the haptic stimulus, and
wherein each haptic stimulus unit includes at least one actuator.

14. A non-transitory computer readable storage medium having embodied thereon a program, which when executed by a computer to execute a method, the method comprising:
generating a script in which time information on a reproduction content and a control command of a haptic presentation device are associated with each other and
displaying an arrangement display screen indicating an arrangement of one or more haptic stimulus units provided in the haptic presentation device,
wherein the control command includes
position information indicating a perceptual position that causes a haptic stimulus to be perceived in the haptic presentation device, and
haptic stimulus information specifying a type of the haptic stimulus, and
wherein each haptic stimulus unit includes at least one actuator.

15. An information processor comprising:
a control unit configured to
generate a haptic control signal to be inputted to a haptic presentation device in accordance with a command corresponding to a time code indicating a reproduction position of a reproduction content, based on a script in which time information on the reproduction content and a control command of the haptic presentation device are associated with each other, and
initiate display of an arrangement display screen indicating an arrangement of one or more haptic stimulus units provided in the haptic presentation device,
wherein the command includes
position information indicating a perceptual position that causes a haptic stimulus to be perceived in the haptic presentation device, and
haptic stimulus information specifying a type of the haptic stimulus,
wherein the control unit, in accordance with the arrangement of the one or more haptic stimulus units provided in the haptic presentation device, generates the haptic control signal to each of the haptic stimulus units for presentation of the haptic stimulus of the type specified at the perceptual position,
wherein the control unit is further configured to output the haptic control signal to the haptic presentation device,
wherein each haptic stimulus unit includes at least one actuator, and
wherein the control unit is implemented via at least one processor.

16. The information processor according to claim 15, wherein the control unit outputs the generated haptic control signal to the haptic presentation device at a timing corresponding to offset information included in the control command.

17. The information processor according to claim 15, wherein the control unit refers to the script to extract the command in response to the time code received from an external apparatus.

18. The information processor according to claim 15, wherein the information processor receives the command corresponding to the time code from an external apparatus.

19. The information processor according to claim 15, wherein
- the haptic stimulus information comprises information specifying a type of a haptic data library prepared in advance or a type of generation haptic data generated from the reproduction content,
- the information processor comprises a storage unit configured to accumulate the haptic data library or the generation haptic data,
- the control unit generates the haptic control signal using the haptic data library or the generation haptic data, and
- the information processor is implemented via at least one non-transitory computer-readable storage medium.

20. The information processor according to claim 15, wherein the control unit further considers a profile of the haptic presentation device to generate the haptic control signal.

* * * * *